US012369541B2

(12) United States Patent
Higgins

(10) Patent No.: US 12,369,541 B2
(45) Date of Patent: Jul. 29, 2025

(54) HYDROPONICS SYSTEM

(71) Applicant: AQUATREE GLOBAL, LLC, Fort Mill, SC (US)

(72) Inventor: Kevin W. Higgins, Fort Mill, SC (US)

(73) Assignee: AQUATREE GLOBAL, LLC, Fort Mill, SC (US)

( * ) Notice: Subject to any disclaimer, the term of this patent is extended or adjusted under 35 U.S.C. 154(b) by 0 days.

(21) Appl. No.: 18/355,934

(22) Filed: Jul. 20, 2023

(65) Prior Publication Data

US 2025/0024799 A1    Jan. 23, 2025

(51) Int. Cl.
*A01G 31/04* (2006.01)
*A01G 31/02* (2006.01)

(52) U.S. Cl.
CPC .......... *A01G 31/047* (2013.01); *A01G 31/065* (2025.01)

(58) Field of Classification Search
CPC . A01G 31/047; A01G 2031/006; A01G 31/06
See application file for complete search history.

(56) References Cited

U.S. PATENT DOCUMENTS

| 47,664 | A | | 5/1865 | Sheldon |
| 577,230 | A | | 2/1897 | Boyd |
| 2,896,374 | A | | 7/1959 | Perin |
| 3,660,933 | A | * | 5/1972 | Wong, Jr. ................ A01G 31/02 |
| | | | | 47/62 C |
| 3,841,023 | A | * | 10/1974 | Carlyon, Jr. ............ A01G 9/023 |
| | | | | 47/16 |
| 4,006,559 | A | * | 2/1977 | Carlyon, Jr. ............ A01G 9/023 |
| | | | | 47/16 |
| 4,033,072 | A | | 7/1977 | Kobayashi et al. |
| 4,170,844 | A | | 10/1979 | Steele |

(Continued)

FOREIGN PATENT DOCUMENTS

| AU | 2013201927 A1 | 1/2014 |
| CN | 1058128 A | 1/1992 |

(Continued)

OTHER PUBLICATIONS

International Searching Authority, International Search Report and Written Opinion received for International Application No. PCT/US2024/035331, dated Sep. 19, 2024, 10 pages, United States Patent And Trademark Office, US.

*Primary Examiner* — Ebony E Evans
(74) *Attorney, Agent, or Firm* — ALSTON & BIRD LLP

(57) ABSTRACT

Provided herein is a system for hydroponics growing of plants. An apparatus for a hydroponics system described herein includes: a tray configured to receive water from the hydroponic system, circulate the water through the tray, and return the water to the hydroponic system, where the tray includes one or more flow control features configured to regulate water flow through the tray, and a tray insert supported by the tray, where the tray insert includes a plurality of holes through a bottom surface of the tray insert, where the tray insert is configured to receive seeds on the bottom surface and maintain the seeds in a predefined depth of water. According to some embodiments, the one or more flow control features include one or more slots, where the one or more slots are each arranged to receive therein a barrier that blocks a portion of water flow out of the tray.

20 Claims, 53 Drawing Sheets

(56) References Cited

U.S. PATENT DOCUMENTS

| | | | |
|---|---|---|---|
| 4,258,501 A * | 3/1981 | Brown | A01G 31/047 47/84 |
| 4,302,906 A | 12/1981 | Kawabe et al. | |
| 4,419,843 A | 12/1983 | Johnson, Sr. | |
| D281,406 S | 11/1985 | Guenat | |
| 4,951,416 A | 8/1990 | Gutridge | |
| 5,010,686 A | 4/1991 | Rivest | |
| 5,203,109 A | 4/1993 | Simon et al. | |
| 5,228,229 A | 7/1993 | Lindgren | |
| 5,251,399 A | 10/1993 | Rasmussen | |
| 5,252,108 A | 10/1993 | Banks | |
| 5,440,836 A * | 8/1995 | Lee | A01G 31/06 47/60 |
| 5,502,922 A | 4/1996 | Shlomo | |
| 5,598,662 A | 2/1997 | Droste | |
| 5,752,341 A | 5/1998 | Goldfarb | |
| 5,829,390 A | 11/1998 | Jonilla et al. | |
| 7,055,282 B2 | 6/2006 | Bryan, III | |
| D555,034 S | 11/2007 | Van de Wetering | |
| 7,516,574 B2 | 4/2009 | Gottlieb et al. | |
| 8,136,296 B2 | 3/2012 | Hogan | |
| 8,371,473 B2 | 2/2013 | Scribner et al. | |
| 8,418,403 B1 | 4/2013 | Nuttman | |
| 8,978,300 B2 | 3/2015 | Keats | |
| 9,043,962 B2 | 6/2015 | Trofe | |
| 9,144,206 B1 * | 9/2015 | Rubanenko | A01G 31/02 |
| 10,080,336 B2 | 9/2018 | Higgins | |
| 10,624,282 B2 | 4/2020 | Au | |
| 2005/0274073 A1 * | 12/2005 | Brooke | A01G 31/02 47/59 R |
| 2006/0288640 A1 * | 12/2006 | Leithold | A01G 9/028 47/39 |
| 2009/0000189 A1 | 1/2009 | Black | |
| 2009/0173000 A1 | 7/2009 | Rand et al. | |
| 2009/0260282 A1 | 10/2009 | Hashimoto et al. | |
| 2009/0265986 A1 | 10/2009 | Young | |
| 2010/0146854 A1 | 6/2010 | Cannon et al. | |
| 2011/0067301 A1 | 3/2011 | DeMitchell et al. | |
| 2011/0296757 A1 | 12/2011 | McGrath | |
| 2012/0000128 A1 | 1/2012 | Rochefort | |
| 2012/0279126 A1 | 11/2012 | Simmons | |
| 2013/0047508 A1 | 2/2013 | Toone et al. | |
| 2013/0145690 A1 | 6/2013 | Cannon | |
| 2013/0185997 A1 | 7/2013 | Trofe | |
| 2013/0340338 A1 | 12/2013 | Lin | |
| 2014/0000162 A1 | 1/2014 | Blank | |
| 2014/0033609 A1 | 2/2014 | Tyler et al. | |
| 2014/0041594 A1 | 2/2014 | Plante | |
| 2014/0047767 A1 | 2/2014 | Bodlovich et al. | |
| 2014/0069009 A1 | 3/2014 | Lin | |
| 2014/0075840 A1 | 3/2014 | Gosling et al. | |
| 2015/0282444 A1 | 10/2015 | Butler et al. | |
| 2015/0296726 A1 * | 10/2015 | Higgins | A01G 31/06 47/62 R |
| 2016/0113221 A1 | 4/2016 | Wu et al. | |
| 2019/0230879 A1 | 8/2019 | Higgins | |
| 2020/0344965 A1 | 11/2020 | Song et al. | |
| 2024/0049665 A1 * | 2/2024 | Higgins | A01G 31/06 |

FOREIGN PATENT DOCUMENTS

| | | |
|---|---|---|
| CN | 201986488 U | 9/2011 |
| CN | 203120625 U | 8/2013 |
| EP | 0012011 A1 | 6/1980 |
| EP | 0803188 A2 | 10/1997 |
| JP | S54104021 A | 8/1979 |
| JP | S6192516 A | 5/1986 |
| JP | 2019058097 A * | 4/2019 |
| KR | 101411149 B1 | 7/2014 |
| WO | WO 2008/006172 A1 | 1/2008 |
| WO | WO 2008/088108 A1 | 7/2008 |
| WO | WO 2008/088133 A1 | 7/2008 |
| WO | WO 2010/014600 A2 | 2/2010 |
| WO | WO 2010/061292 A1 | 6/2010 |
| WO | WO 2011/031939 A1 | 3/2011 |
| WO | WO 2012/009268 A1 | 1/2012 |
| WO | WO 2012/015613 A1 | 2/2012 |
| WO | WO 2012/030298 A1 | 3/2012 |
| WO | WO 2022/035975 A2 | 2/2022 |

* cited by examiner

HYDROPONICS SYSTEM

TECHNOLOGICAL FIELD

This application relates generally to systems, apparatuses and methods for growing vegetation in both large and small scale hydroponic and/or aquaponic configurations, and more specifically, to an apparatus, system, and method for supporting and fostering the growth of vegetation within a hydroponics system.

BACKGROUND

Hydroponics and aquaponics are burgeoning fields to provide alternatives to conventional farming, particularly where conventional farming is not possible due to climate and/or suitable land availability. Hydroponics and aquaponics both enable the growing of plants without requiring soil. Aquaponics is a vegetation (e.g., vegetables, herbs, spices, fruits, grasses, flowers, plants, or any other type of editable or non-editable vegetation) production system that combines supporting aquatic organisms (e.g., raising fish, snails, crayfish, prawns, or other like organisms in tanks) in aquaculture system with a hydroponic system (e.g., cultivating plants in water outside of the ground) in a symbiotic environment. The by-products (e.g., excretions and waste) from the animals being raised accumulate in tank, which increases the toxicity of the water in the tanks. The by-products are broken down by nitrogen-fixing bacteria into nitrates and nitrites, and the water is fed to the hydroponic systems where plants use the nitrates and nitrites as nutrients. The water is then recirculated back to the aquaculture system. Plants are grown as in hydroponics systems, with their roots immersed in the nutrient-rich water. These systems working together enable the ammonia that is toxic to the aquatic animals to be filtered out of the system, while at the same time providing nutrients to the plants. After the water has passed through the hydroponic subsystem, it is cleaned and oxygenated, and can return to the aquaculture tanks. This cycle is continuous.

As existing hydroponic and aquaculture farming techniques form the basis for all aquaponics systems, the size, complexity, and types of vegetation grown in an aquaponics systems can vary as much as any system found in either distinct farming discipline. Not all existing systems of aquaponics can be satisfactorily applied to indoor large and/or small scale use. Issues such as appearance, humidity, where the water is routed if a leak occurs, and adaptability for farming different types of vegetation are all considerations for indoor systems. The present invention addresses these needs by providing an aquaponics system that allows for the production of various types of vegetation, in various scales, and in various locations.

BRIEF SUMMARY

Embodiments of the invention are directed to systems, apparatuses and methods for growing vegetation in both large and small scale hydroponic and/or aquaponic configurations, and more specifically, to an apparatus, system, and method for supporting and fostering the growth of vegetation within a hydroponics system. Each of the one or more hydroponic assemblies includes a grow tray. Embodiments provided herein include a tray for a hydroponic system including: a tray configured to receive water from the hydroponic system, circulate water through the tray, and return the water to the hydroponic system, where the tray includes one or more flow control features configured to regulate water flow through the tray; and a tray insert supported by the tray, where the tray includes a plurality of holes through a bottom surface of the tray insert, where one or more apertures are defined through the tray insert, where the one or more apertures are arranged to provide access to the one or more flow control features of the tray.

According to some embodiments, the tray insert includes rib extending across a width of the bottom surface of the tray insert, where the rib is elevated with respect to the bottom surface of the tray and does not include any of the plurality of holes. According to certain embodiments, the tray insert further includes a peripheral lip, where the peripheral lip is configured to be supported by a peripheral wall of the tray. The one or more flow control features of some embodiments include one or more slots, where the one or more slots are each arranged to receive therein a barrier that blocks at least a portion of water flow out of the tray. The barrier of the one or more slots is, in an example embodiment, adjustable within the one or more slots to control a level of water flow out of the tray.

According to certain embodiments, the one or more apertures of the tray permit insertion, removal, and adjustment of the barrier of the one or more slots. The tray of some embodiments further includes a lid, where the lid defines a periphery configured to be supported by the tray insert. The lid of an example embodiment defines at least one pod aperture, the at least one pod aperture having at least one recess defined therein. The tray of certain embodiments further includes at least one height adjustable pod, where the height adjustable pod includes a shape configured to be received within the at least one pod aperture and including at least one rib corresponding to the at least one recess of the at least one pod aperture. The at least one height adjustable pod, in a first position with the at least one rib aligned with the at least one recess of the at least one pod aperture, is received at a first depth relative to the lid. The at least one height adjustable pod in a second position with the at least one rib not aligned with the at least one recess of the at least one pod aperture is received at a second depth relative to the lid, where the second position is raised relative to the first position with respect to the lid.

Embodiments provided herein include an apparatus for a hydroponic system including: a tray configured to receive water from the hydroponic system, circulate the water through the tray, and return the water to the hydroponic system, where the tray includes one or more flow control features configured to regulate water flow through the tray, and a tray insert supported by the tray, where the tray insert includes a plurality of holes through a bottom surface of the tray insert, where the tray insert is configured to receive seeds on the bottom surface and maintain the seeds in a predefined depth of water. According to some embodiments, the one or more flow control features include one or more slots, where the one or more slots are each arranged to receive therein a barrier that blocks at least a portion of water flow out of the tray. The barrier of the one or more slots is, in some embodiments, adjustable within the one or more slots to control a level of water flow out of the tray. According to some embodiments, the predefined depth of water is controlled by the barrier of the one or more slots.

The tray of some embodiments further includes a lid, where the lid defines a periphery configured to be supported by the tray insert. The lid of an example embodiment defines at least one pod aperture, the at least one pod aperture having at least one recess defined therein. The tray of certain embodiments further includes at least one height adjustable pod, where the height adjustable pod includes a shape configured to be received within the at least one pod aperture and including at least one rib corresponding to the at least one recess of the at least one pod aperture. The at least one height adjustable pod, in a first position with the at least one rib aligned with the at least one recess of the at least one pod aperture, is received at a first depth relative to the lid. The at least one height adjustable pod in a second position with the at least one rib not aligned with the at least one recess of the at least one pod aperture is received at a second depth relative to the lid, where the second position is raised relative to the first position with respect to the lid.

The features, functions, and advantages that have been discussed can be achieved independently in various embodiments or may be combined in yet other embodiments; further details of which can be seen with reference to the following description and drawings.

BRIEF DESCRIPTION OF DRAWINGS

Figure 1:
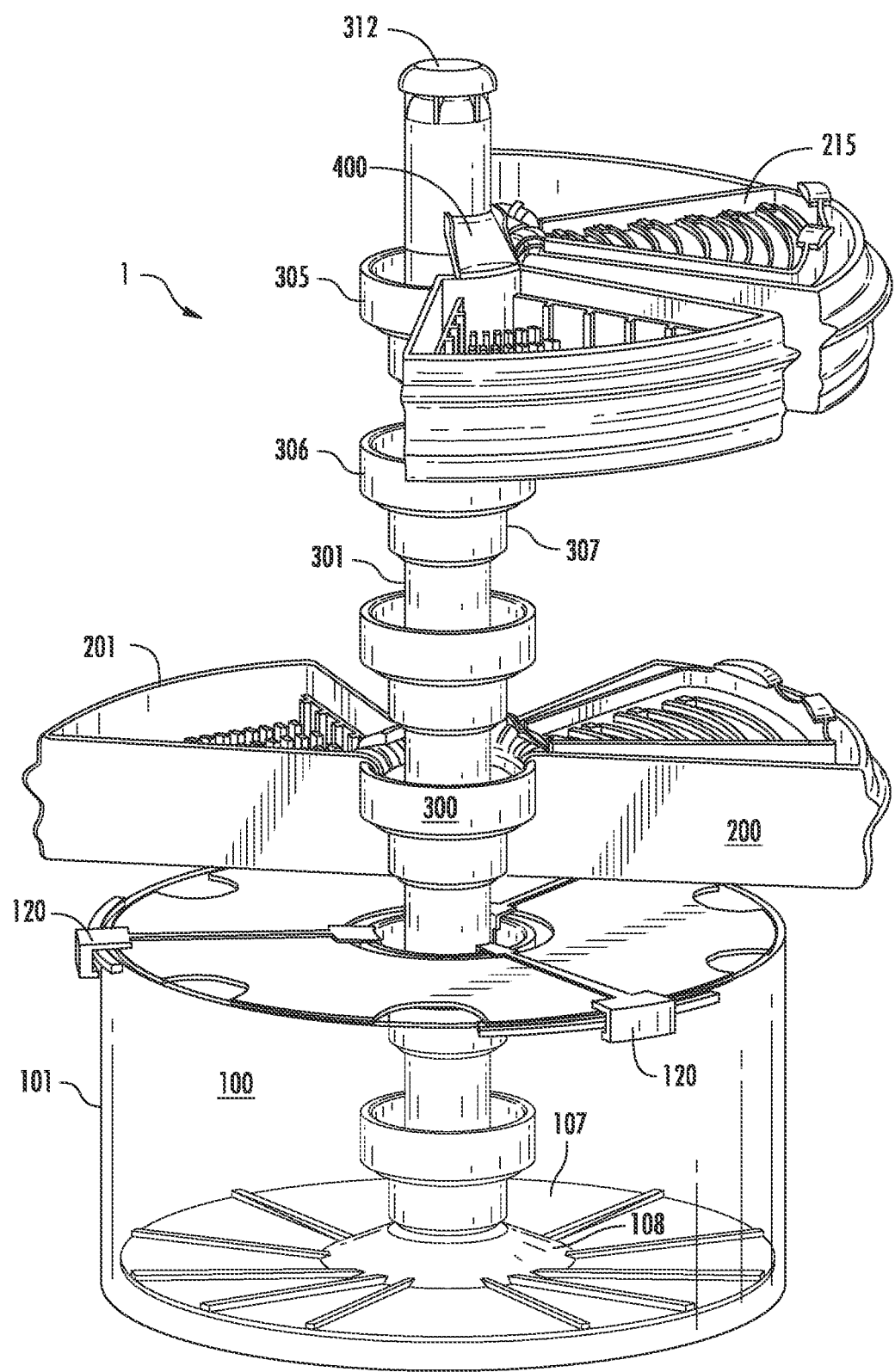
Figure 2:
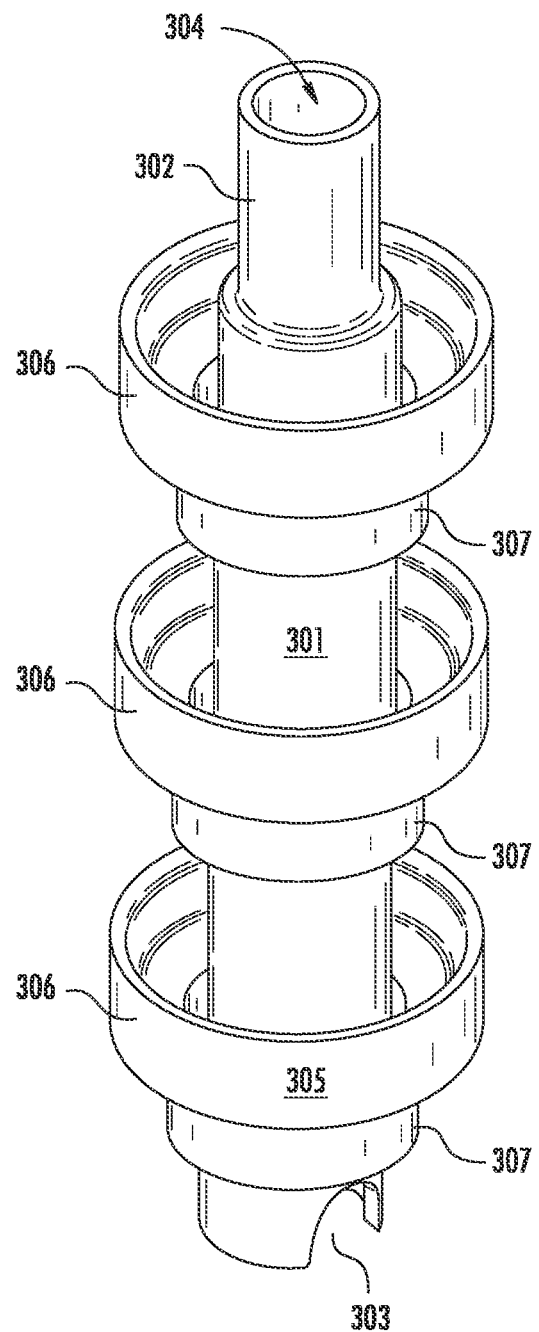
Figure 3:
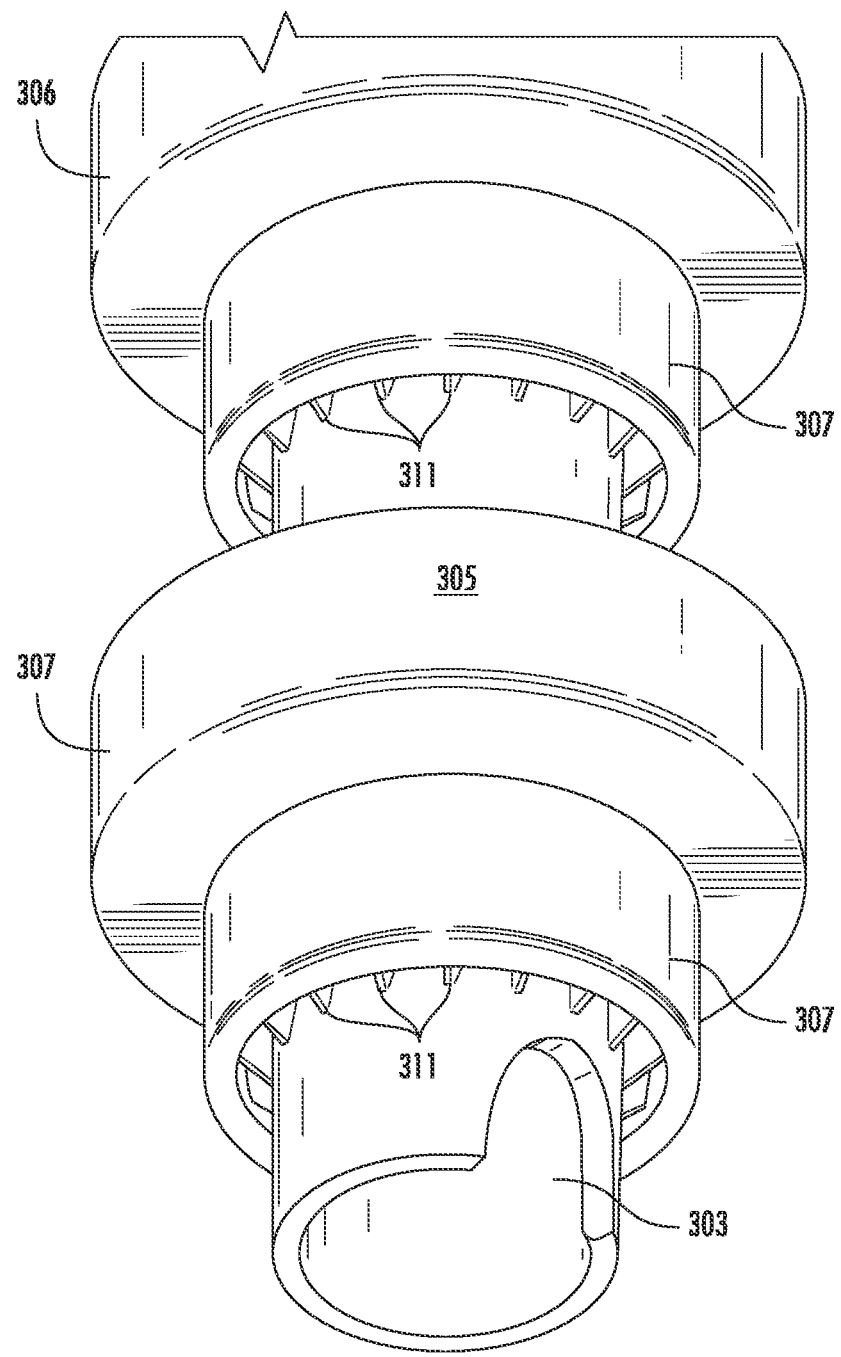

Having thus described certain embodiments of the present disclosure in general terms, reference will now be made to the accompanying drawings, which are not necessarily drawn to scale, and wherein:

FIG. 1 depicts a perspective illustration of a hydroponics system in accordance with an example embodiment of the present disclosure;

FIG. 2 depicts a perspective view of a pole as illustrated in FIG. 1 according to an example embodiment of the present disclosure;

FIG. 3 depicts a perspective view of the bottom of a pole as illustrated in FIG. 2 according to an example embodiment of the present disclosure.

Figure 4:
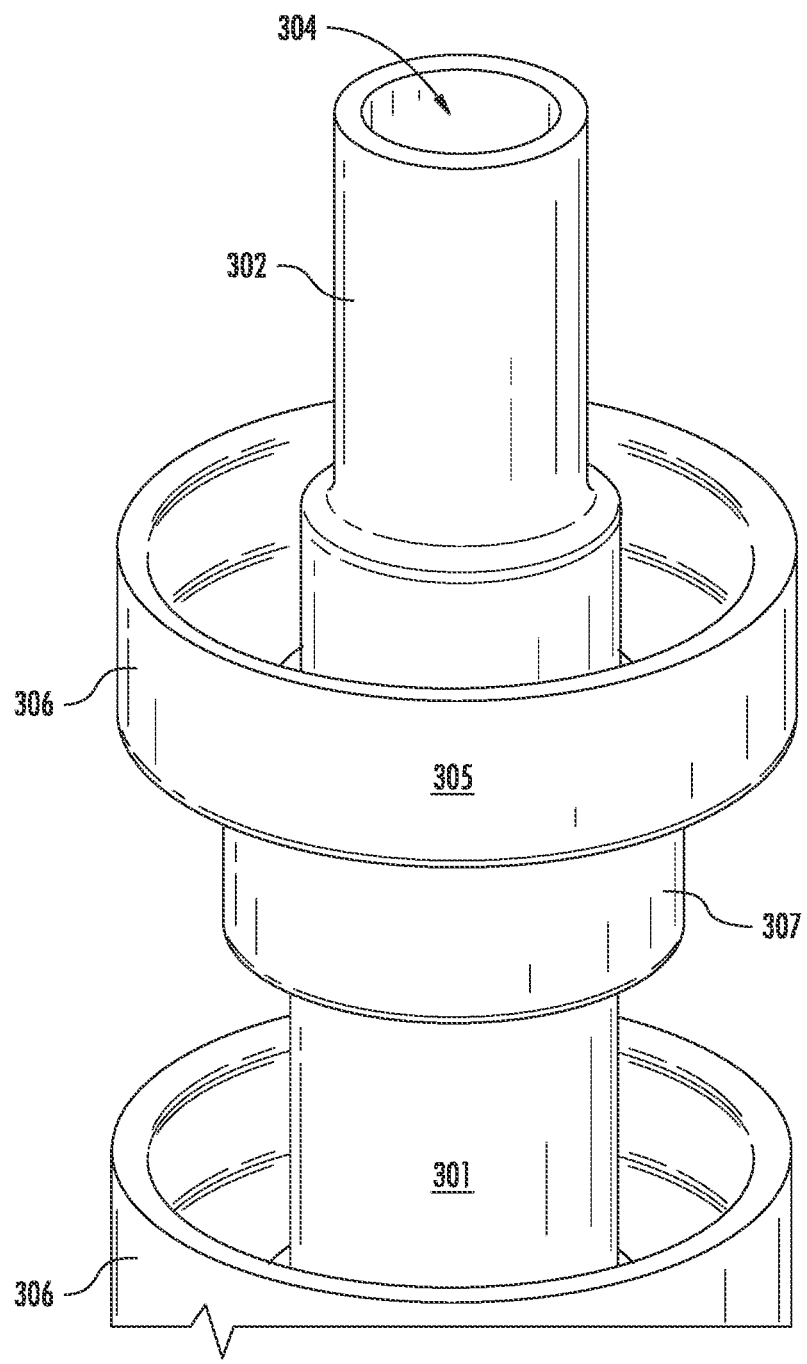
Figure 5:
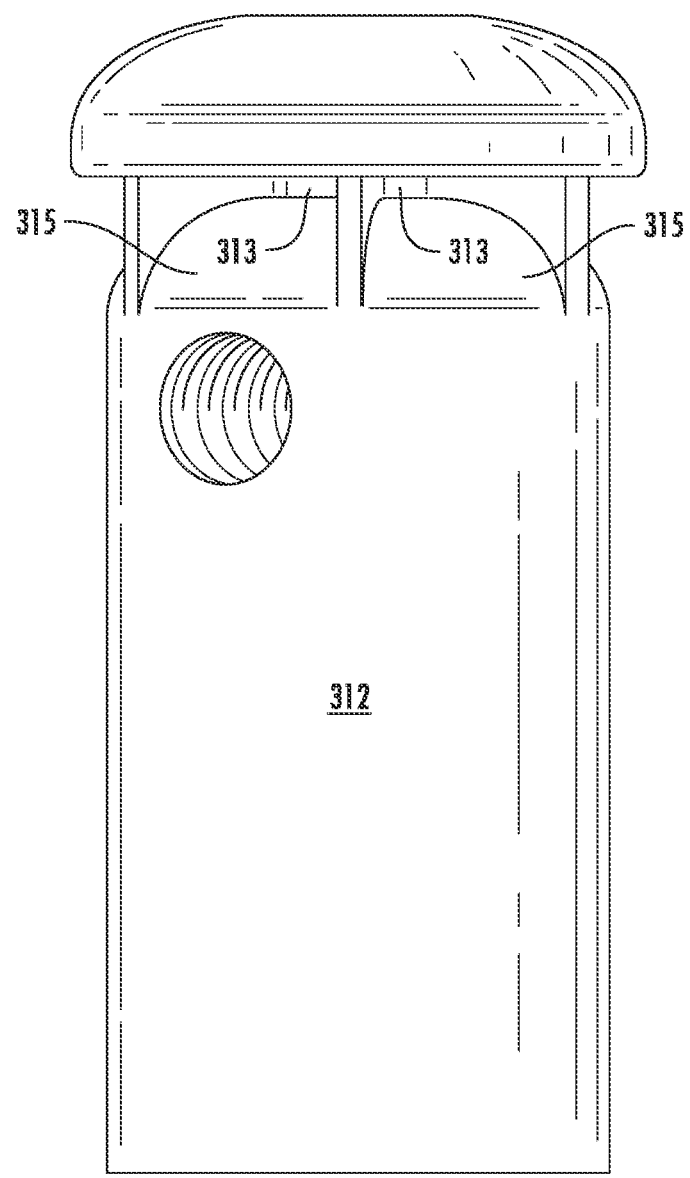
Figure 6:
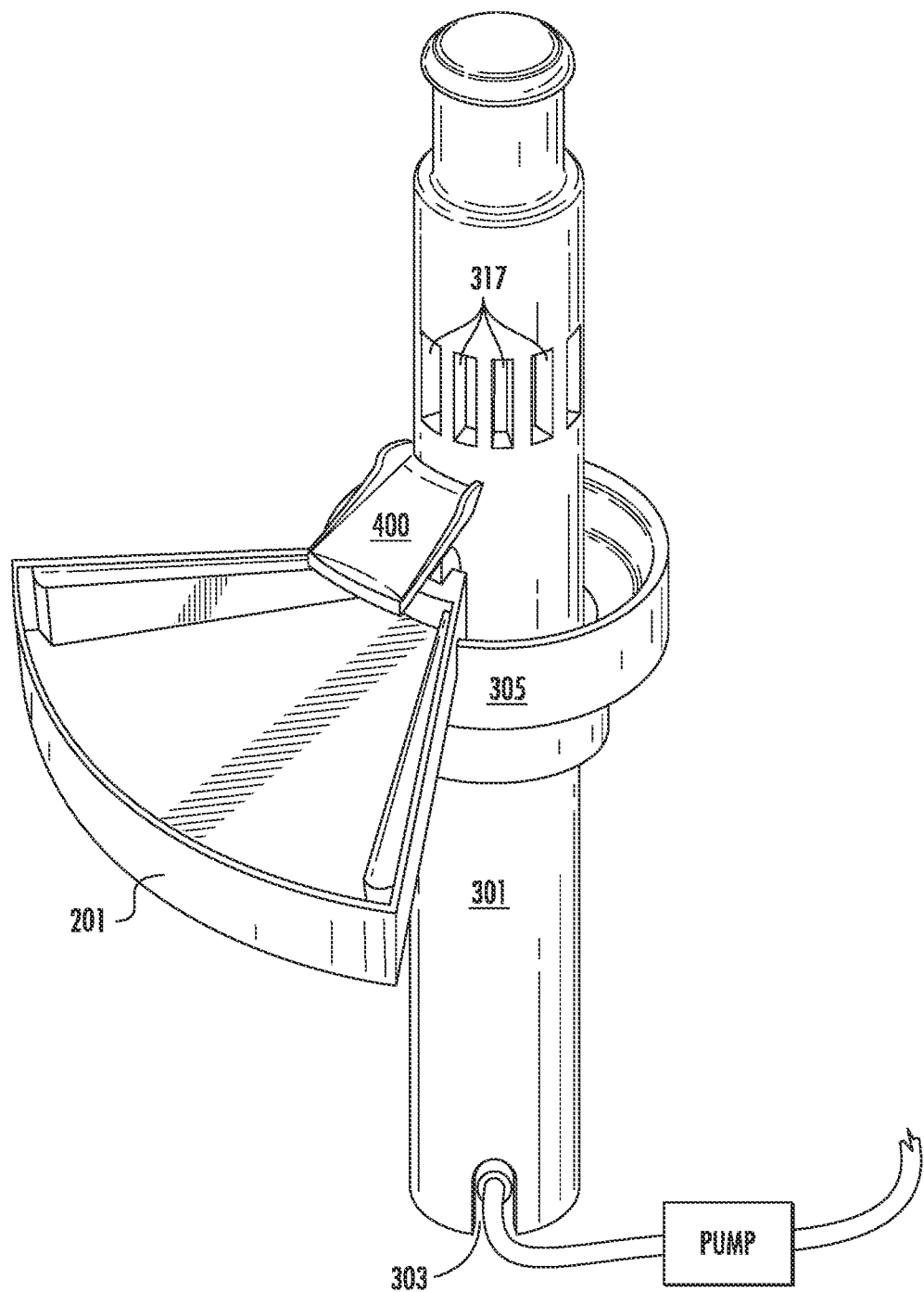
Figure 7:
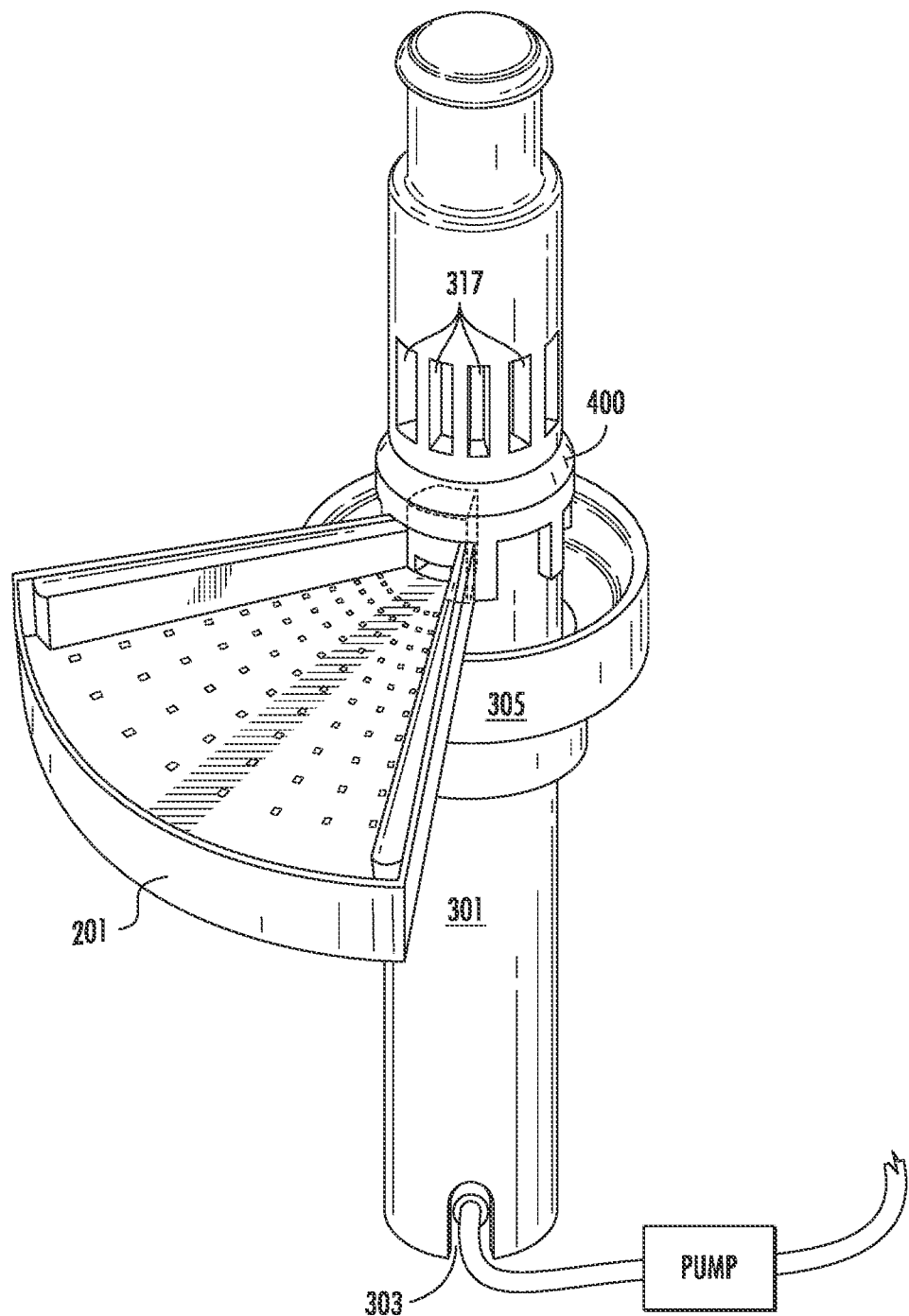
Figure 8:
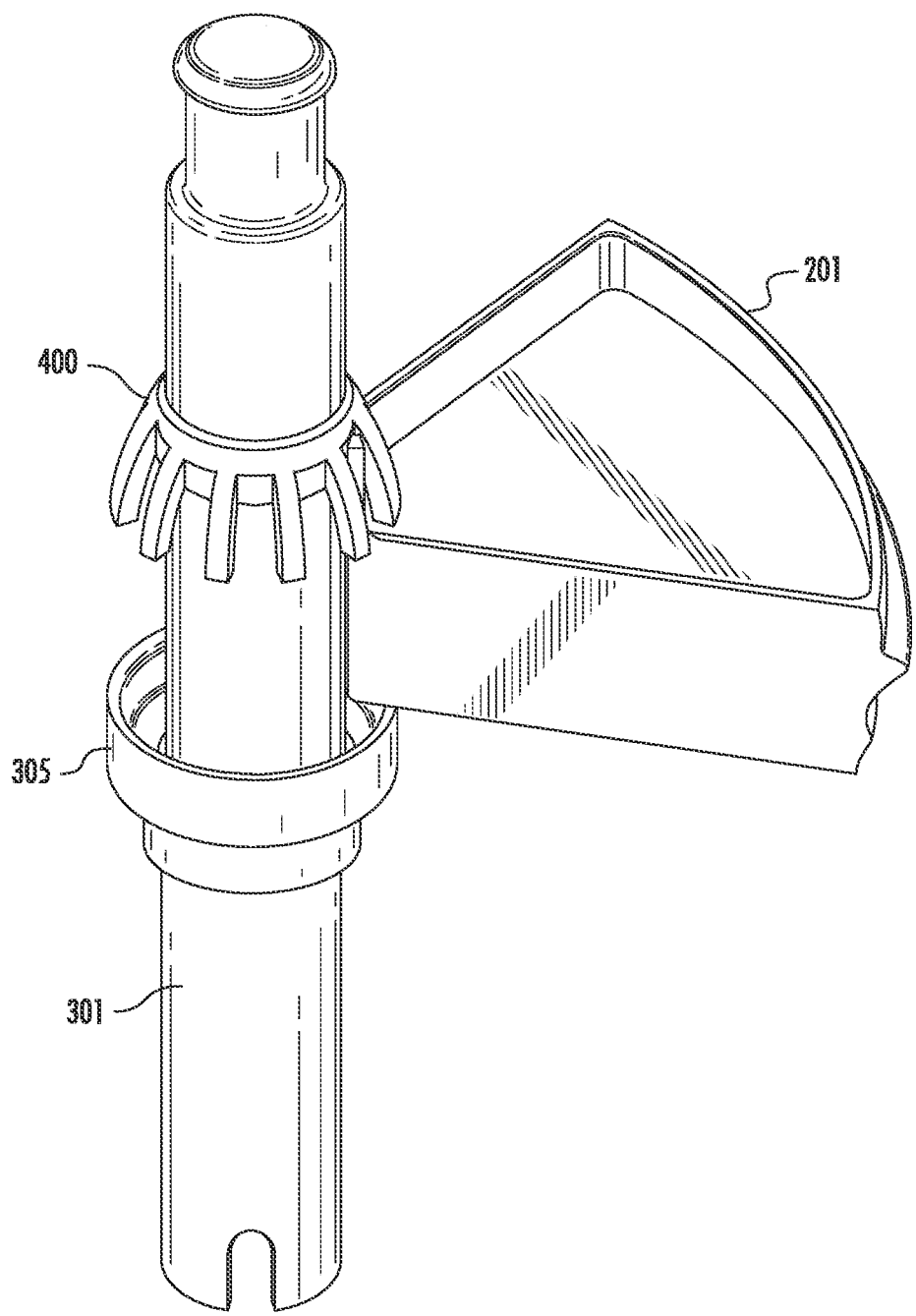
Figure 9:
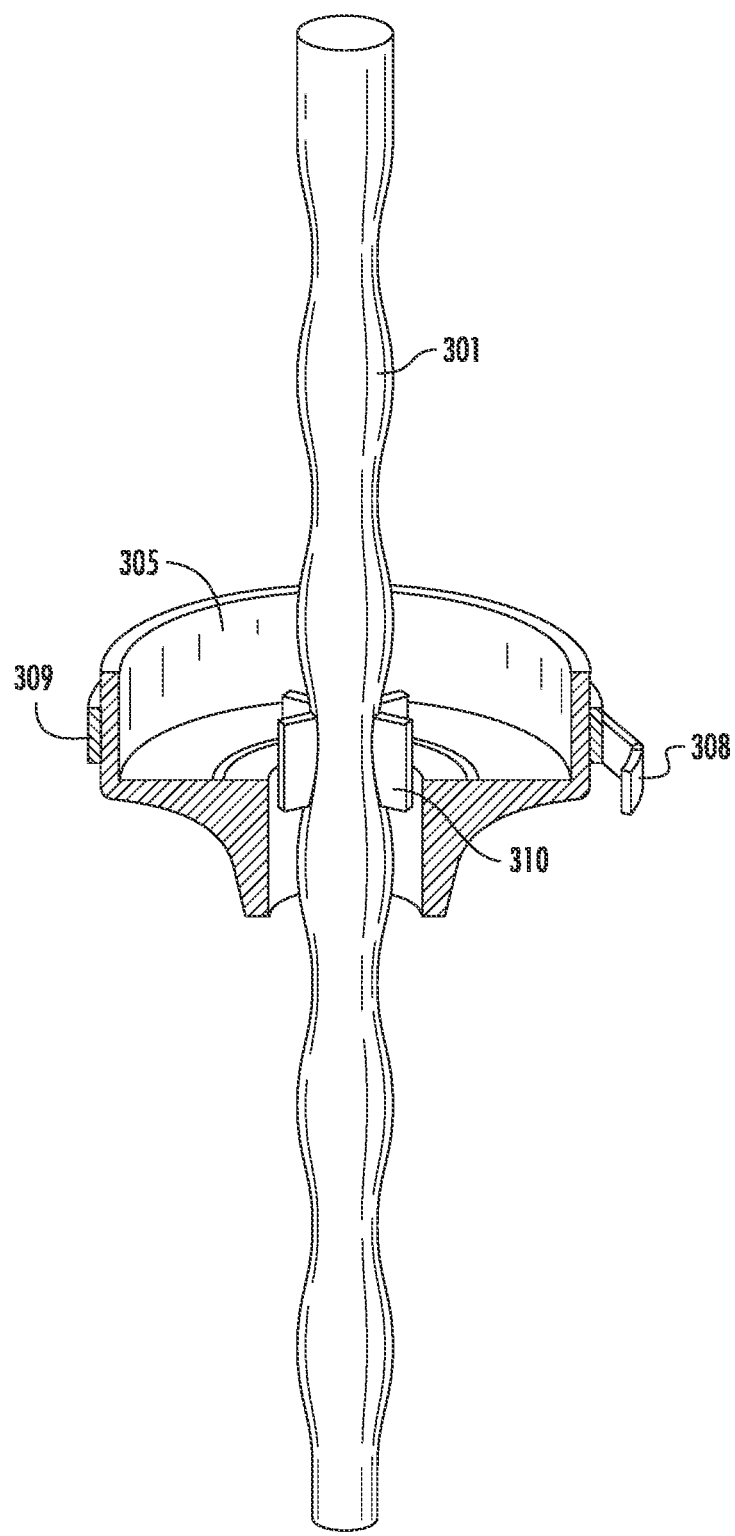
Figure 10:
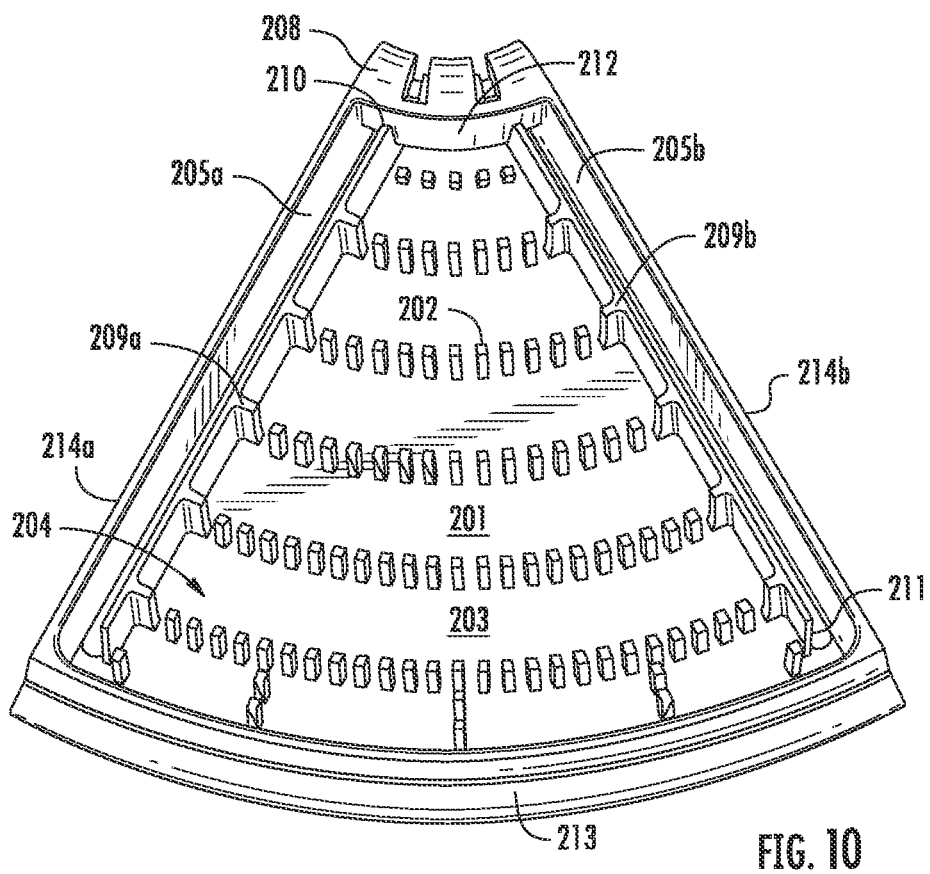
Figure 11:
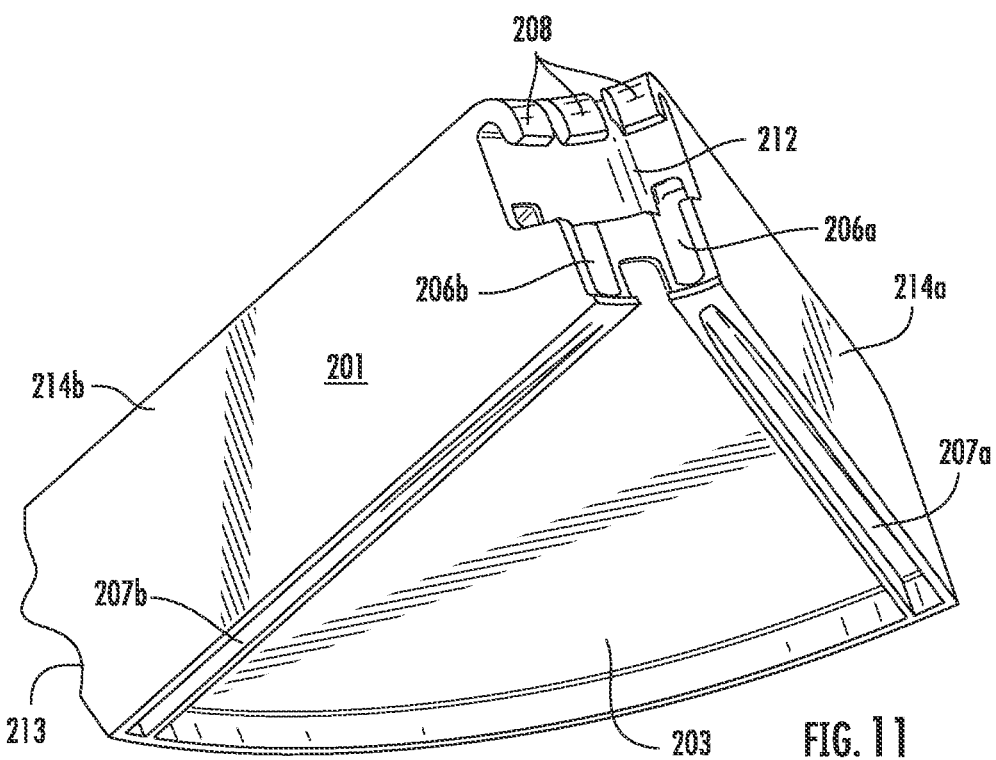
Figure 12:
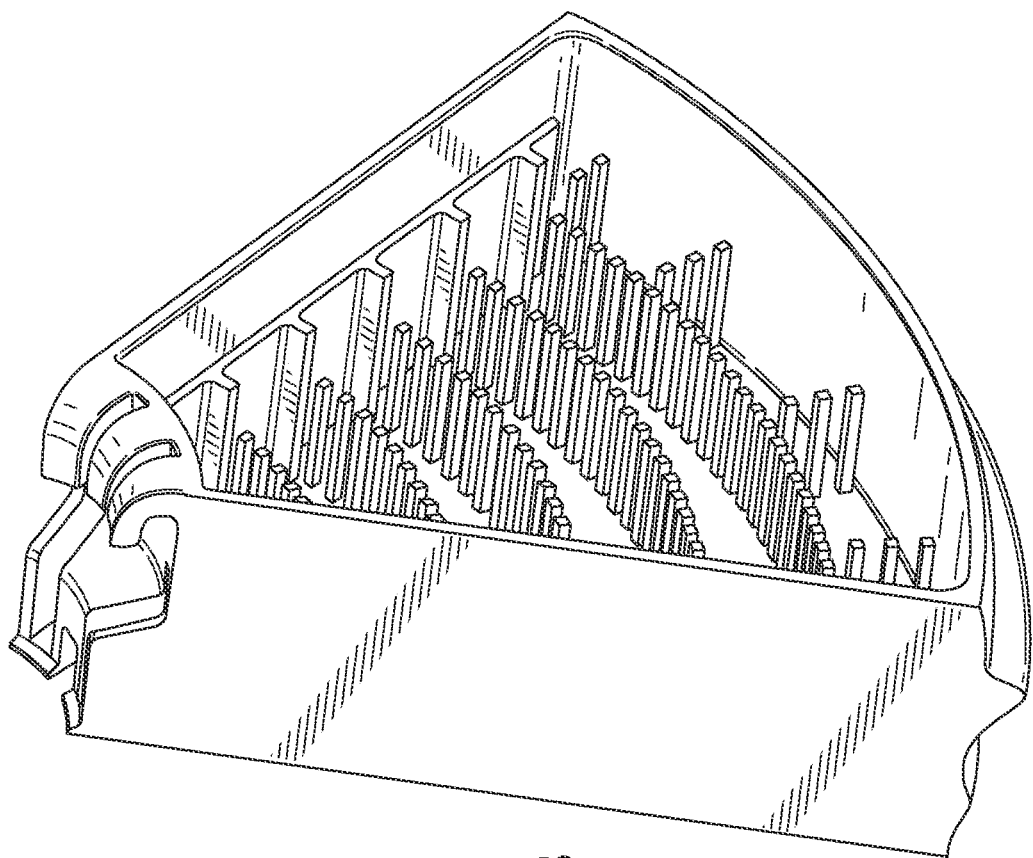
Figure 13:
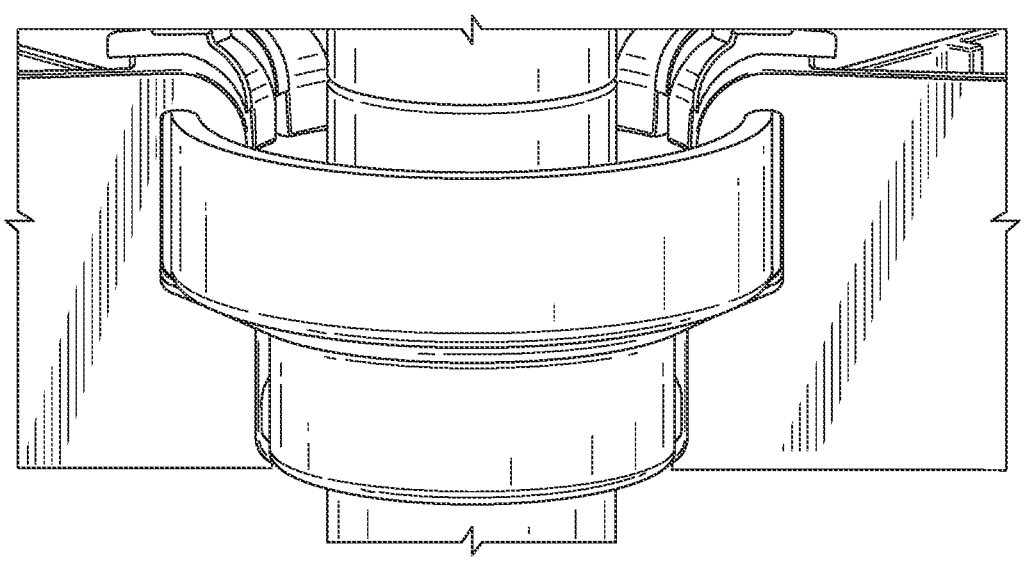
Figure 14:
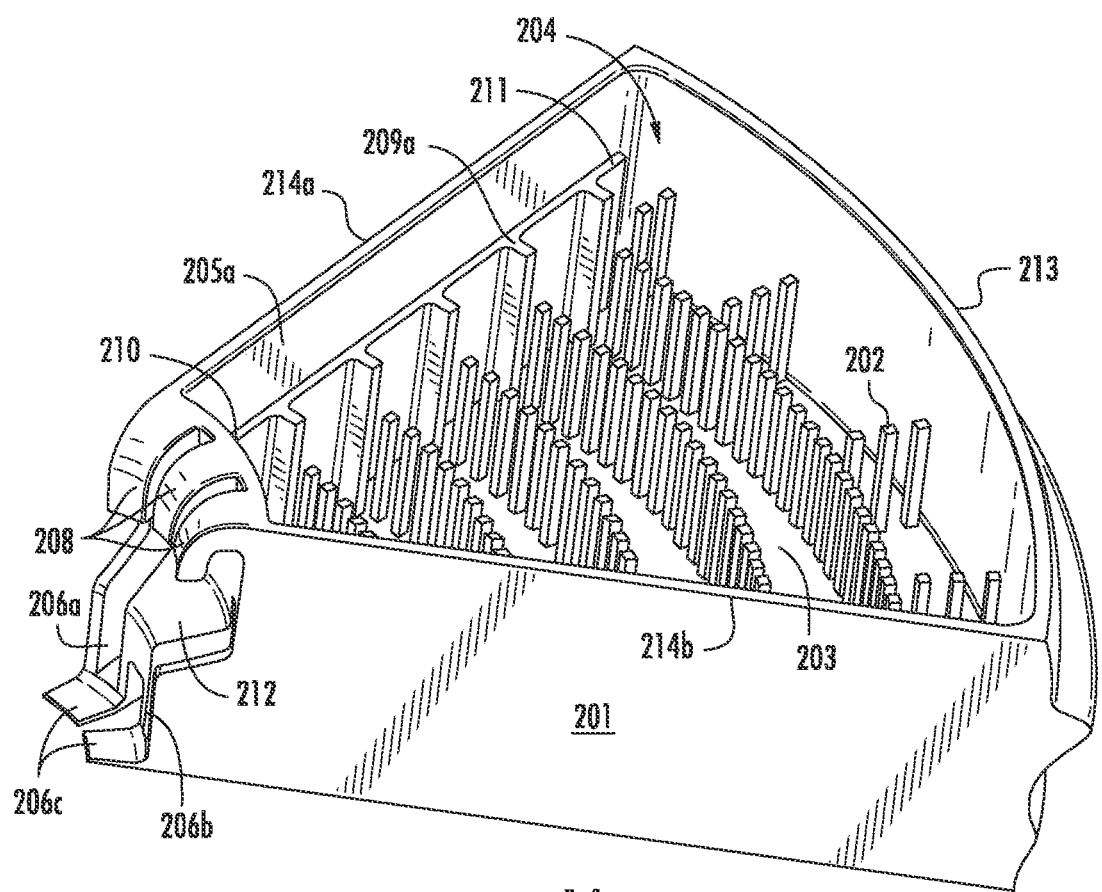
Figure 15:
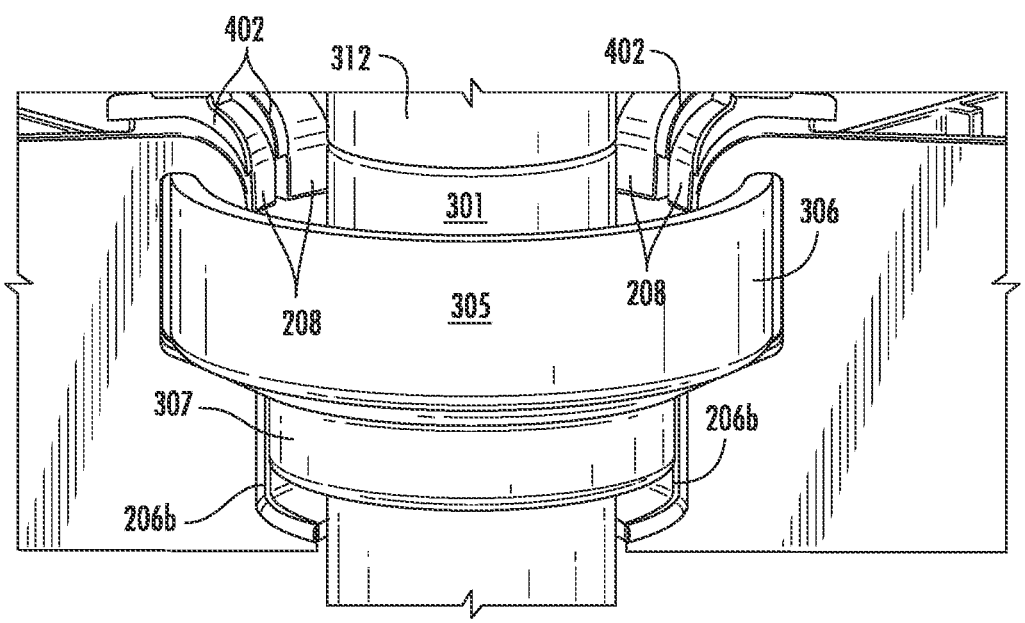
Figure 16:
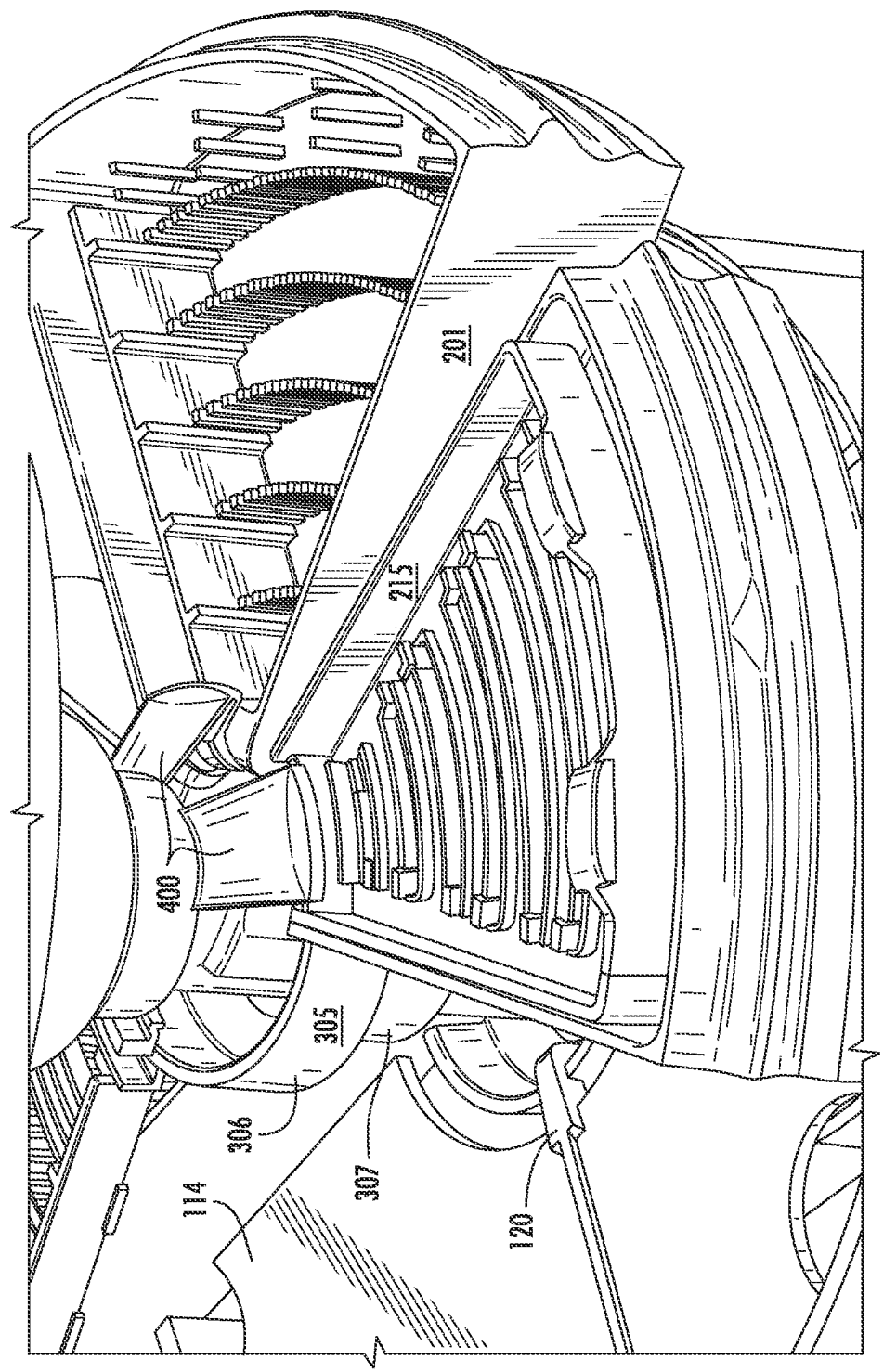
Figure 17:
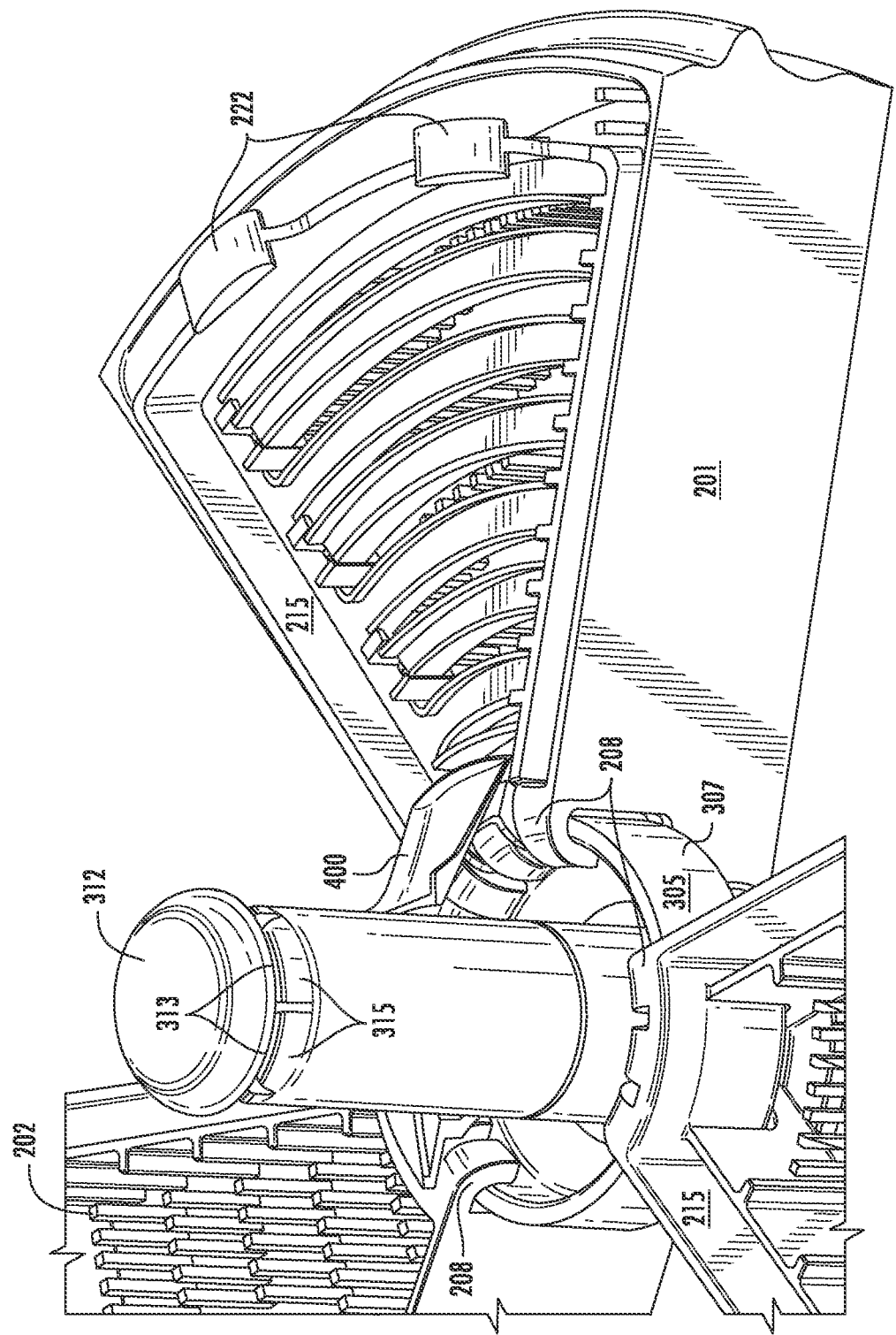
Figure 18:
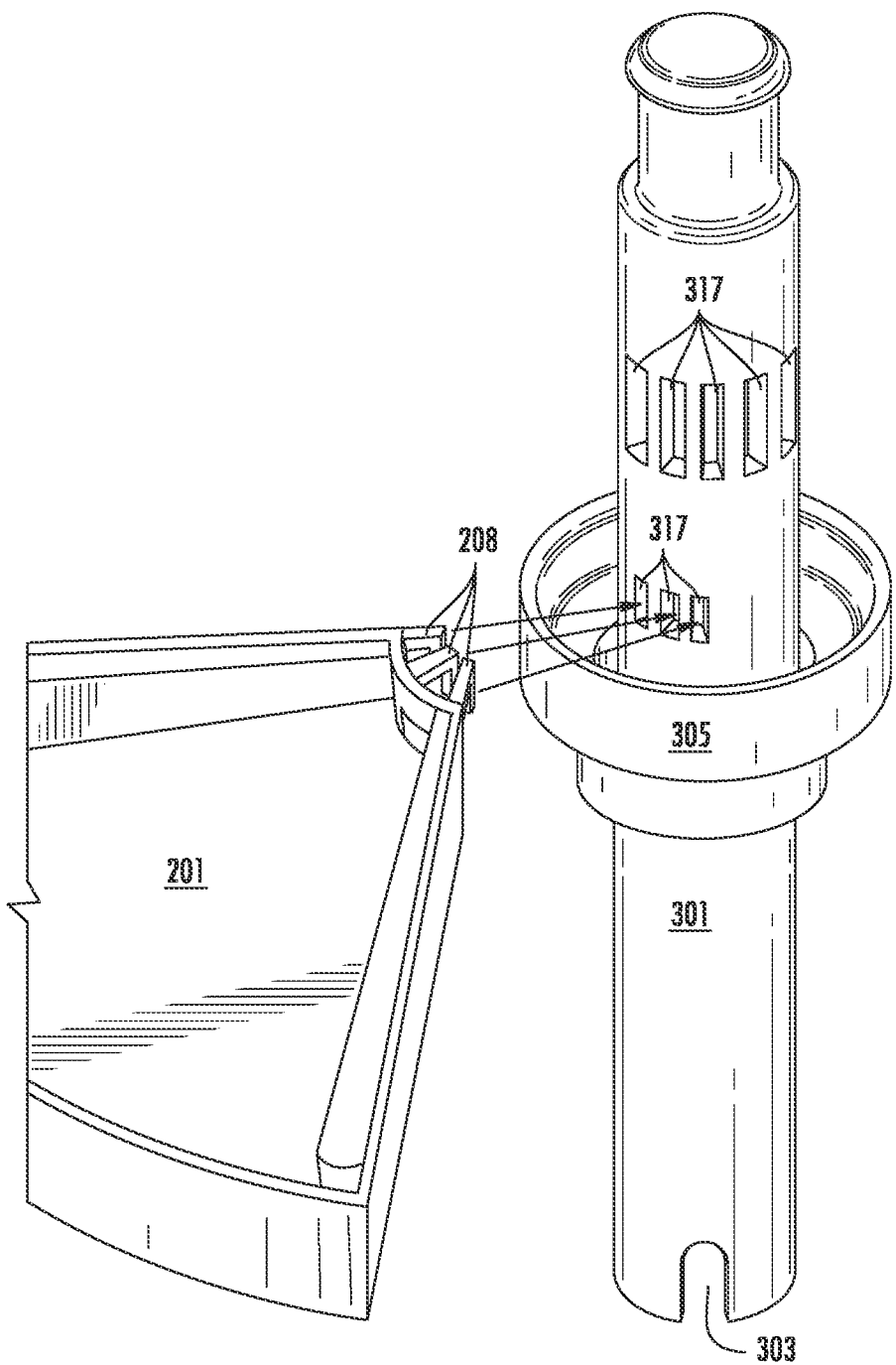
Figure 19:
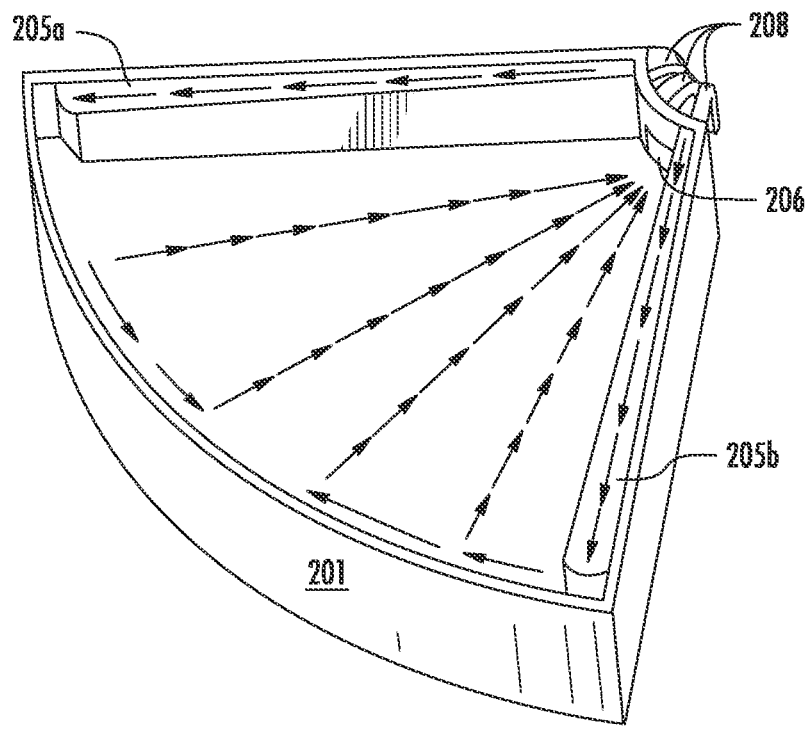
Figure 20:
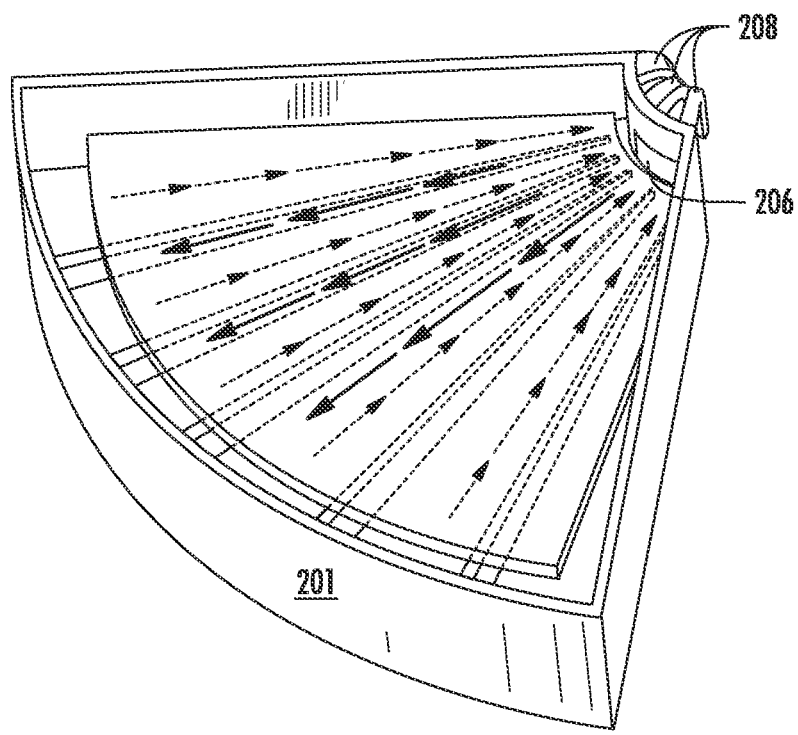
Figure 21:
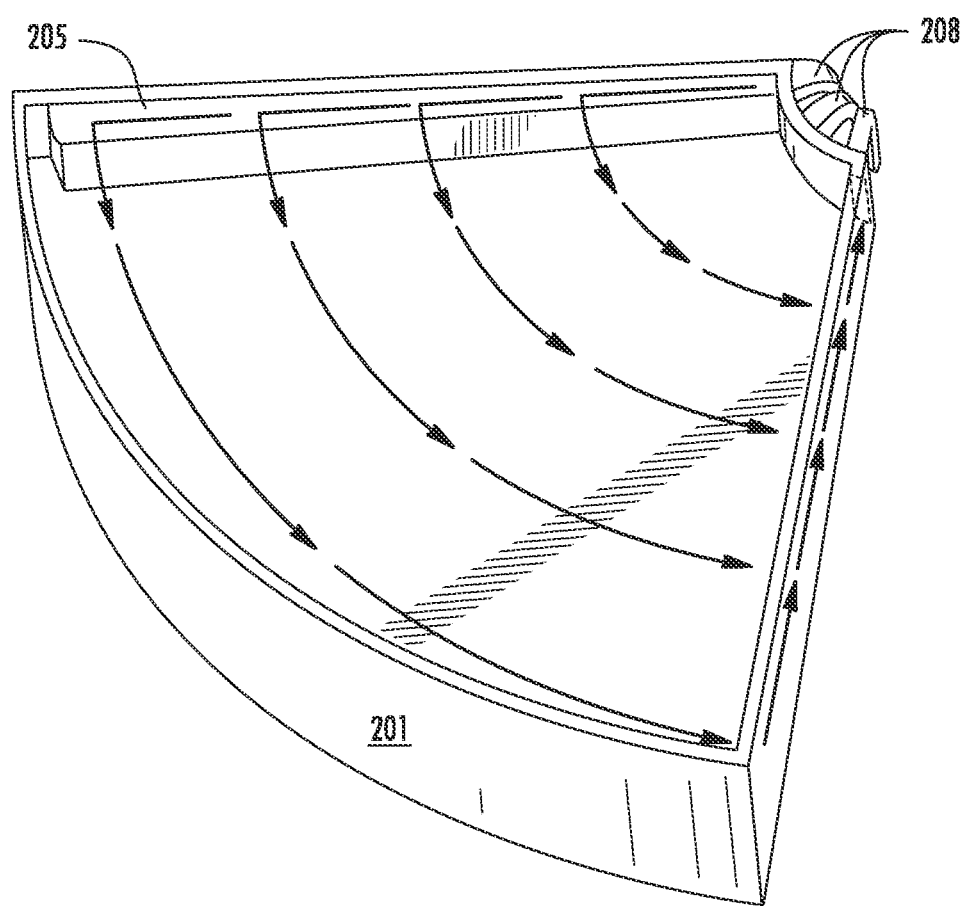
Figure 22:
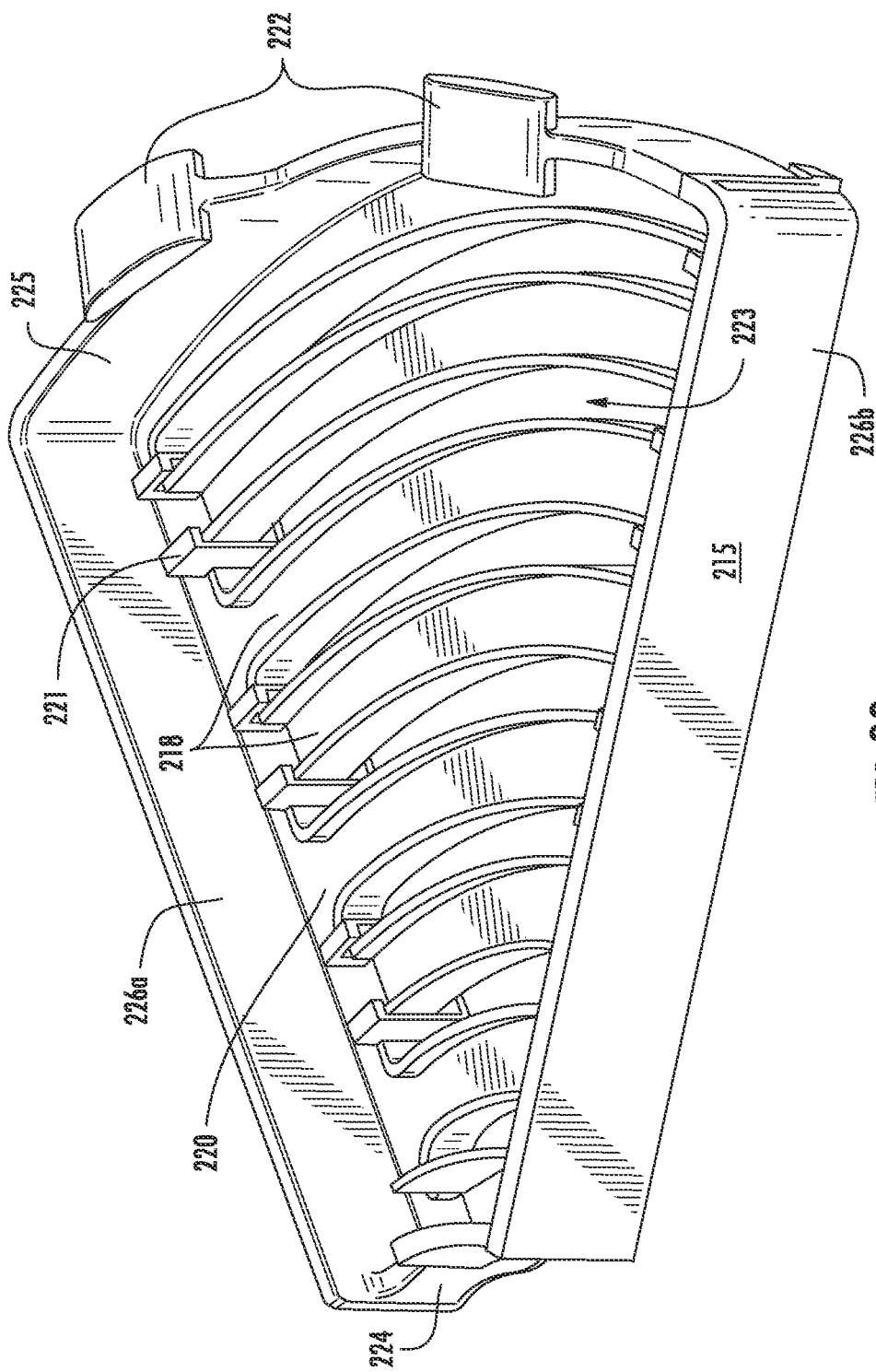
Figure 23:
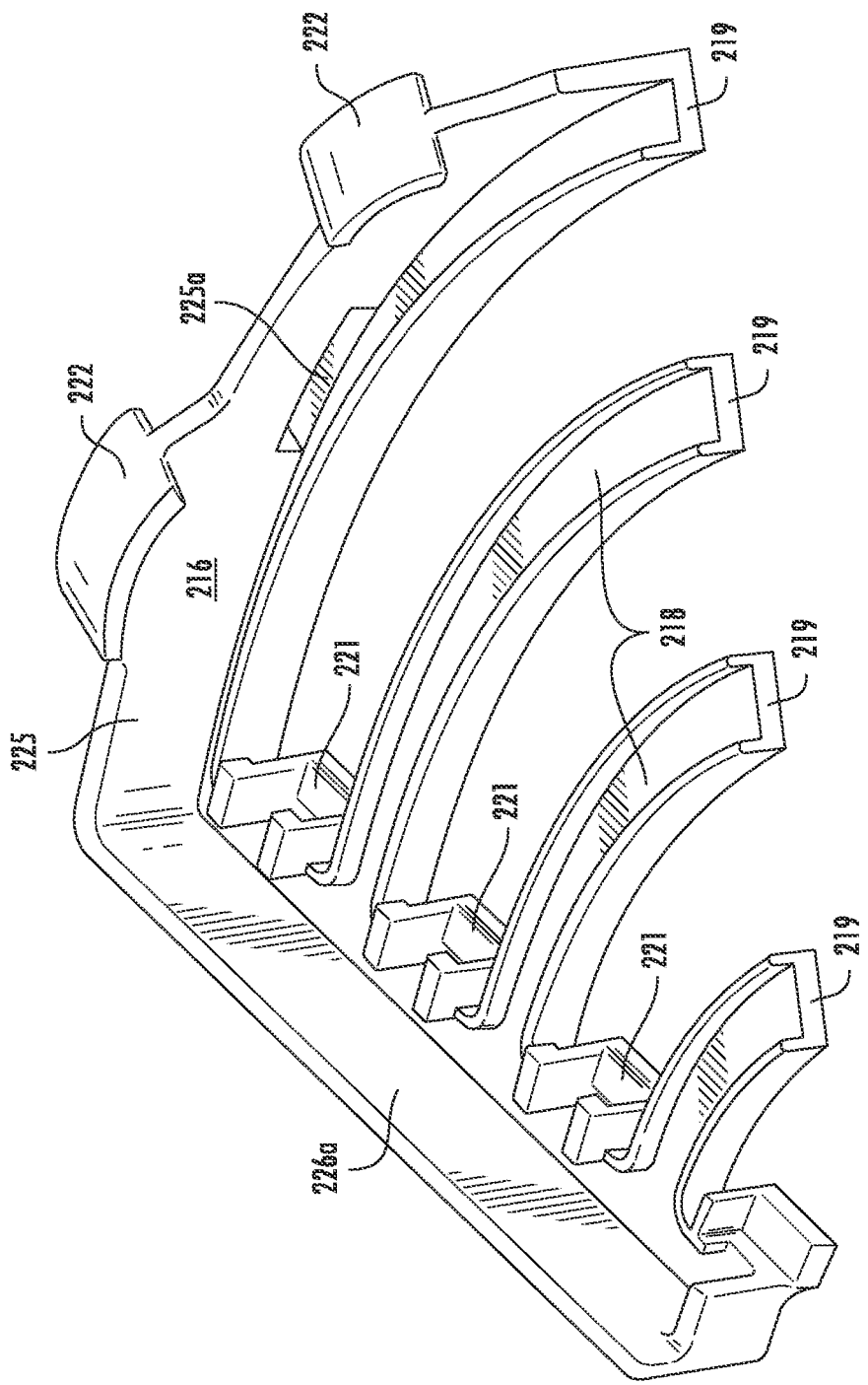
Figure 24:
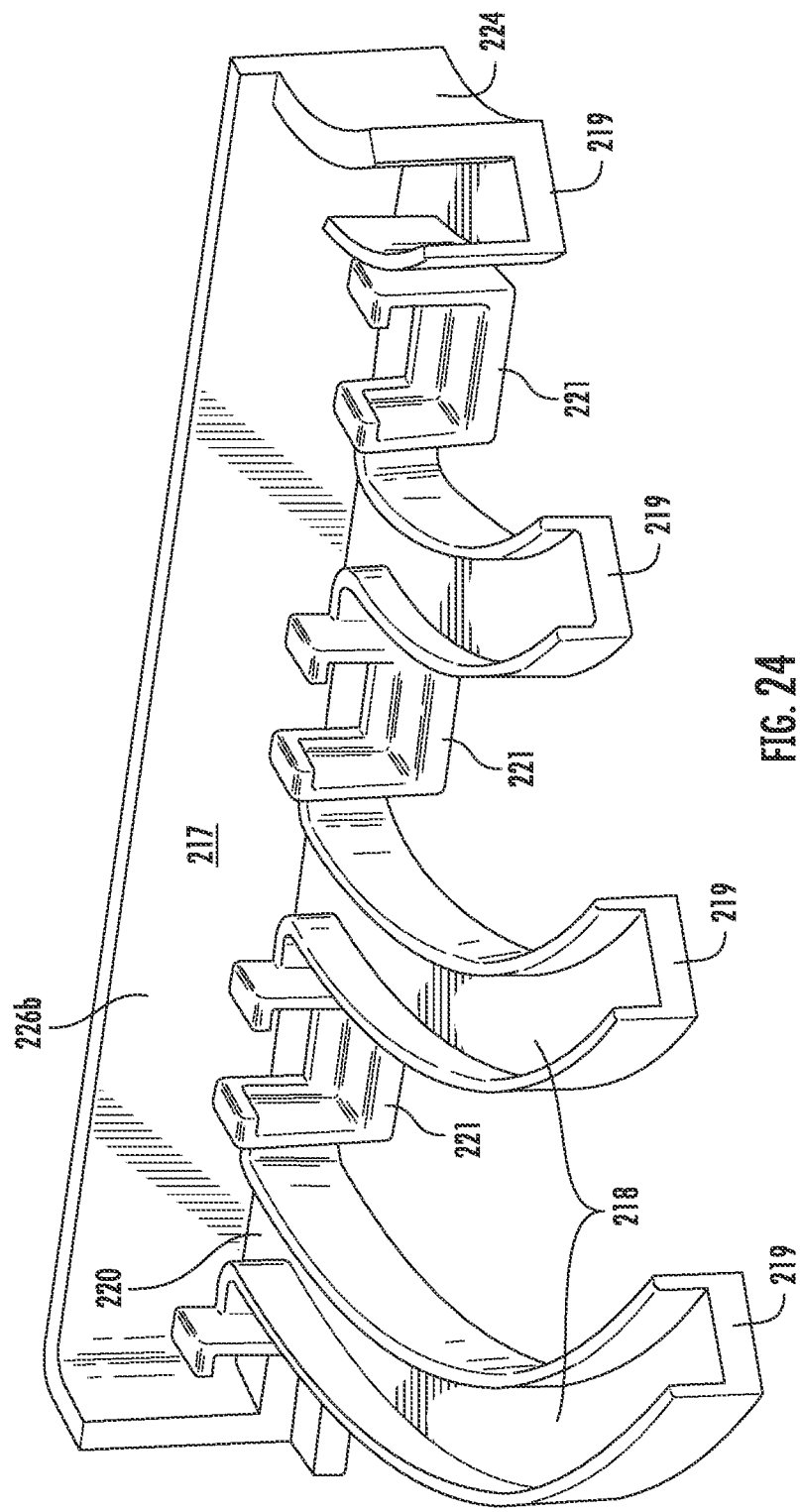
Figure 25:
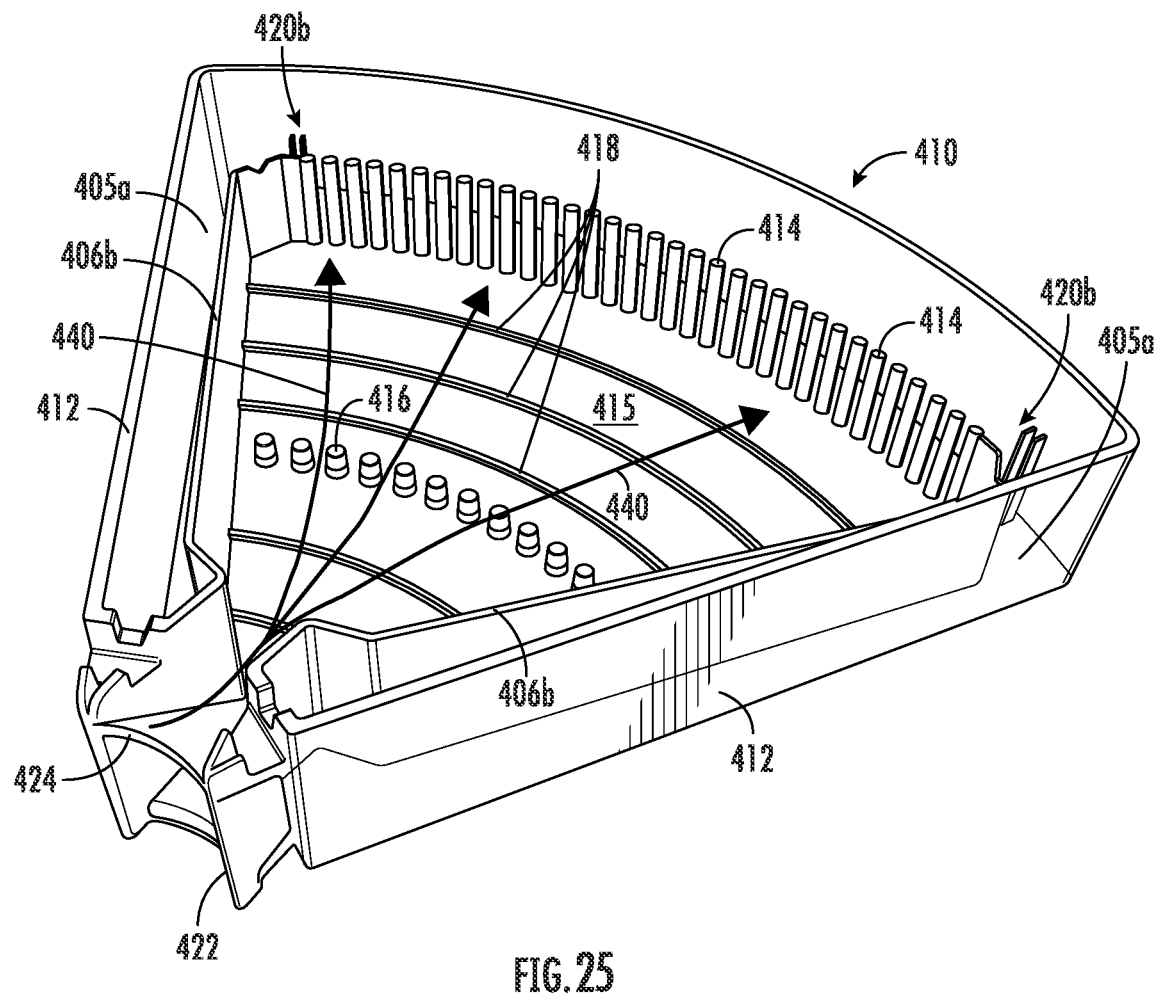
Figure 26:
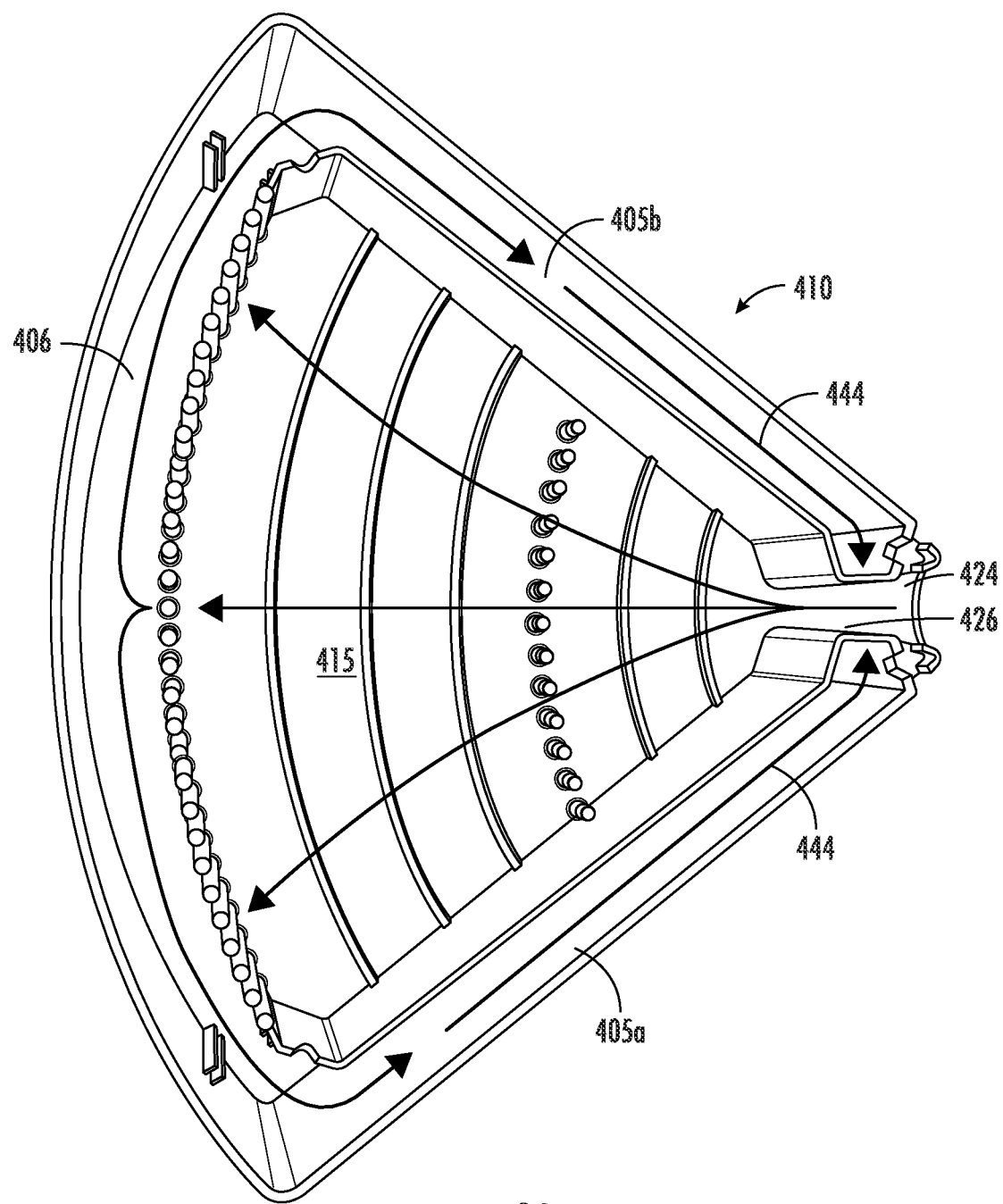
Figure 27:
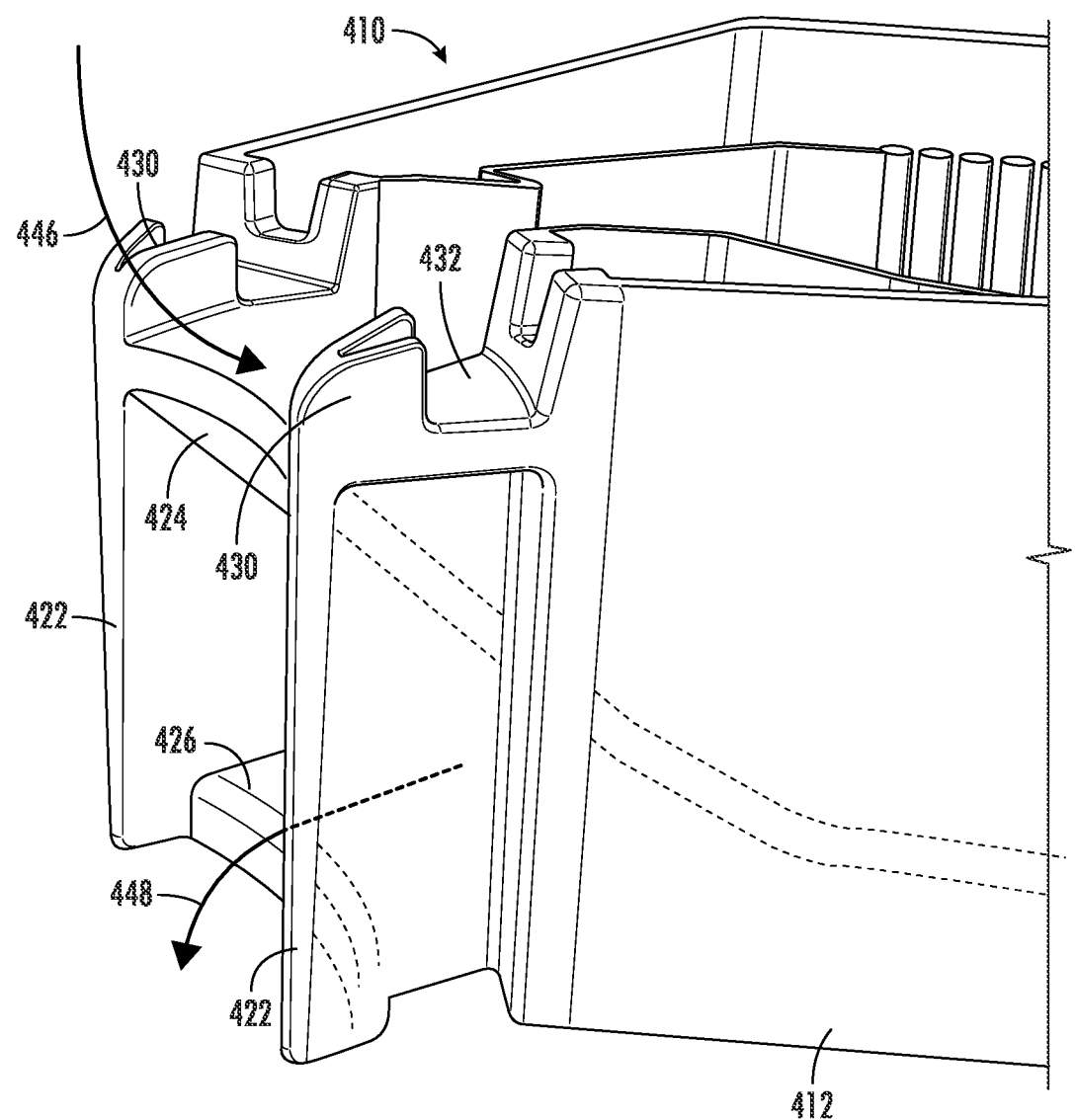
Figure 28:
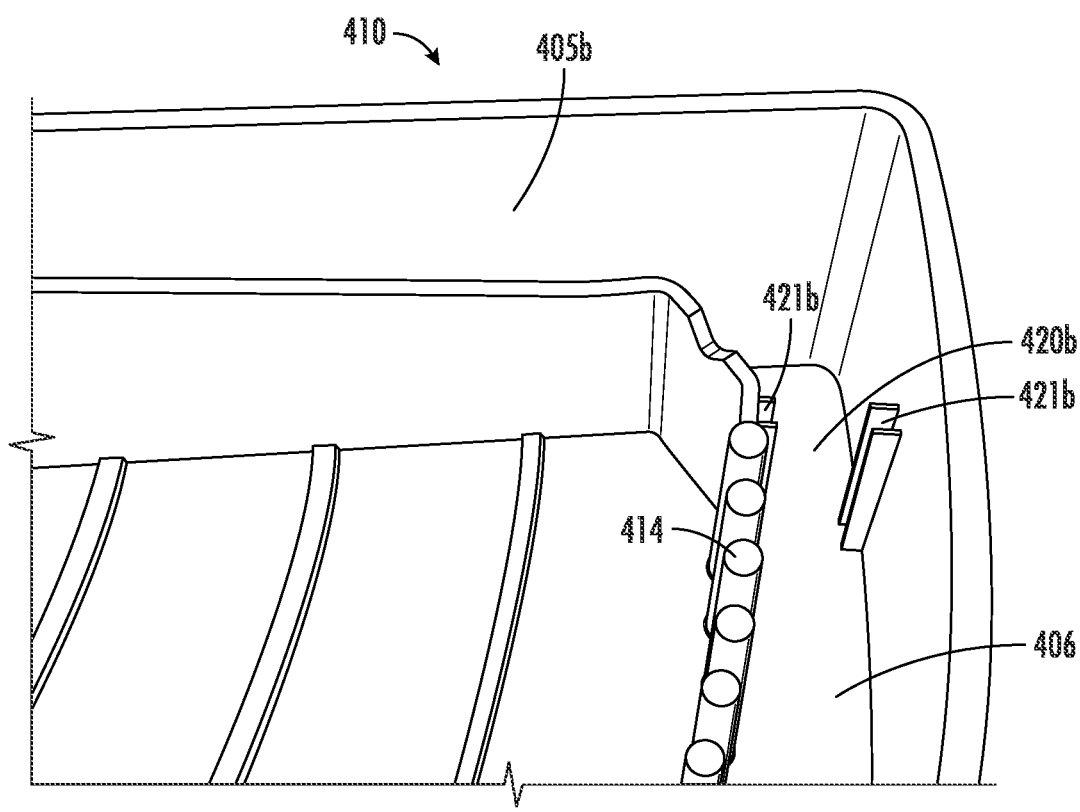
Figure 29:
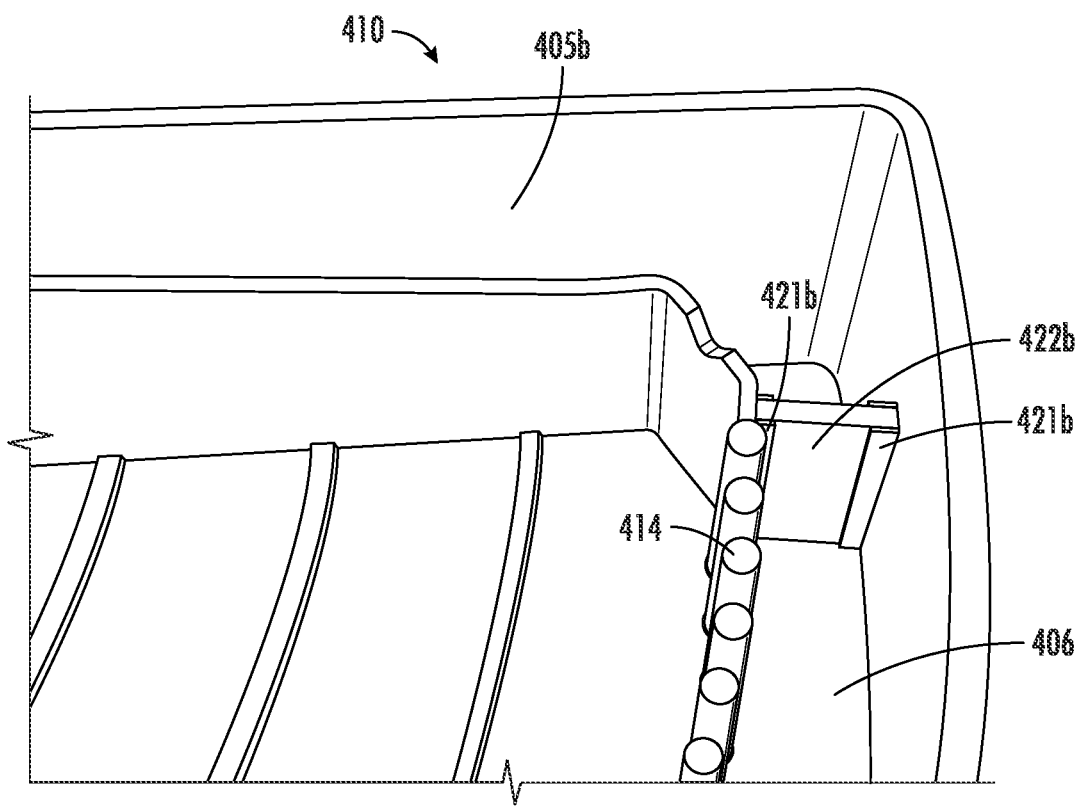
Figure 30:
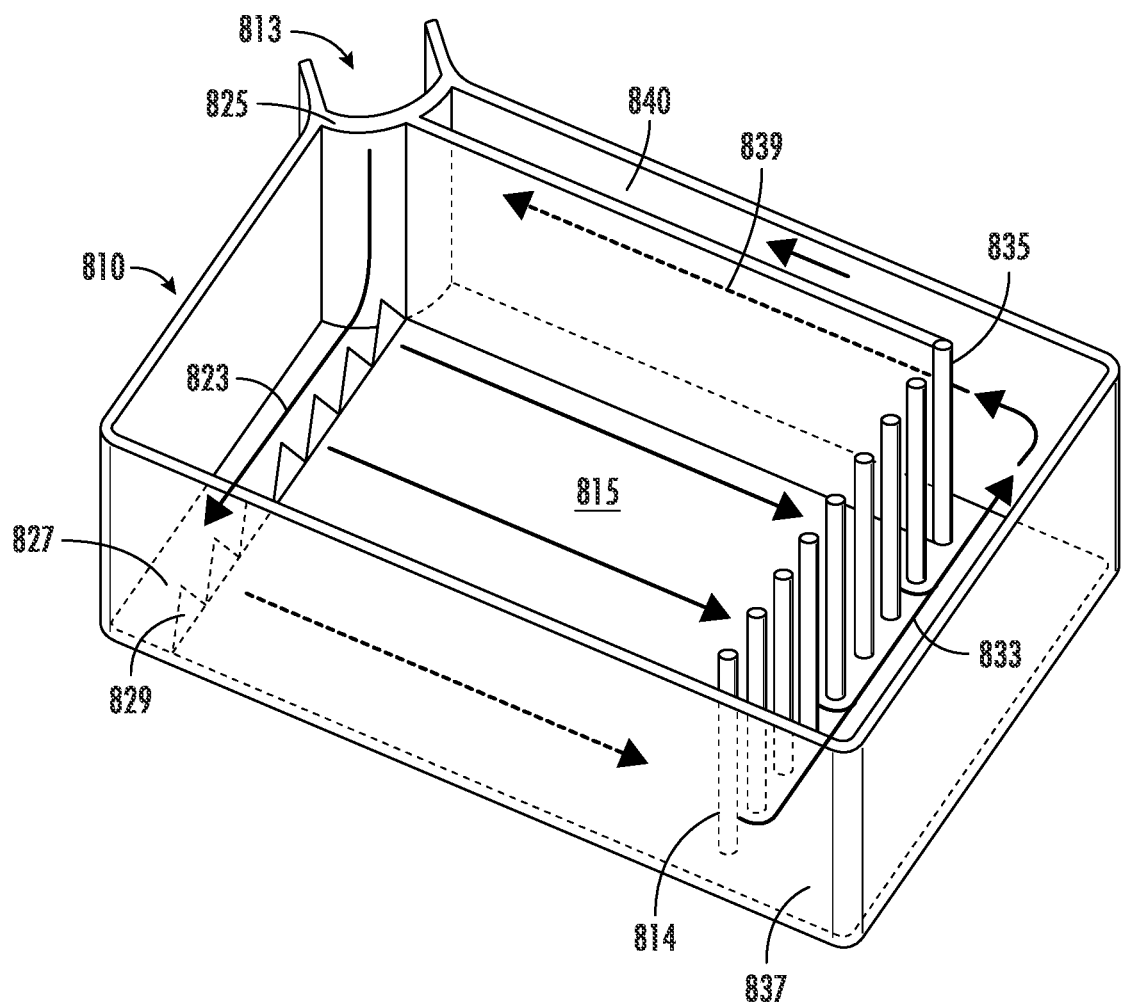
Figure 31:
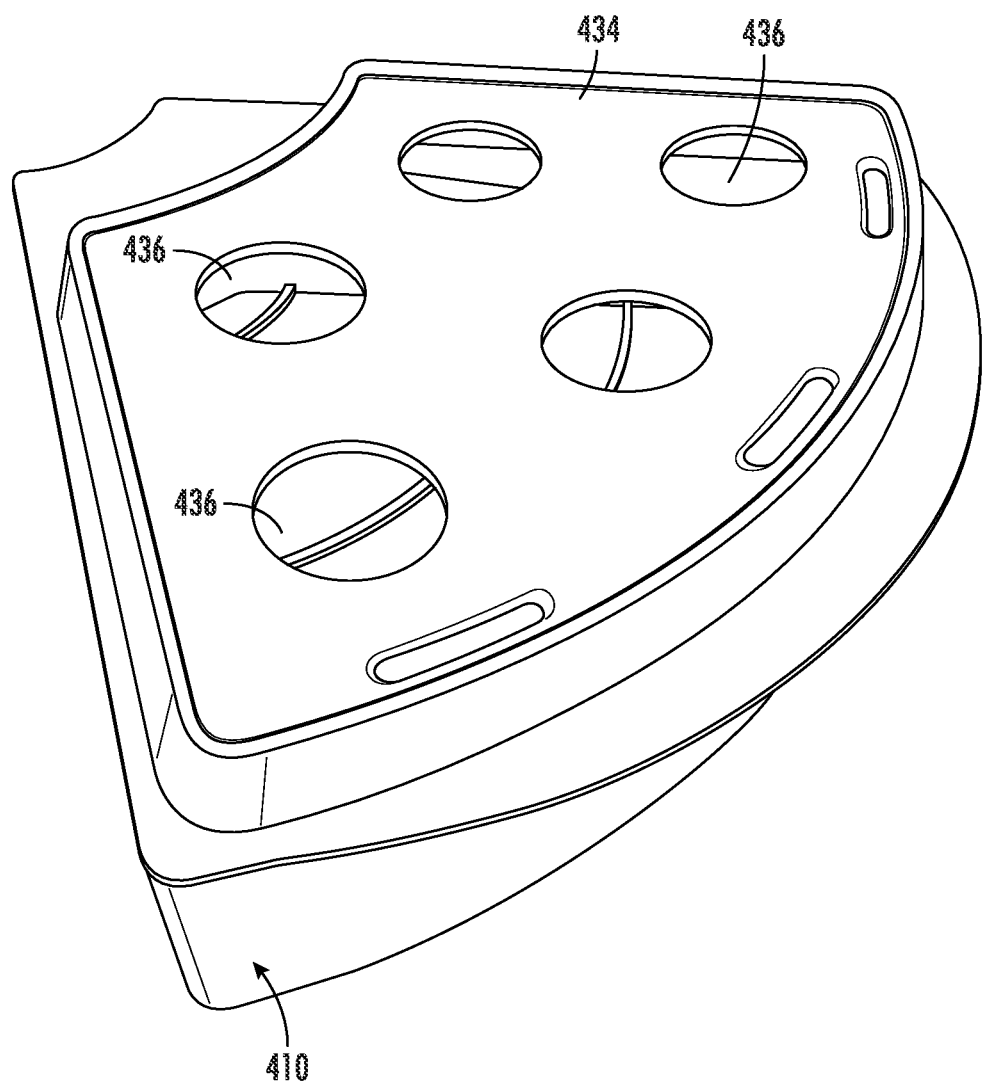
Figure 32:
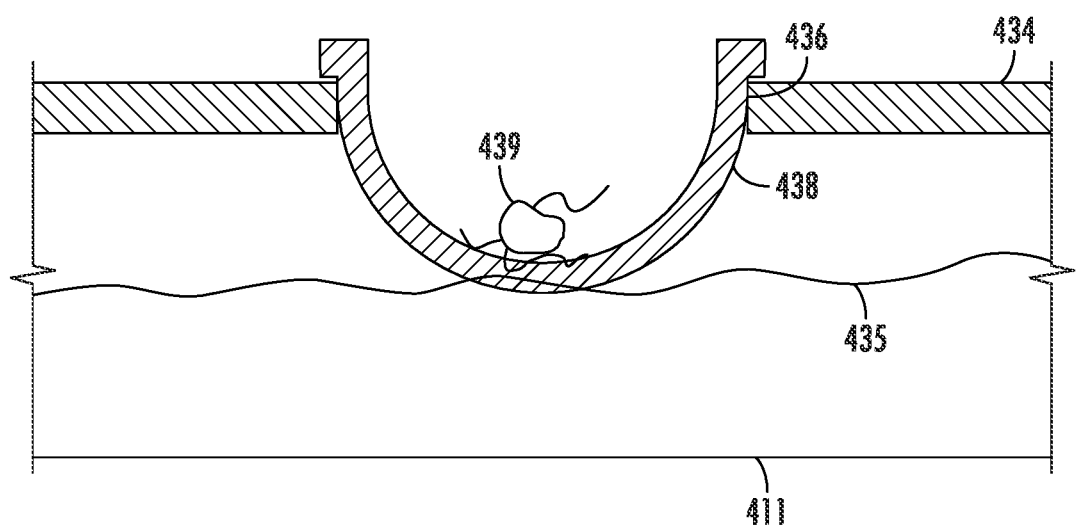
Figure 33:
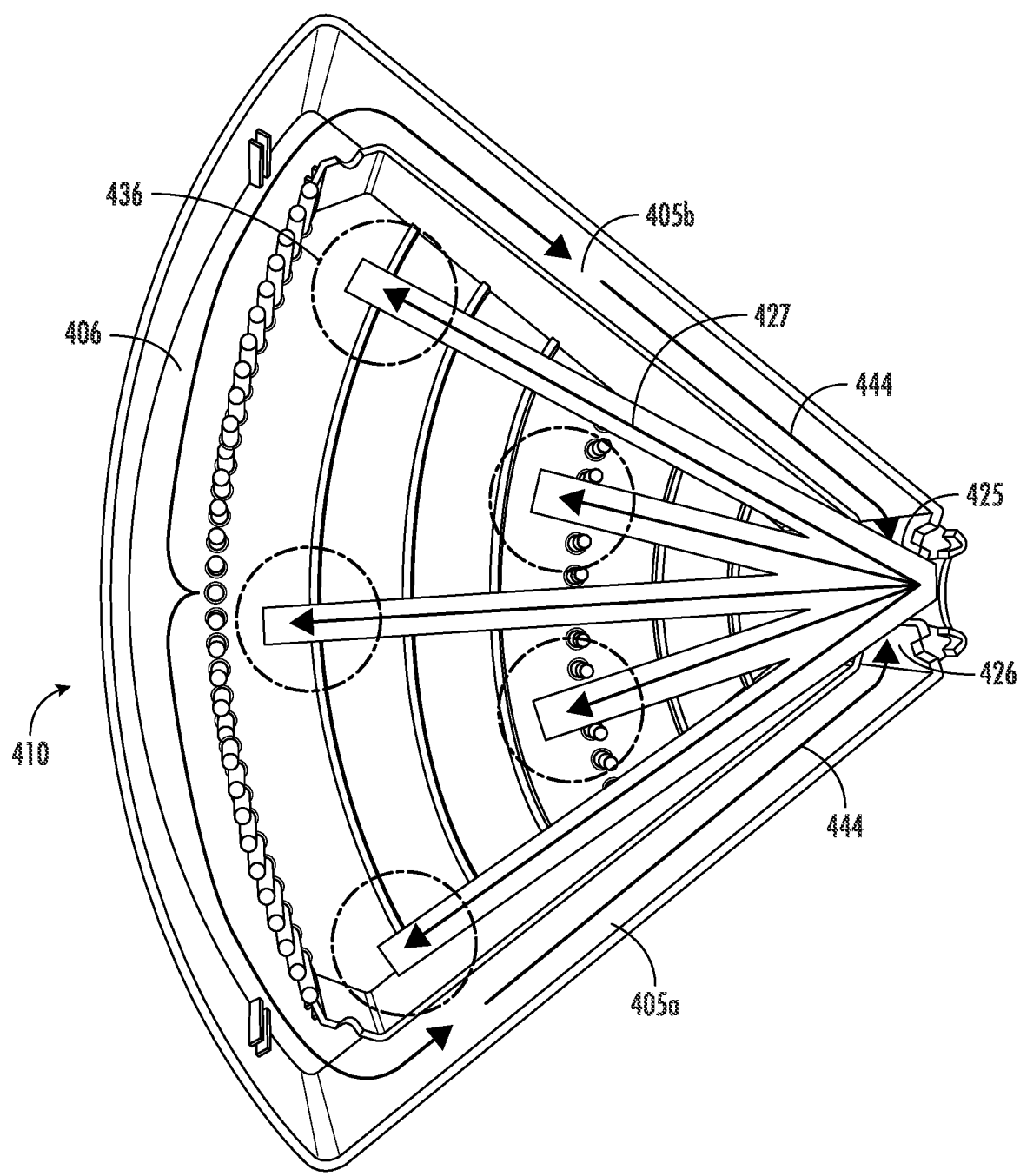
Figure 34:
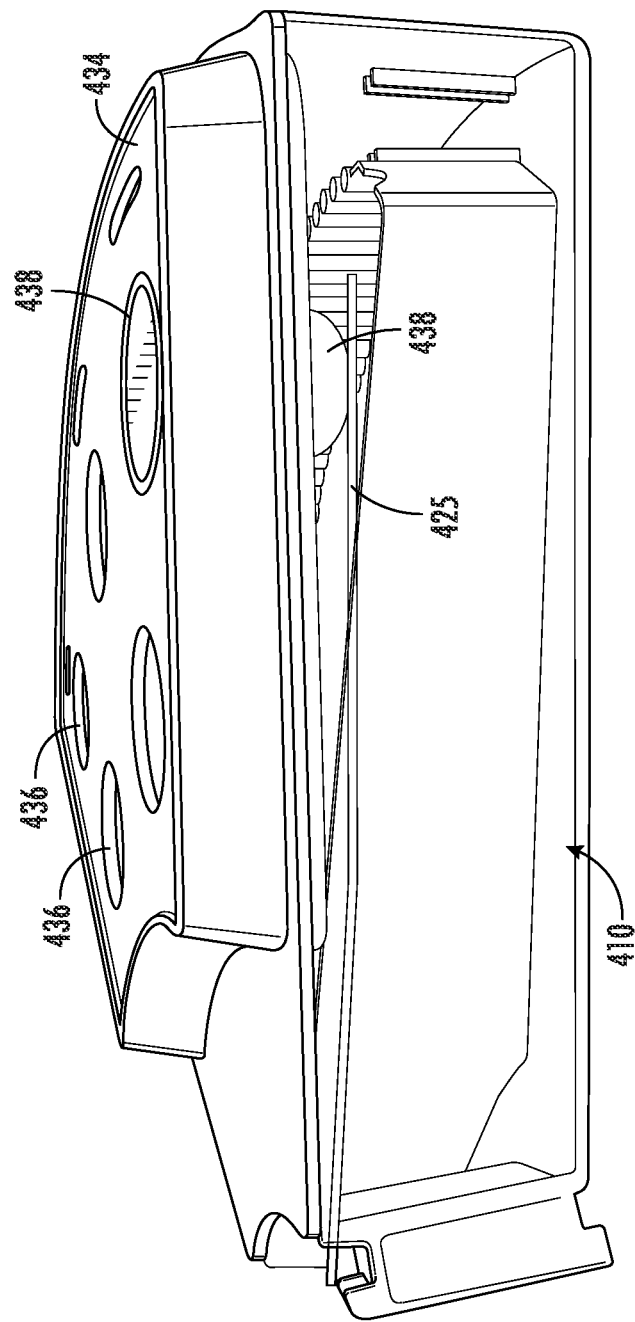
Figure 35:
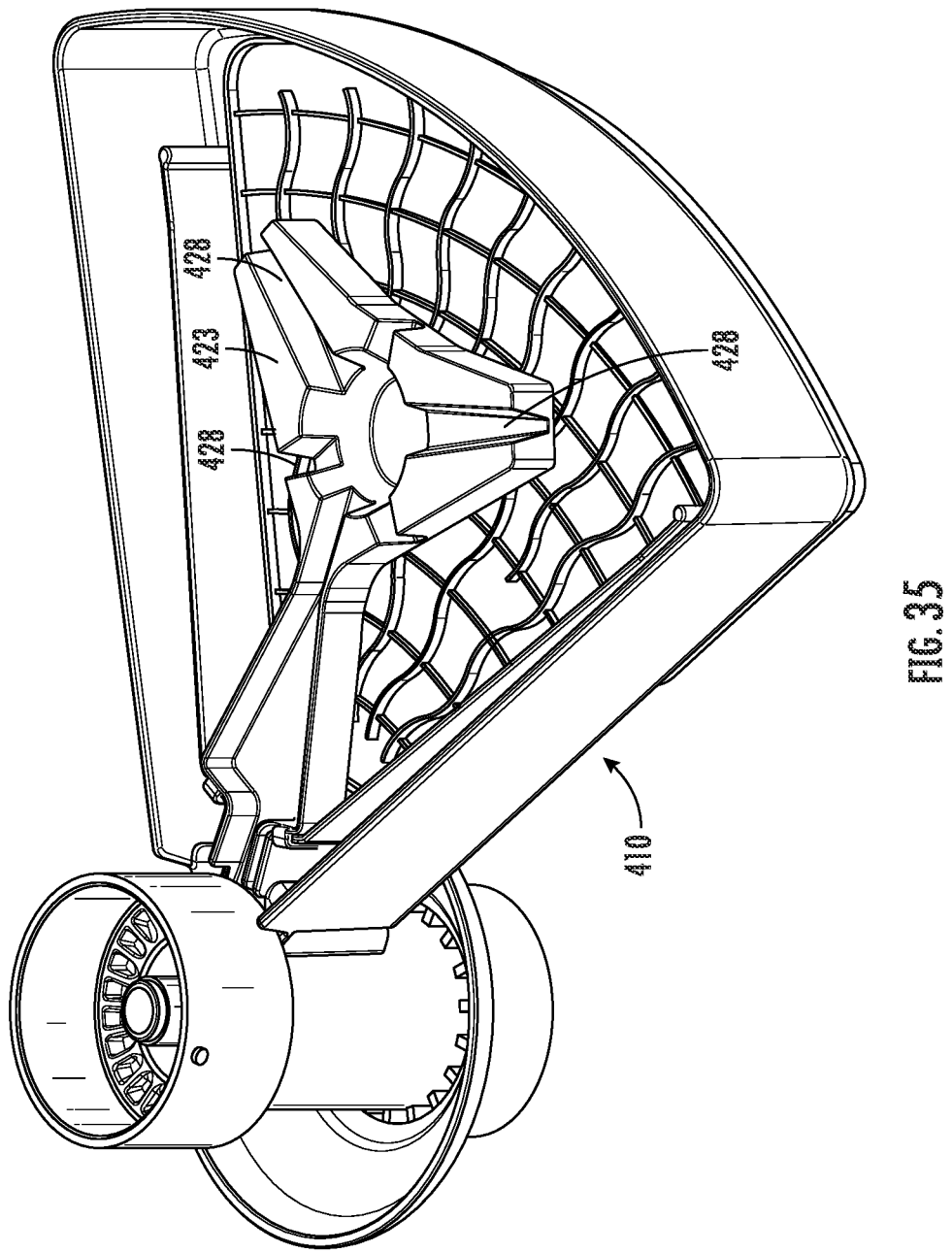
Figure 36:
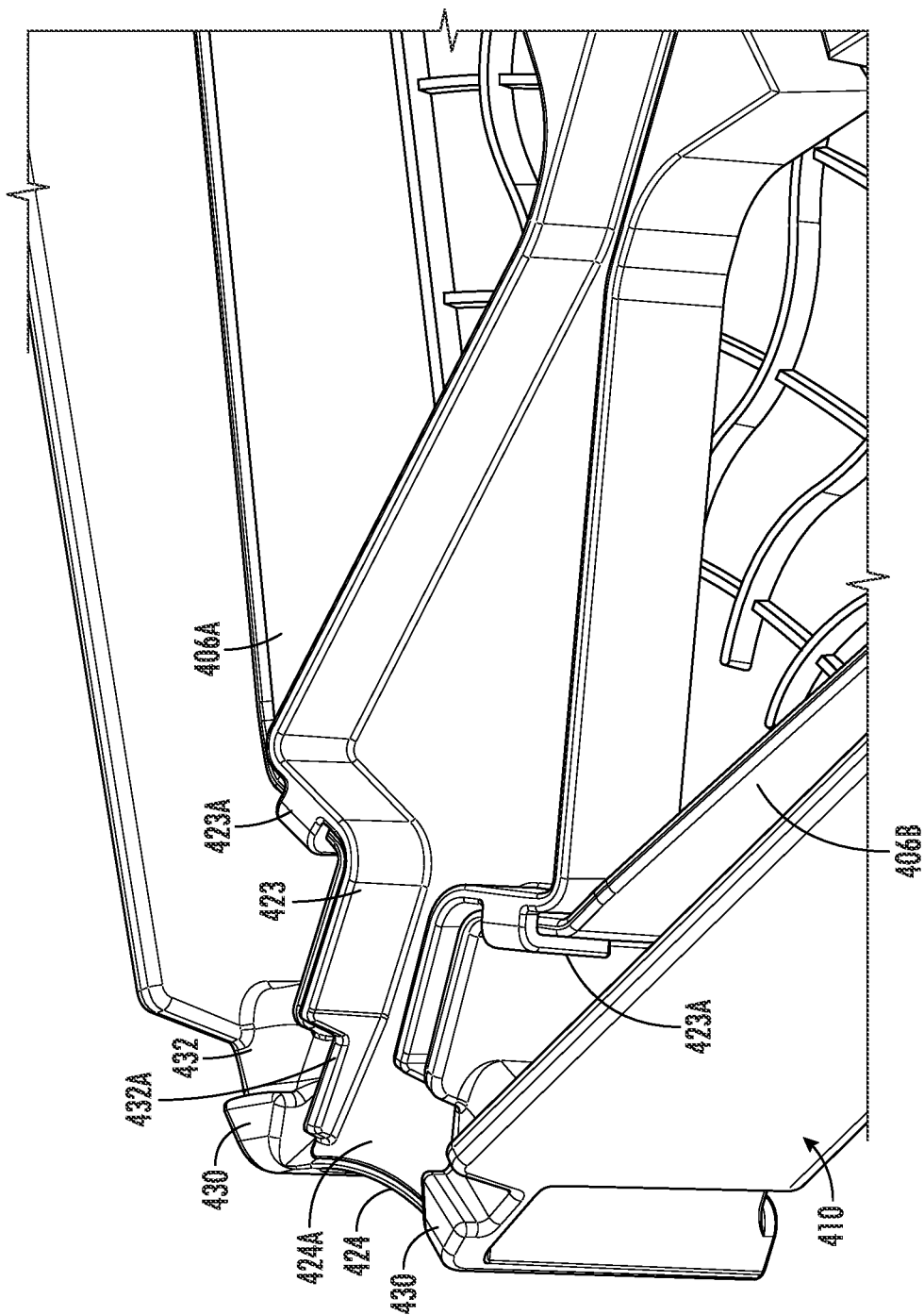
Figure 37:
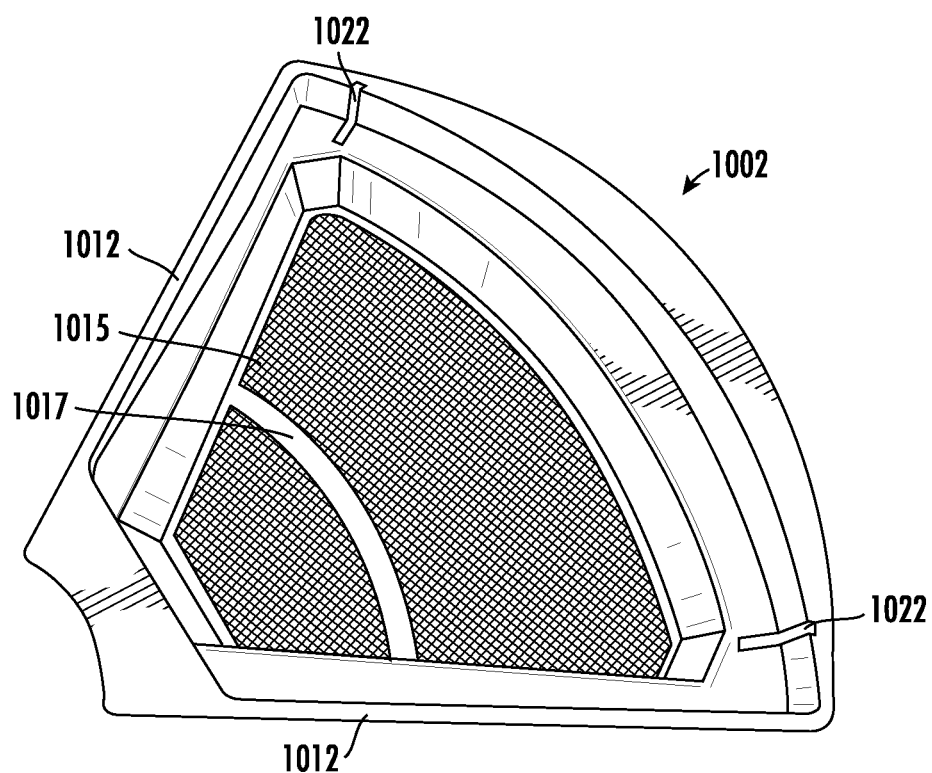
Figure 38:
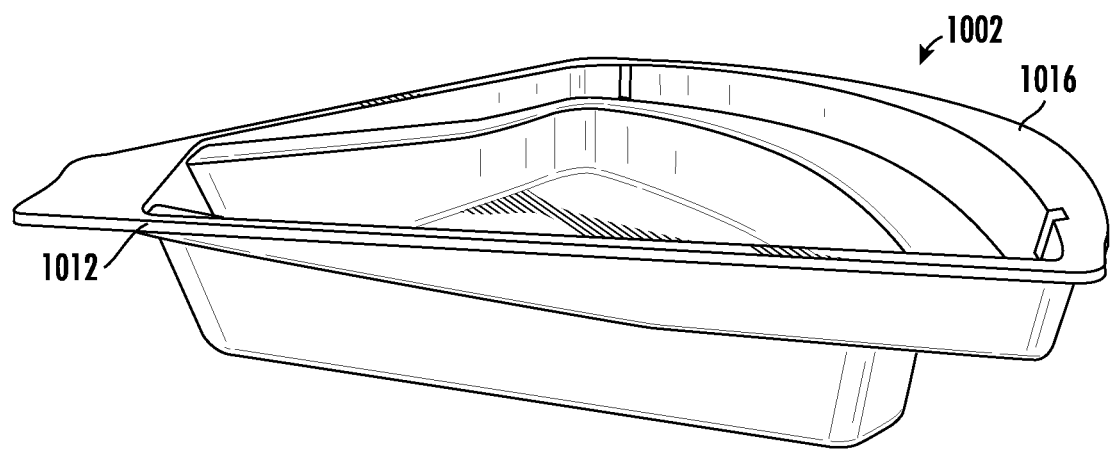
Figure 39:
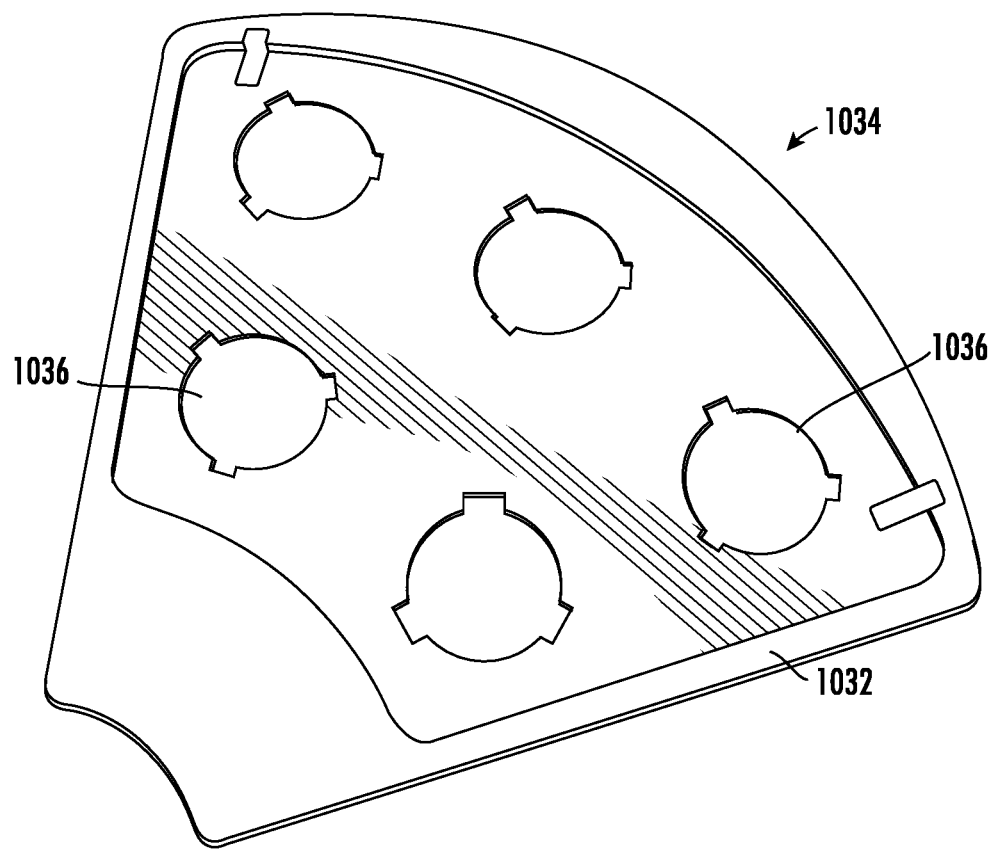
Figure 40:
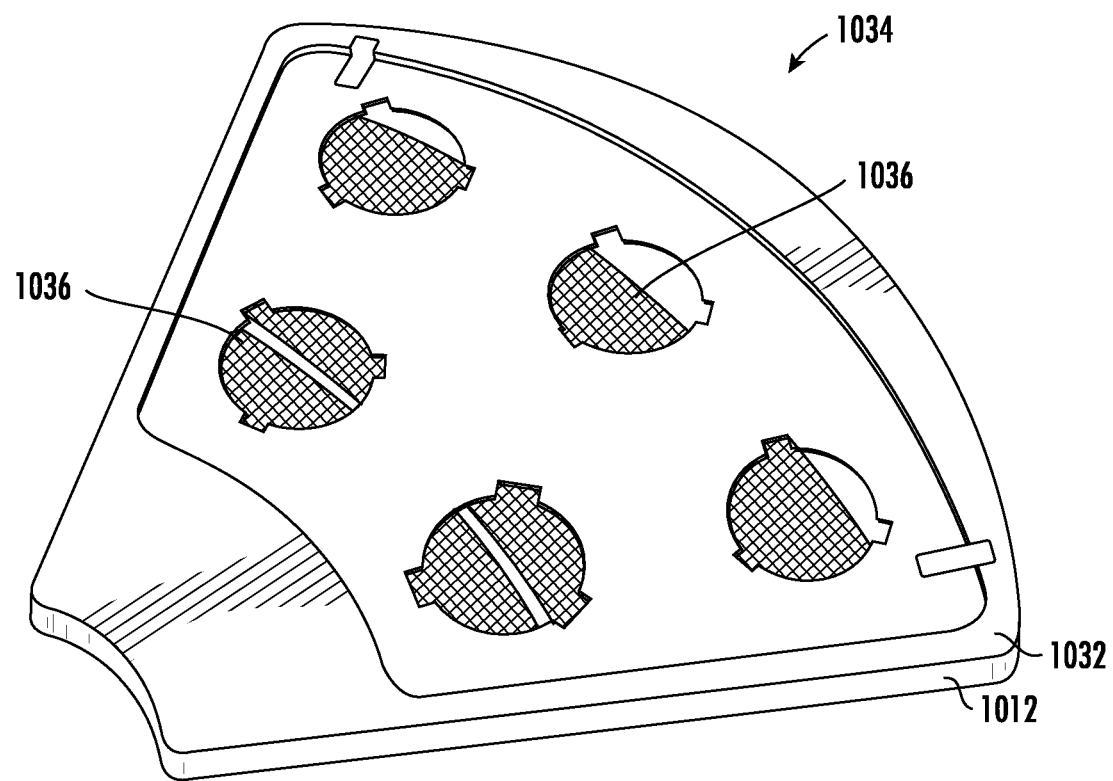
Figure 41:
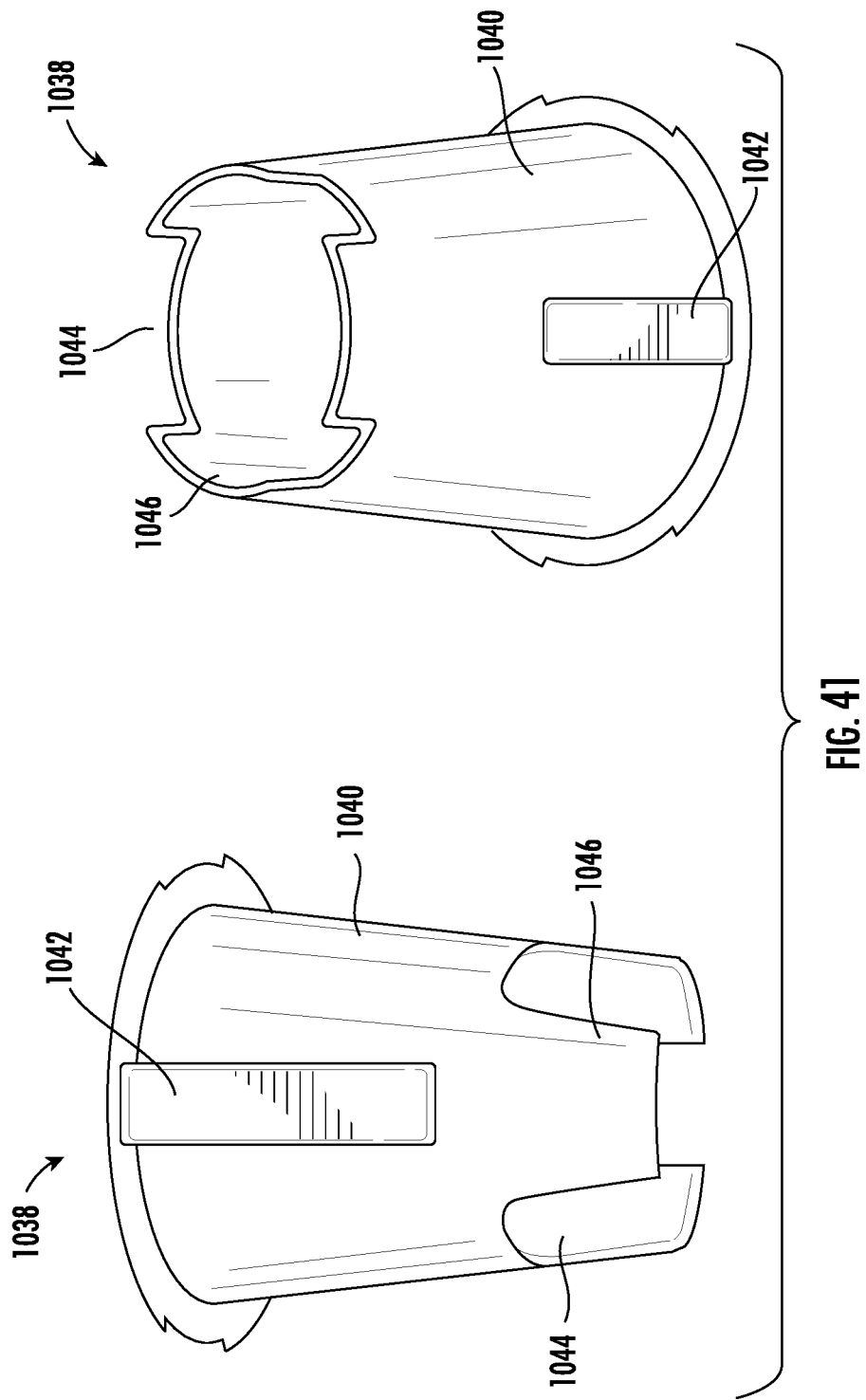
Figure 42:
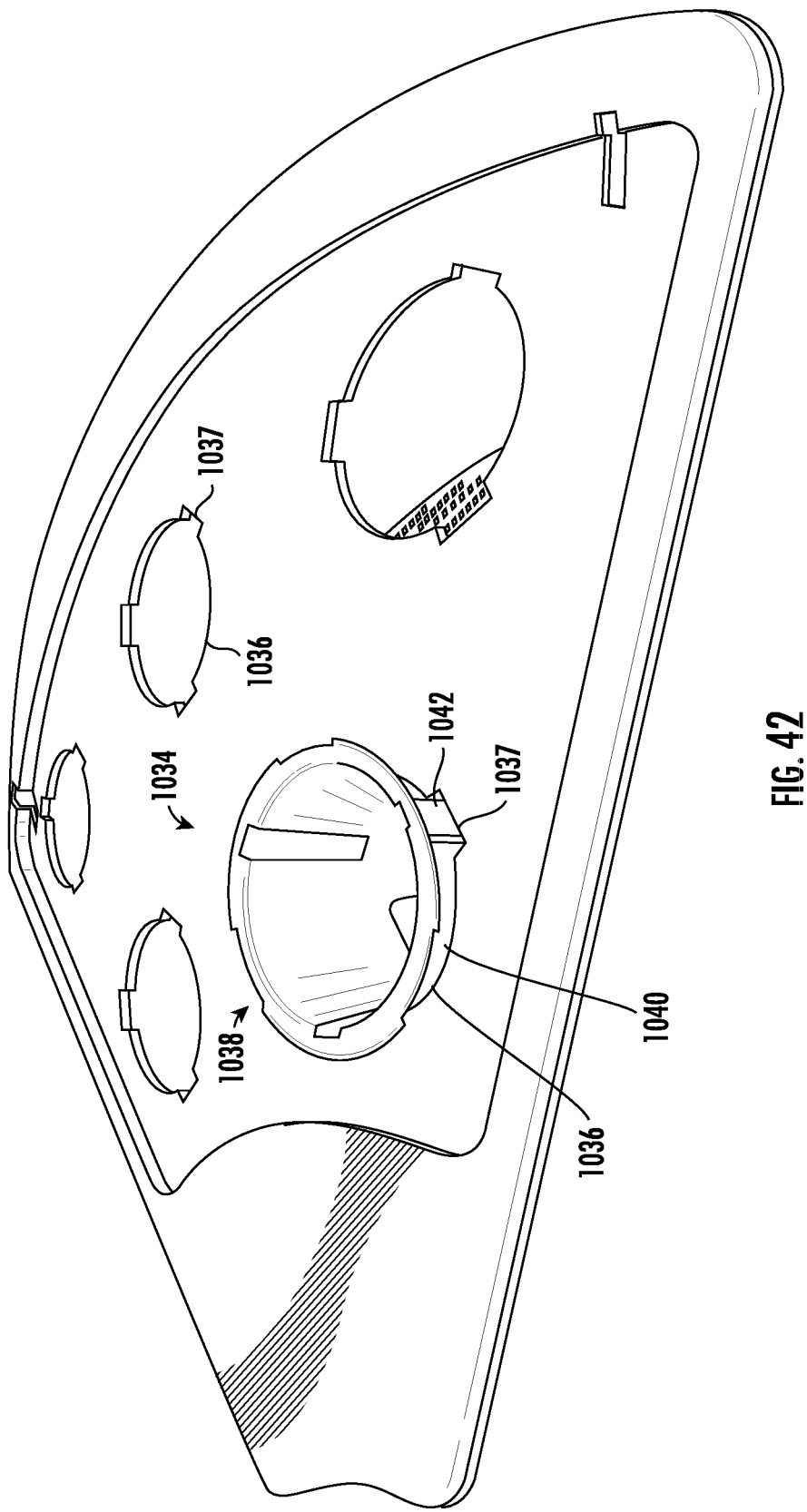
Figure 43:
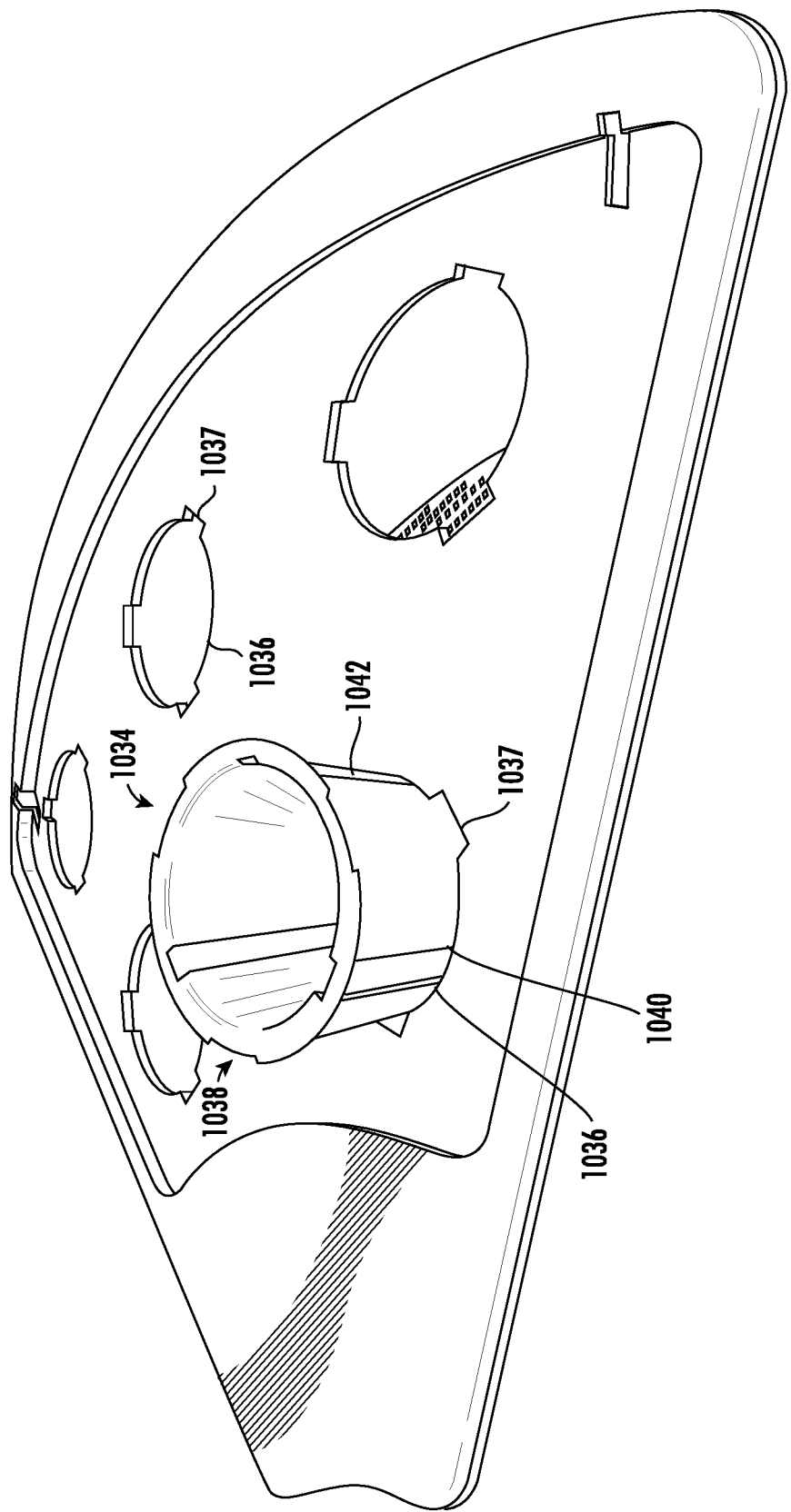
Figure 44:
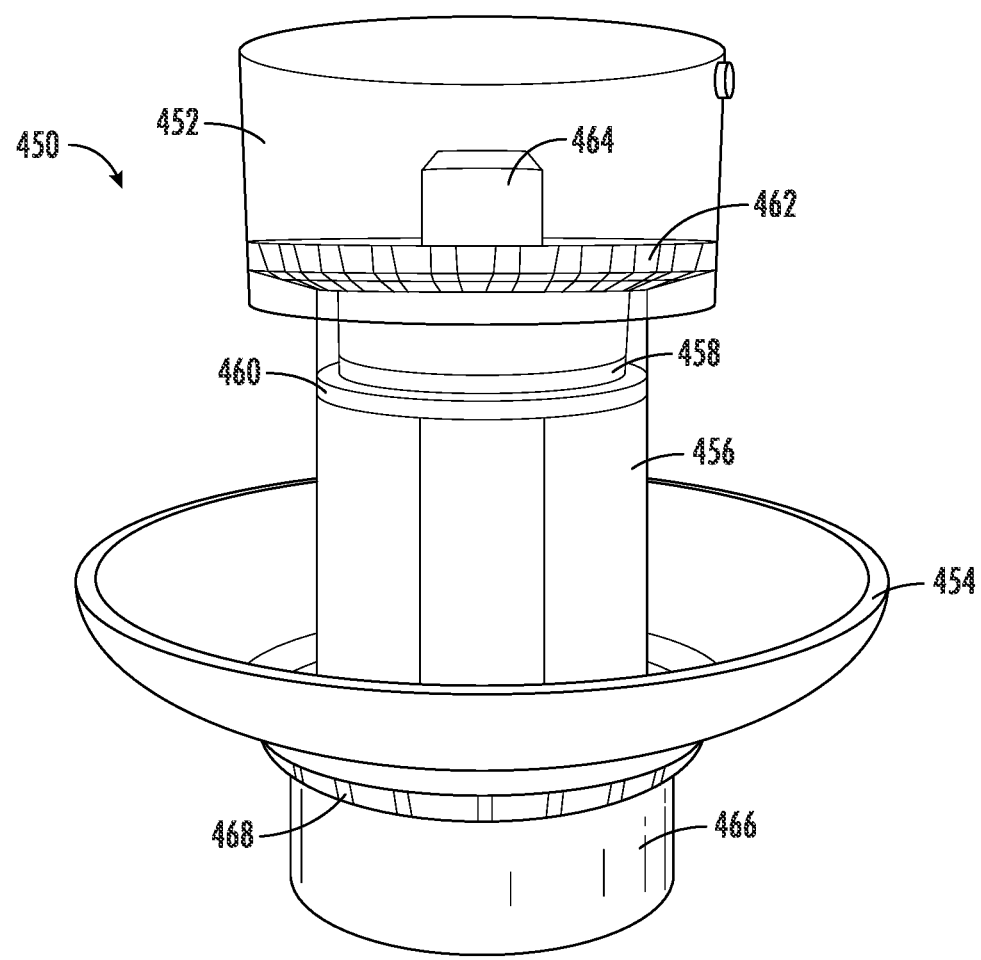
Figure 45:
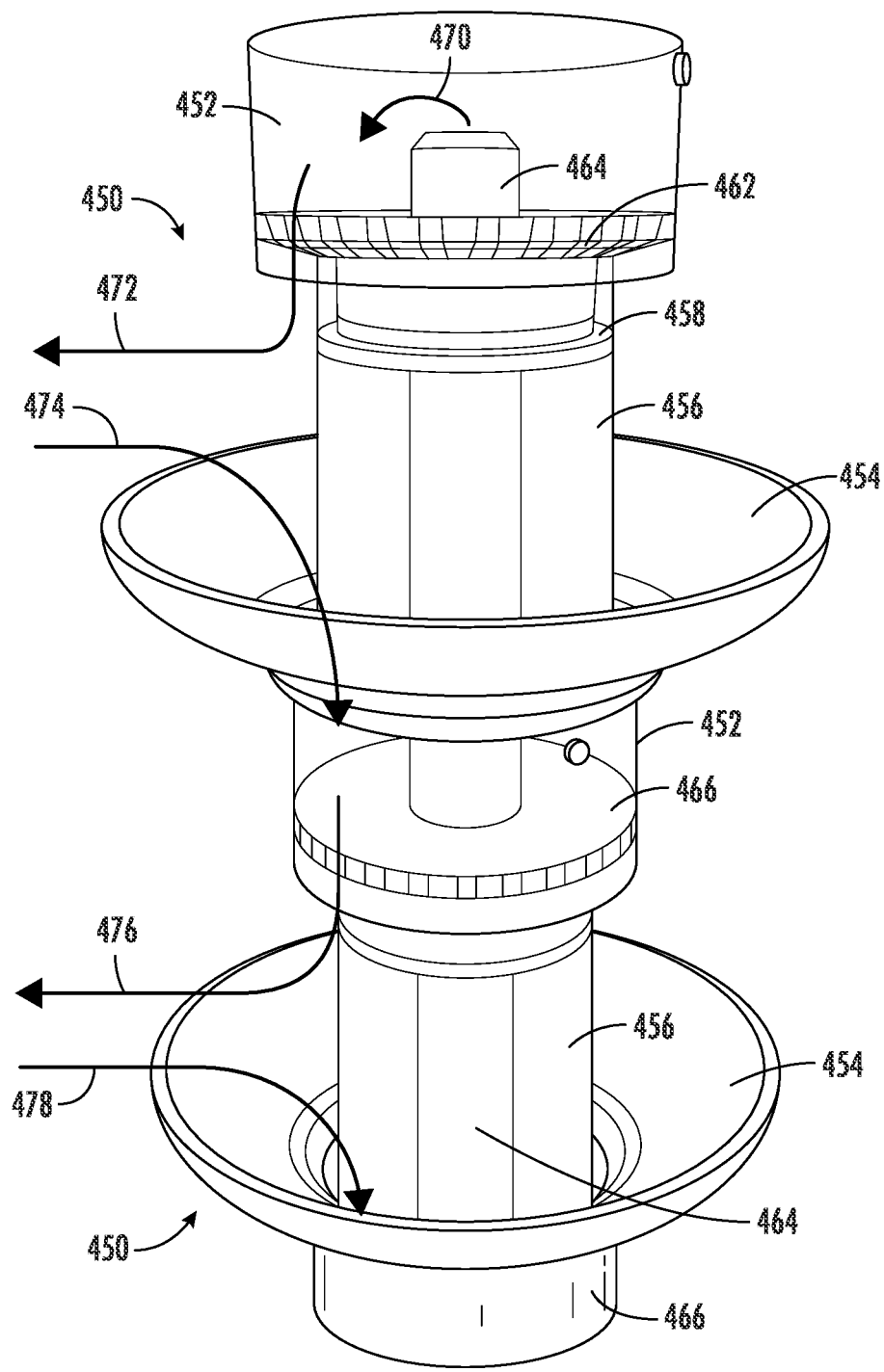
Figure 46:
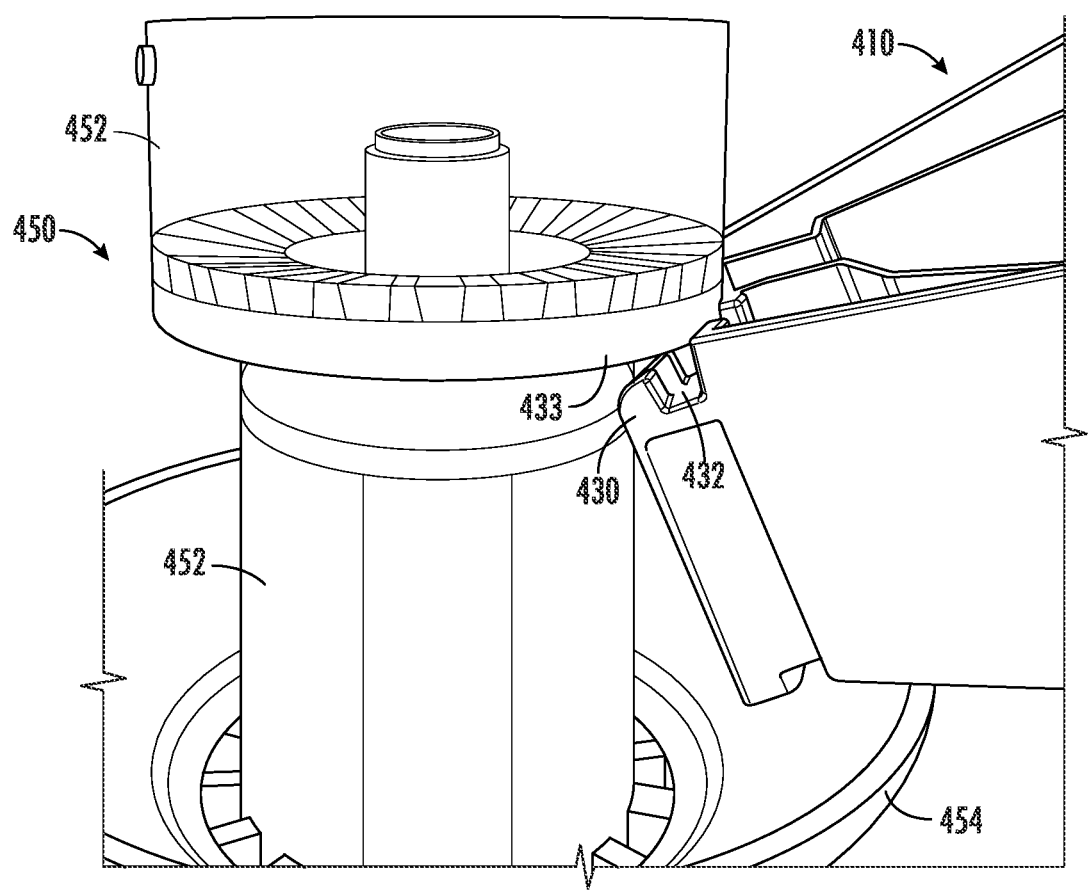
Figure 47:
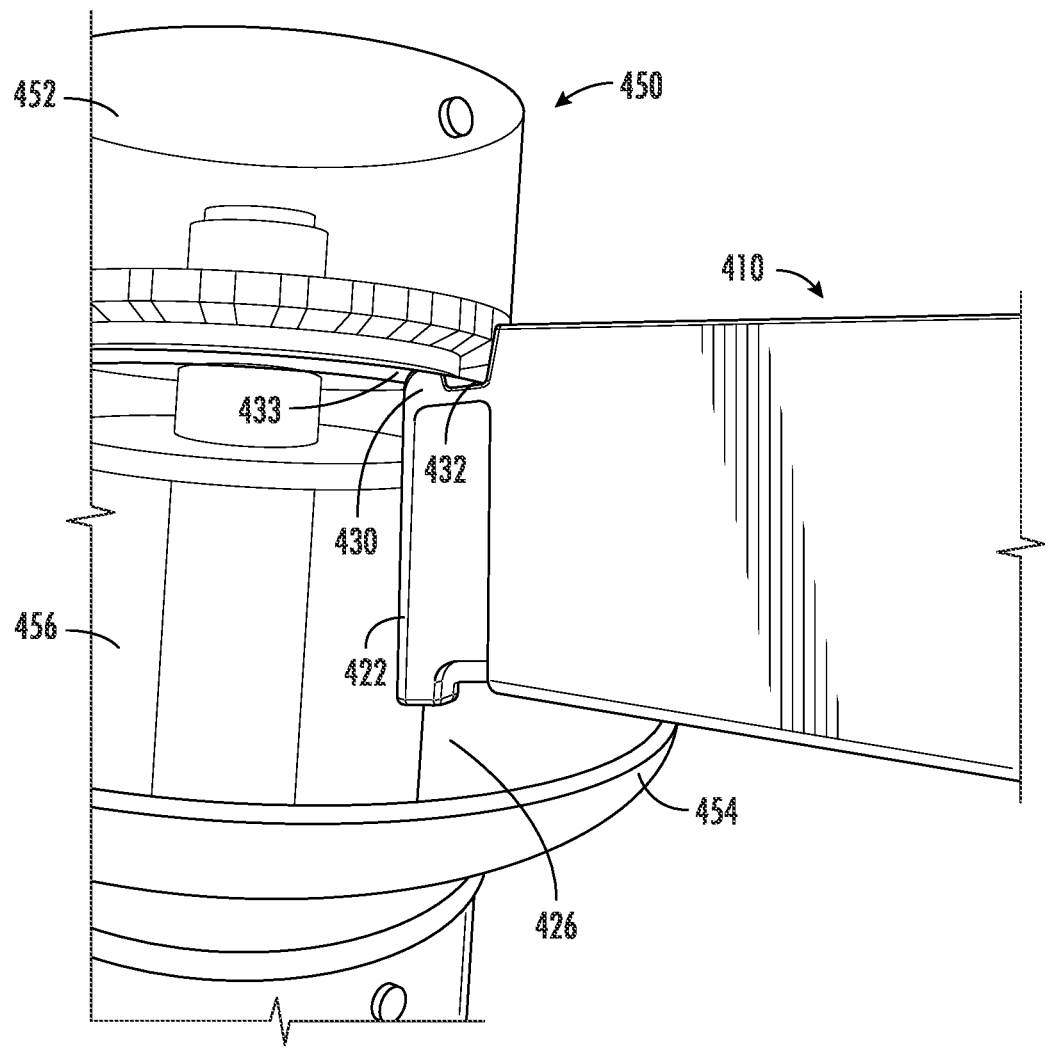
Figure 48:
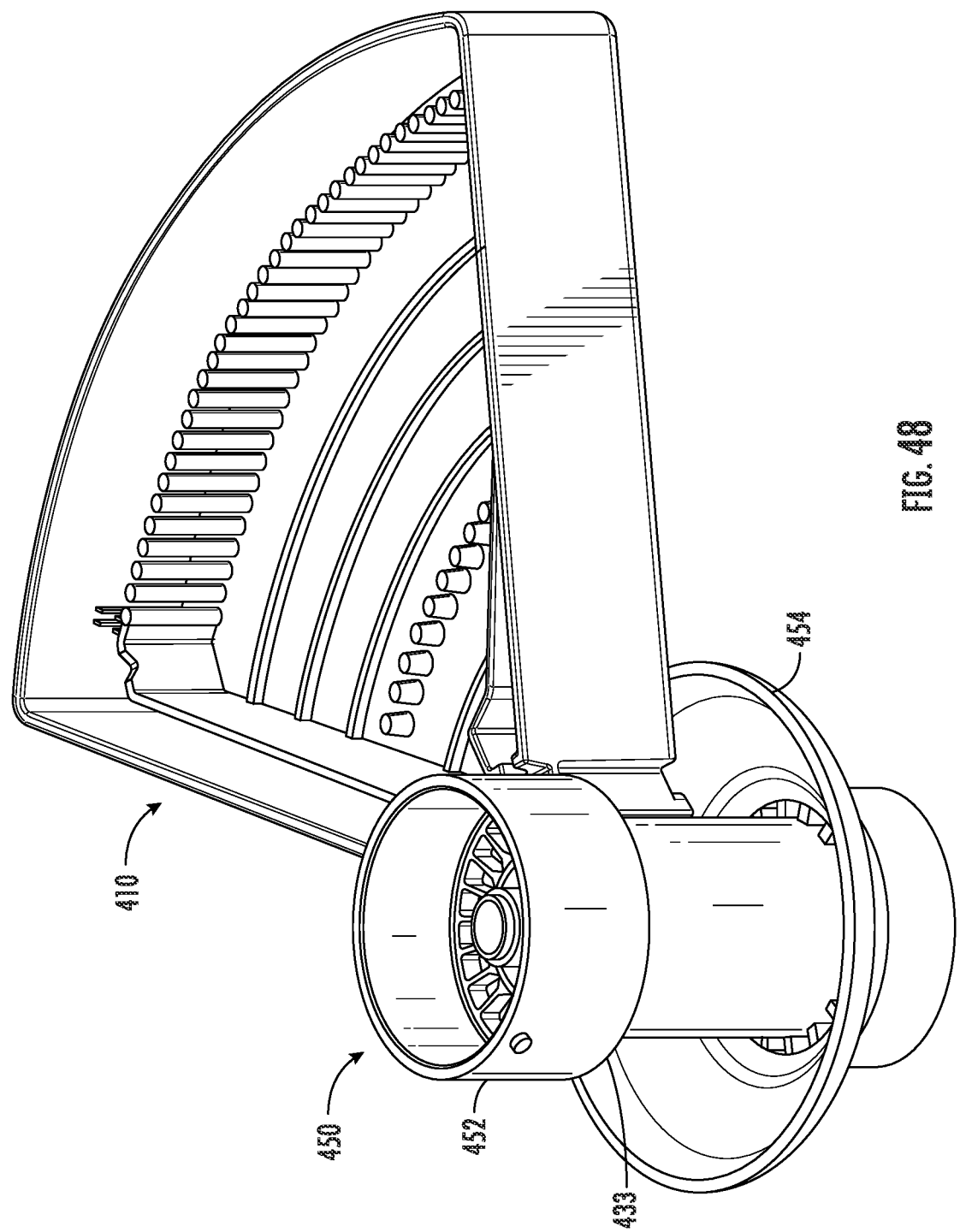
Figure 49:
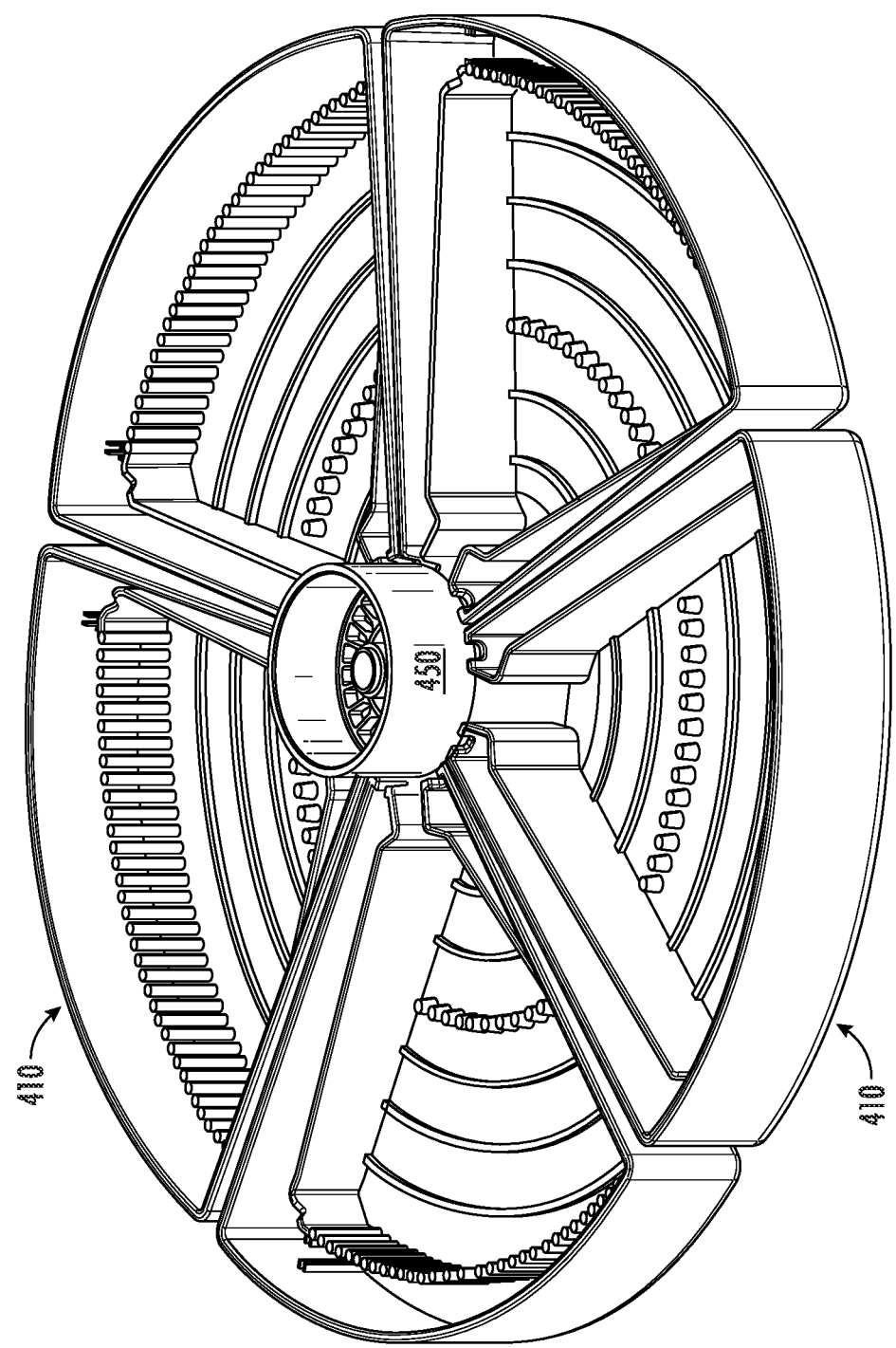
Figure 50:
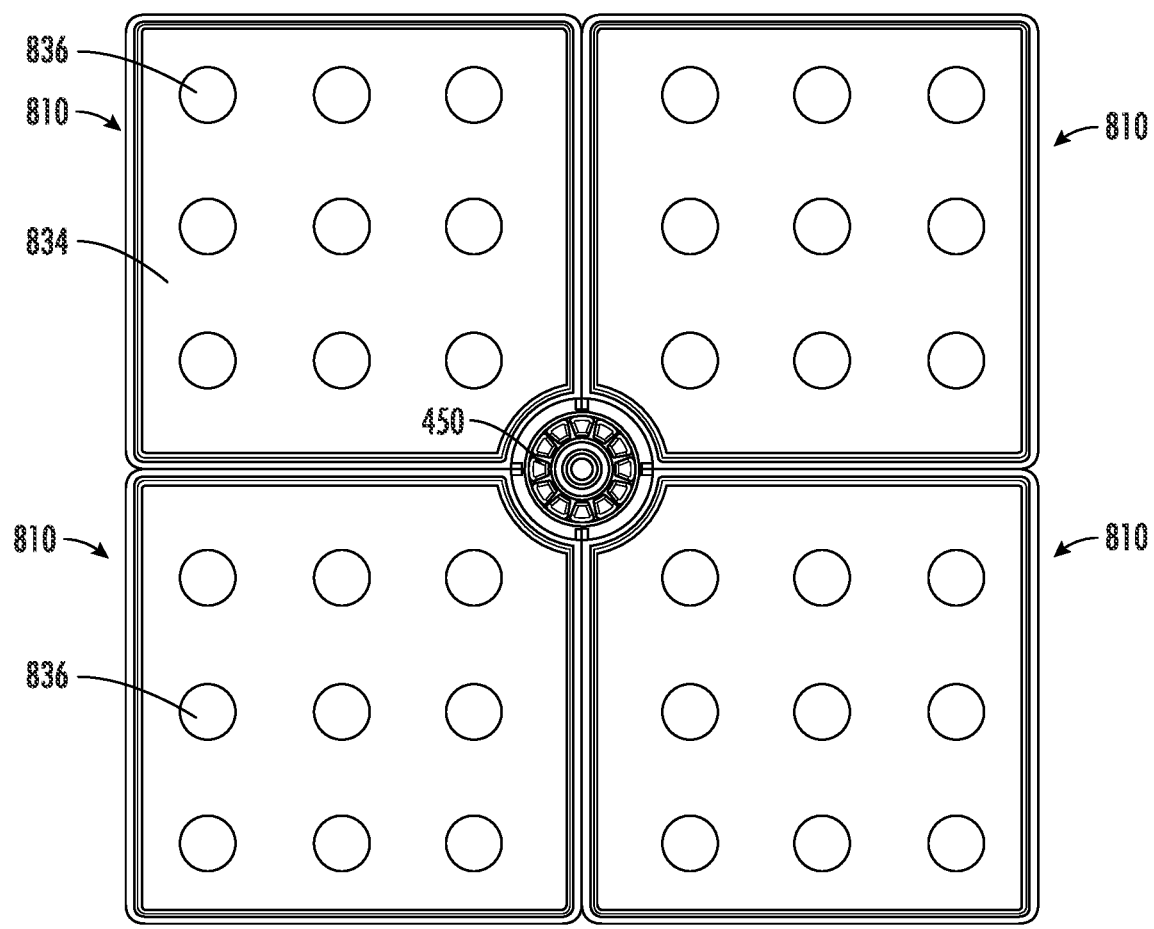
Figure 51:
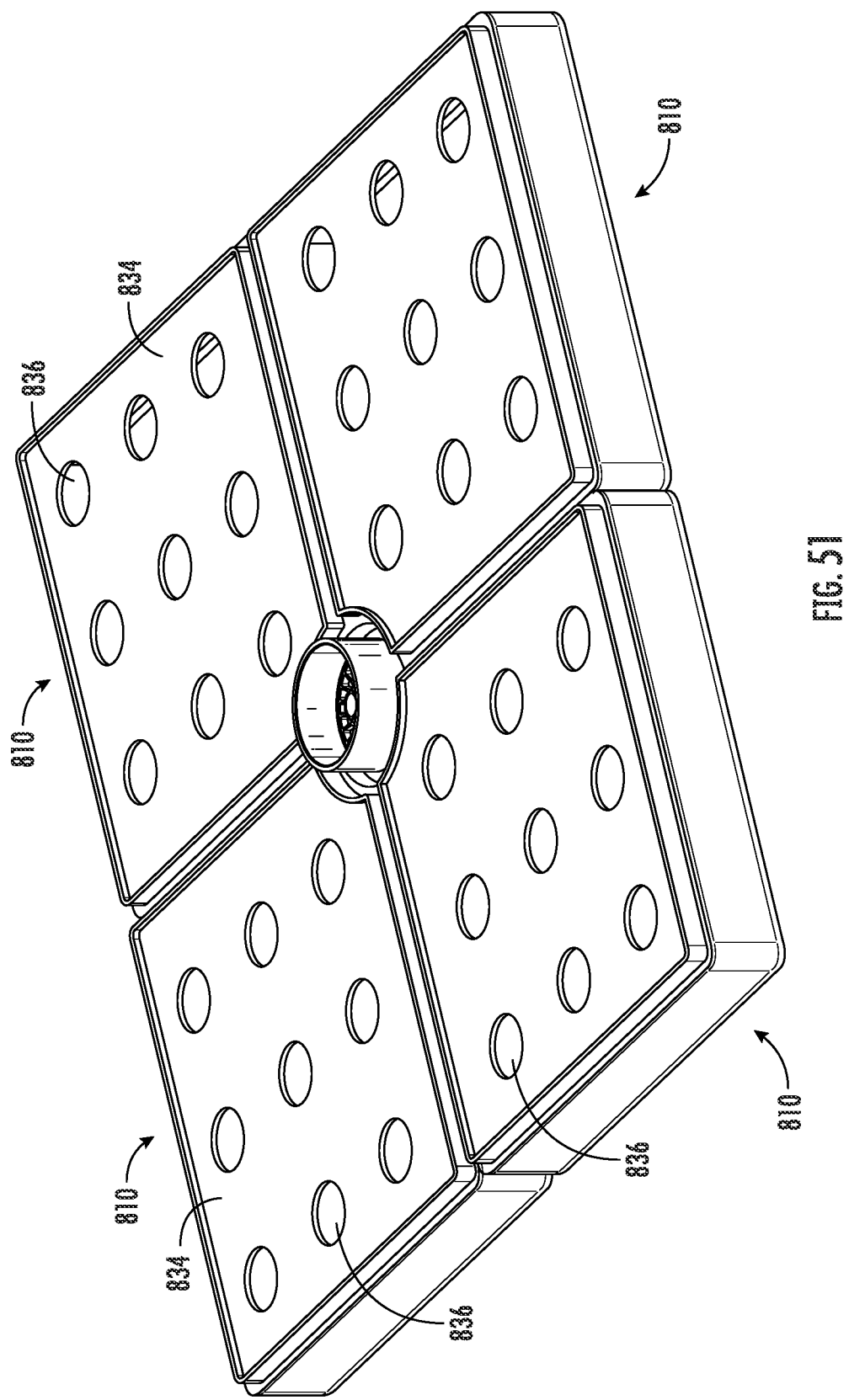
Figure 52:
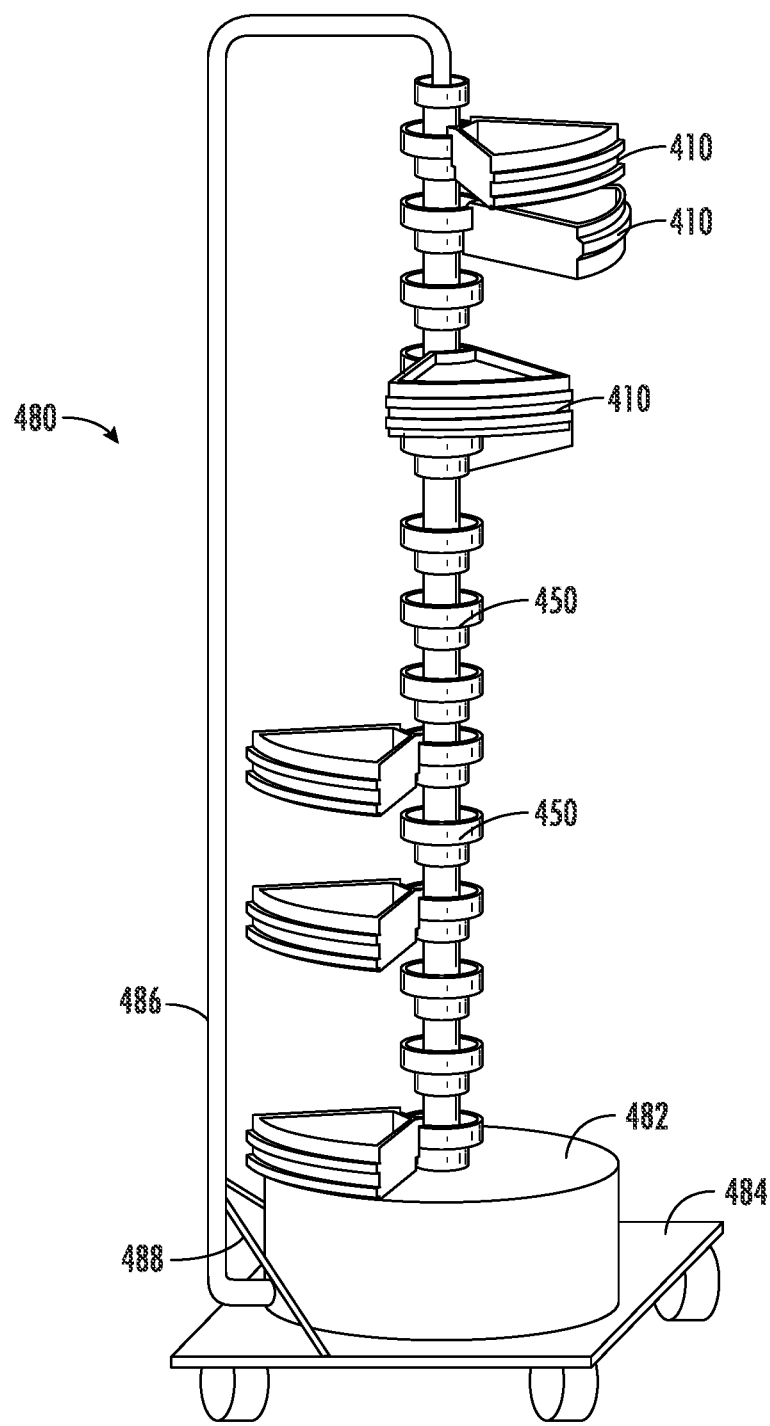
Figure 53:
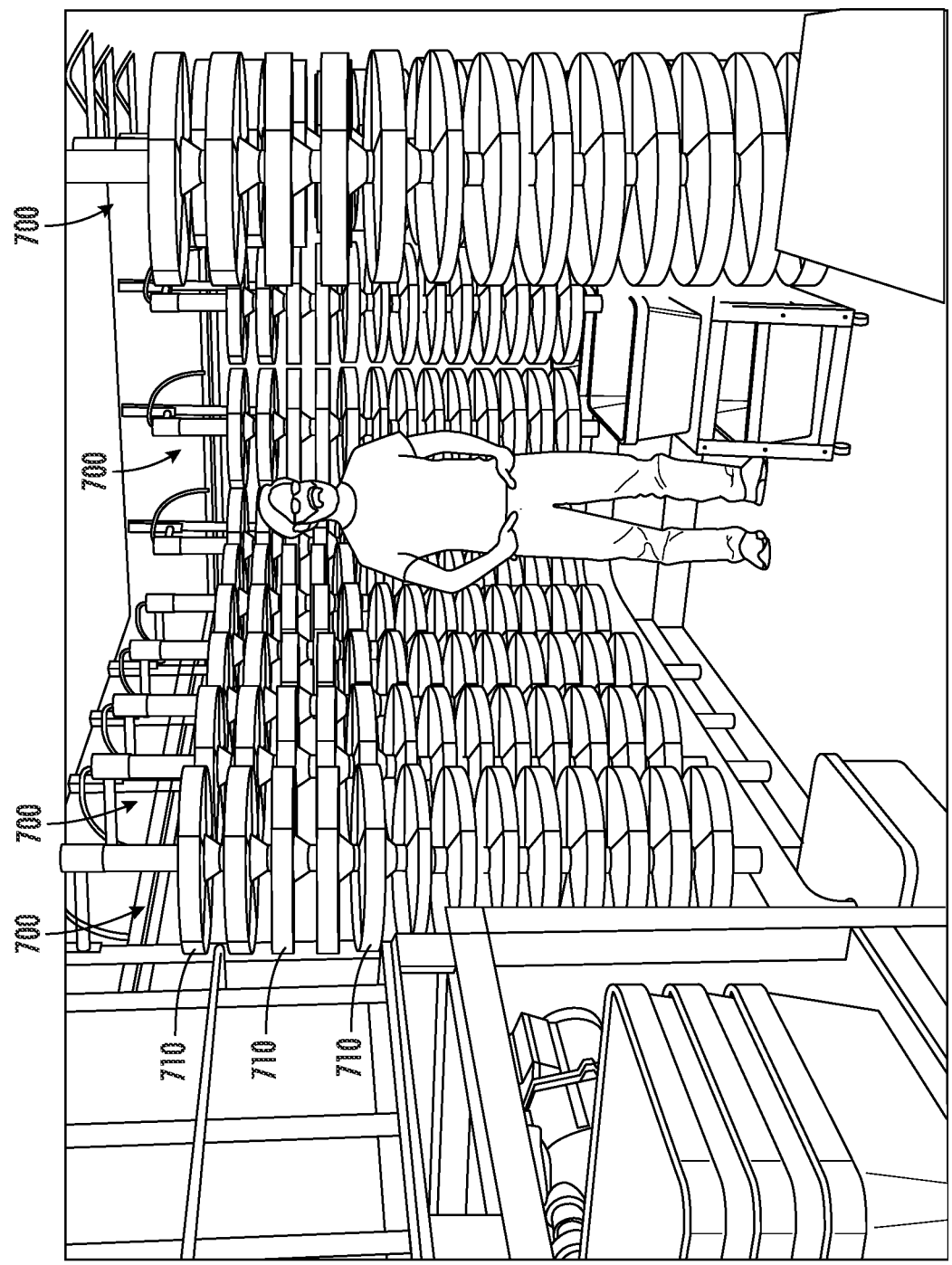
Figure 54:
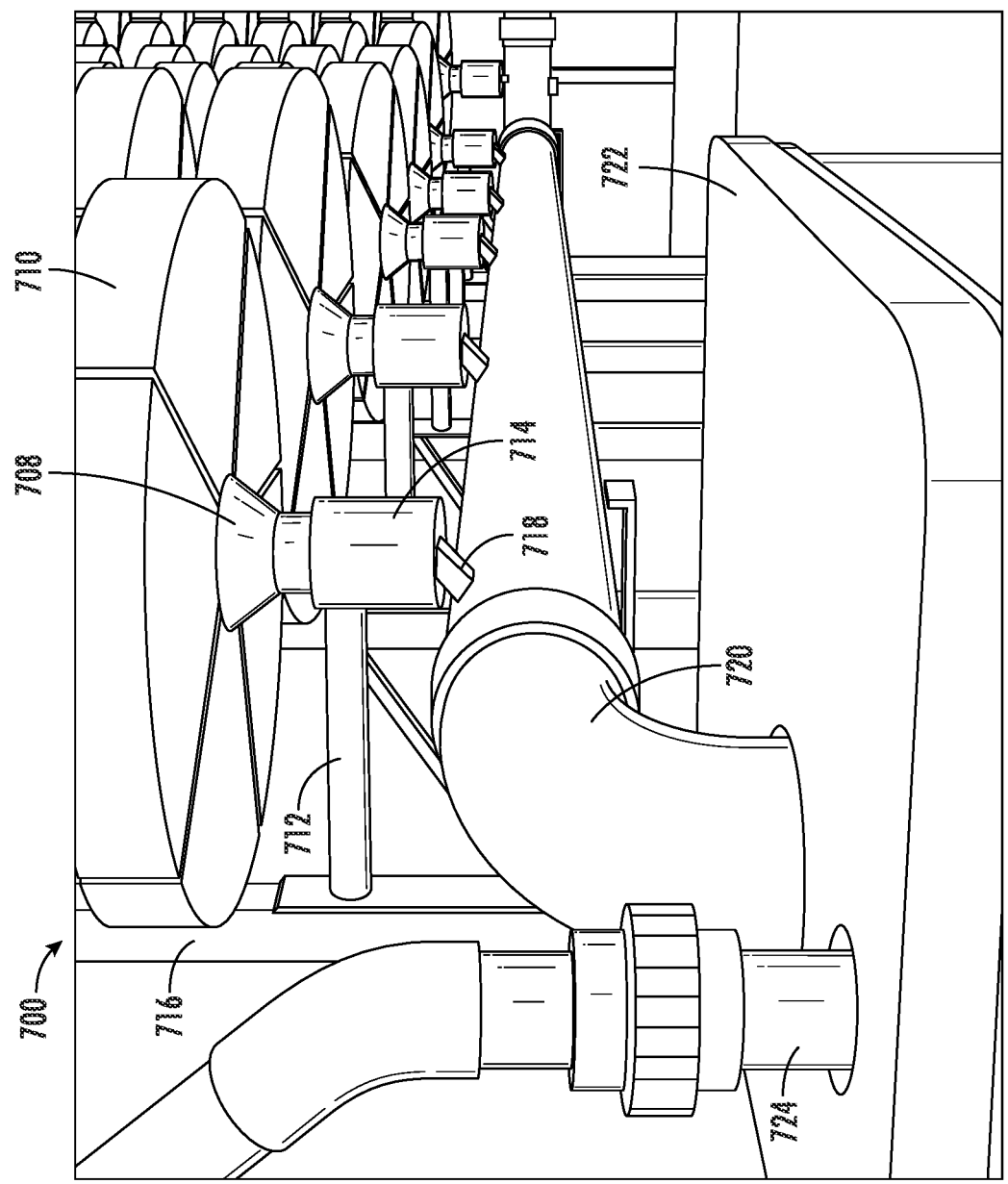
Figure 55:
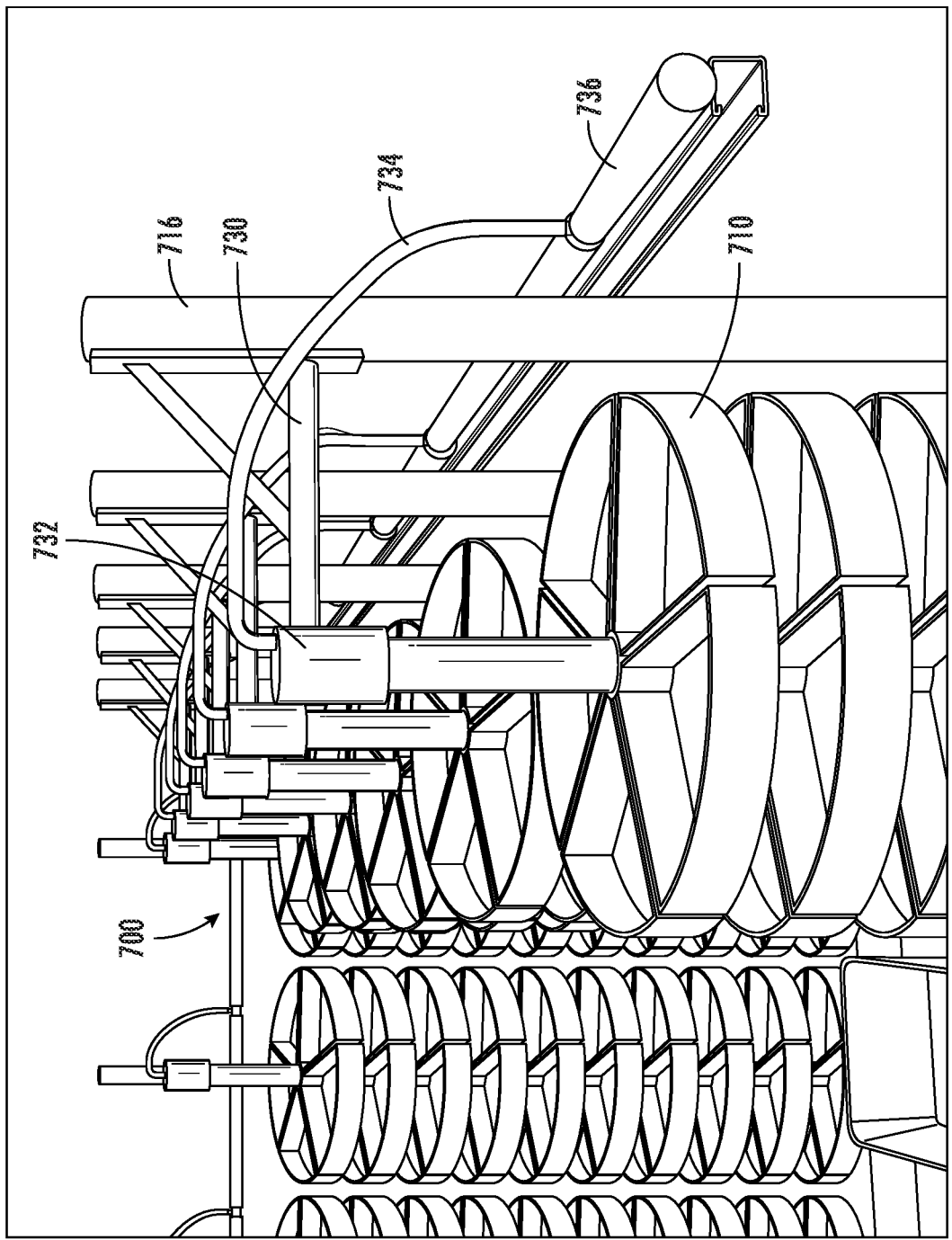
Figure 56:
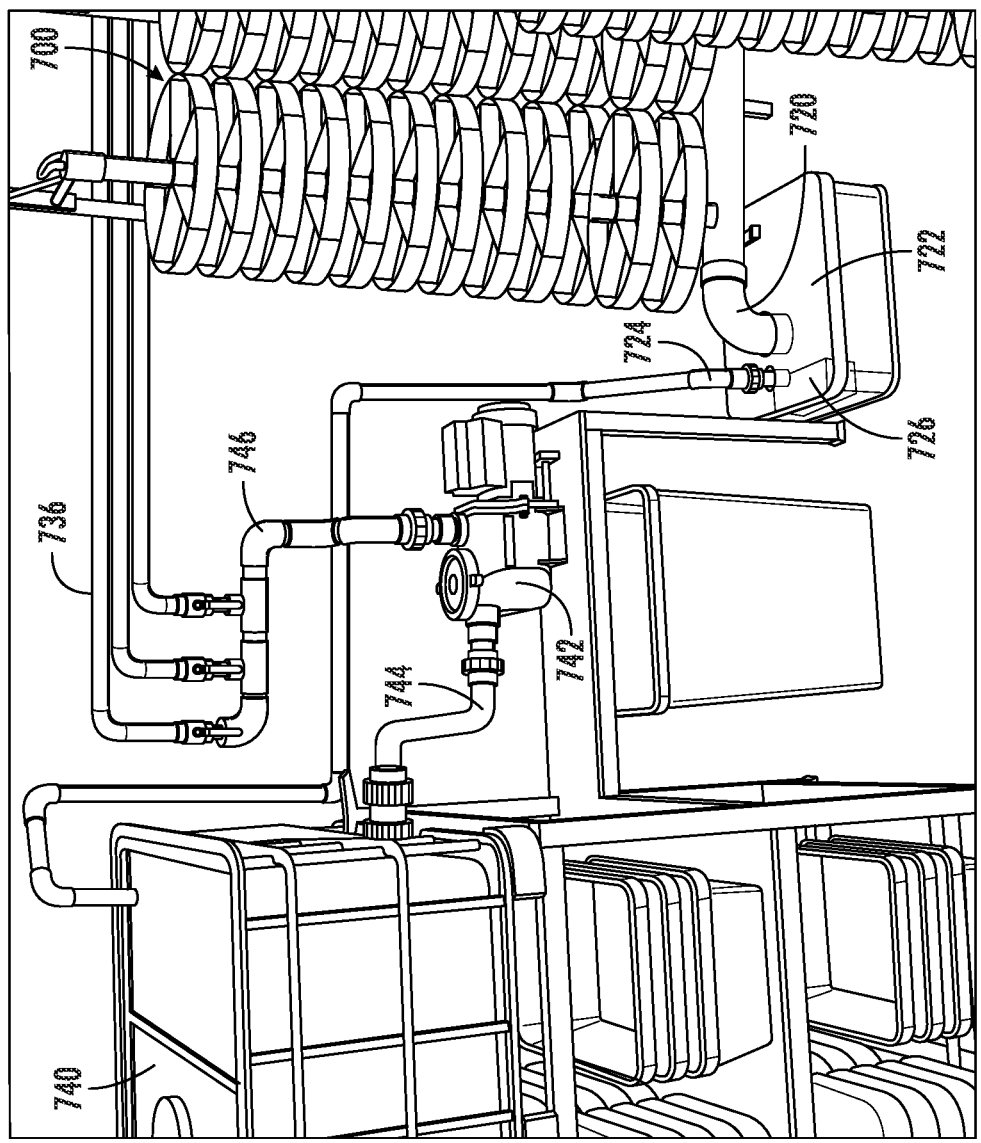
Figure 57:
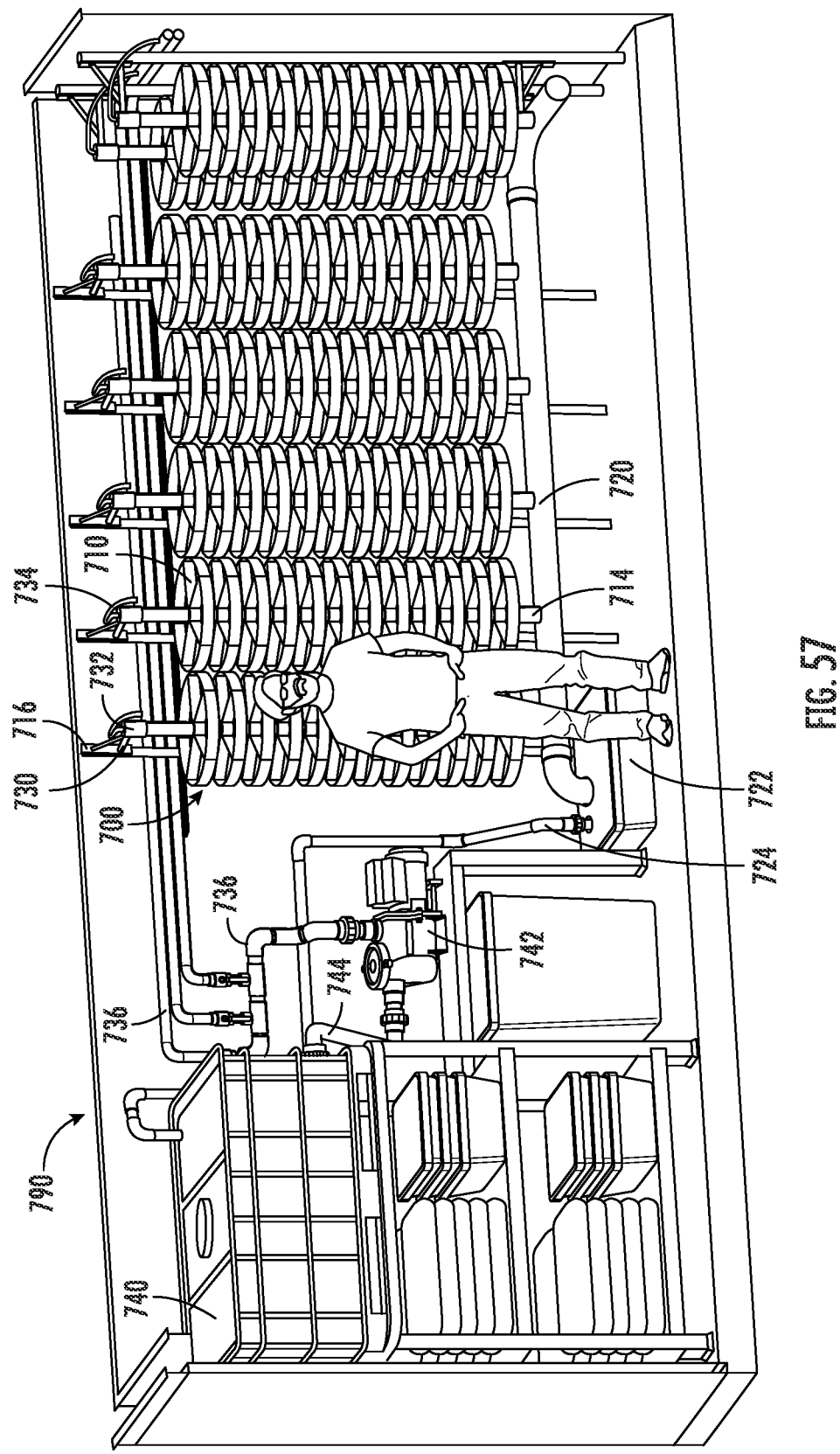

FIG. 4 depicts a perspective view of the top of a pole as illustrated in FIG. 9 in accordance with an example embodiment of the present disclosure;

FIG. 5 depicts a side view of a pole cap as illustrated in FIG. 1 in accordance with an example embodiment of the present disclosure;

FIG. 6 illustrates a perspective view of a pole assembly and a hydroponic assembly as illustrated in FIG. 1 in accordance with an example embodiment of the present disclosure;

FIG. 7 illustrates a perspective view of a pole assembly and a hydroponic assembly as illustrated in FIG. 1 in accordance with an example embodiment of the present disclosure;

FIG. 8 illustrates a perspective view of a pole assembly and a hydroponic assembly as illustrated in FIG. 1 in accordance with an example embodiment of the present disclosure;

FIG. 9 illustrates a partial cross-sectional side view of a pole assembly as illustrated in FIG. 1 in accordance with an example embodiment of the present disclosure;

FIG. 10 depicts a top side view of a tray as illustrated in FIG. 1 in accordance with an example embodiment of the present disclosure;

FIG. 11 depicts a bottom perspective side view of a tray as illustrated in FIG. 1 in accordance with an example embodiment of the present disclosure;

FIG. 12 illustrates a perspective view of a tray as illustrated in FIG. 1 in accordance with an example embodiment of the present disclosure;

FIG. 13 illustrates a pole assembly and a hydroponic assembly in accordance with an example embodiment of the present disclosure;

FIG. 14 illustrates a perspective view of a tray as illustrated in FIG. 1 in accordance with an example embodiment of the present disclosure;

FIG. 15 illustrates a pole assembly and a hydroponic assembly in accordance with an example embodiment of the present disclosure;

FIG. 16 illustrates a pole assembly and a hydroponic assembly in accordance with an example embodiment of the present disclosure;

FIG. 17 illustrates a pole assembly and a hydroponic assembly in accordance with an example embodiment of the present disclosure;

FIG. 18 illustrates a pole assembly and a hydroponic assembly in accordance with an example embodiment of the present disclosure;

FIG. 19 illustrates a hydroponic assembly in accordance with an example embodiment of the present disclosure;

FIG. 20 illustrates a hydroponic assembly in accordance with an example embodiment of the present disclosure;

FIG. 21 illustrates a hydroponic assembly in accordance with an example embodiment of the present disclosure;

FIG. 22 illustrates a perspective view of a tray as illustrated in FIG. 1 in accordance with an example embodiment of the present disclosure;

FIG. 23 illustrates a perspective view of a tray member as illustrated in FIG. 22 in accordance with an example embodiment of the present disclosure;

FIG. 24 illustrates a perspective view of a tray member as illustrated in FIG. 22 in accordance with an example embodiment of the present disclosure;

FIG. 25 illustrates a tray and the flow paths according to an example embodiment of the present disclosure;

FIG. 26 illustrates the tray of FIG. 25 with the return flow paths according to an example embodiment of the present disclosure;

FIG. 27 illustrates the water supply and return paths from a pole section according to an example embodiment of the present disclosure;

FIG. 28 illustrates peripheral channels and a flow control mechanism according to an example embodiment of the present disclosure;

FIG. 29 illustrates the flow control mechanism of FIG. 28 with a flow control barrier according to an example embodiment of the present disclosure;

FIG. 30 illustrates another tray and the flow paths through the tray according to an example embodiment of the present disclosure;

FIG. 31 illustrates a tray lid for a tray for receiving pods therein according to an example embodiment of the present disclosure;

FIG. 32 illustrates a section view schematic of a single pod aperture within the tray lid including a pod according to an example embodiment of the present disclosure;

FIG. 33 illustrates a tray including flow directing fingers configured to guide water from the pole section to the individual pod locations according to an example embodiment of the present disclosure;

FIG. 34 illustrates a tray including a tray lid and flow directing figures in profile view according to an example embodiment of the present disclosure;

FIG. 35 illustrates a trough for distribution of water within a tray according to an example embodiment of the present disclosure;

FIG. 36 illustrates a detail view of the trough within a tray according to an example embodiment of the present disclosure;

FIG. 37 illustrates a tray insert for a tray of a hydroponic system according to an example embodiment of the present disclosure;

FIG. 38 illustrates another view of the tray insert of FIG. 37 according to an example embodiment of the present disclosure;

FIG. 39 illustrates a tray insert lid according to an example embodiment of the present disclosure;

FIG. 40 illustrates a tray insert lid supported on a tray insert according to an example embodiment of the present disclosure;

FIG. 41 illustrates two views of an adjustable height pod for a hydroponic system according to an example embodiment of the present disclosure;

FIG. 42 illustrates the adjustable height pod in a lowered position according to an example embodiment of the present disclosure;

FIG. 43 illustrates the adjustable height pod in a raised position according to an example embodiment of the present disclosure;

FIG. 44 illustrates a pole cup according to an example embodiment of the present disclosure;

FIG. 45 illustrates a pair of pole cups interlocked and a flow path there between according to an example embodiment of the present disclosure;

FIG. 46 illustrates an engagement mechanism between a pole cup and a tray during attachment according to an example embodiment of the present disclosure;

FIG. 47 illustrates an engagement mechanism between a pole cup and a tray after attachment according to an example embodiment of the present disclosure;

FIG. 48 illustrates a tray secured to a pole cup according to an example embodiment of the present disclosure;

FIG. 49 illustrates five trays arranged around a single pole cup according to an example embodiment of the present disclosure;

FIG. 50 illustrates a top view of four substantially square trays arranged around a pole cup according to an example embodiment of the present disclosure;

FIG. 51 illustrates a perspective view of the square tray arrangement of FIG. 50 according to an example embodiment of the present disclosure;

FIG. 52 illustrates a mobile tower of pole cups and trays for a hydroponic system according to an example embodiment of the present disclosure;

FIG. 53 illustrates an example embodiment of a hydroponic system within a confined space such as a container according to an example embodiment of the present disclosure;

FIG. 54 illustrates a base of a tower of pole cups and trays of a hydroponic system according to an example embodiment of the present disclosure;

FIG. 55 illustrates a top of a tower of pole cups and trays of a hydroponic system according to an example embodiment of the present disclosure;

FIG. 56 illustrates a pump and tank arrangement for a hydroponic system described herein according to an example embodiment of the present disclosure; and FIG. 57 illustrates a containerized embodiment of a hydroponic system according to an example embodiment of the present disclosure.

DETAILED DESCRIPTION

The present disclosure now will be described more fully hereinafter with reference to the accompanying drawings, in which some, but not all embodiments are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

Embodiments described herein can be used for both hydroponic and aquaponic environments. The systems of example embodiments will generally be described as hydroponic; however, it is understood that a hydroponic system can be adapted to be an aquaponic system. As such, the use of the term hydroponic is not to be limited to exclusively hydroponic systems, but hydroponic systems that can be adapted to aquaponic systems as described further below.

FIGS. 1-59 illustrate embodiments of the hydroponic system 1, and the various components thereof. As illustrated in FIG. 1, the hydroponic system 1 includes, in general, three assemblies: 1) a tank 101 which in an aquaponic system can be an aquaculture assembly and 2) one or more hydroponic assemblies 200 operatively coupled with the tank 101 via 3) a pole assembly 300. The various assemblies, and components thereof, of the hydroponic system 1 of FIG. 1 are illustrated in FIGS. 2-25 and described in further detail throughout this specification. In general, the tank 101 is located at the base of the hydroponic system 1 and in an aquaponic system is configured for housing aquatic creatures in a controlled marine environment. The tank 101 of example embodiments can be co-located with the pole assembly 300, such as in the embodiment of FIG. 1; however, a tank can be remotely located from the pole assembly 300 and hydroponic assemblies 200 as described below with respect to various embodiments. Regardless of the location of the tank 101, the system can be employed as a hydroponic system or aquaponic system.

The hydroponic system 1 of the illustrated embodiment of FIG. 1 includes a tank 101 having a base plate 107 positioned at the bottom of the tank 101, and one or more tank covers 114 positioned at the opening of the tank 101. The pole assembly 300 is at least partially submerged in the tank 101 and extends generally vertically from the base plate 107 of the tank 101 in an upright orientation. The pole assembly 300 (or additional components within) is configured for supplying water from the tank 101 to the hydroponic assemblies 200, and is further configured to control the flow of water as it dispenses to and from the hydroponic assemblies 200, and thereafter returns to the tank 101.

The pole assembly 300 may of the illustrated embodiment includes a pole 301, a plurality of pole cups 305 located vertically along the pole 301, and a pole cap 312 or one or more openings 304 positioned at the top of the pole 301. The hydroponic assemblies 200 may be operatively coupled to the pole assembly 300 and configured for housing plants in a controlled growing environment wherein the hydroponic assemblies 200 may receive water from the pole assembly 300 via a plurality of spouts 400 or various other means described in further detail below. The pole assembly may further include one or more hydroponic assembly locations located vertically about the pole and configured to receive the hydroponic assemblies 200. In a preferred embodiment, the pole cups 305 function as hydroponic assembly coupling locations; however, in other embodiments, the pole 301 itself may be a hydroponic assembly coupling location such that the hydroponic assemblies 200 may be operatively coupled with the pole assembly 300 at any location and in any orientation about the vertical axis of the pole 301 using various couplings mechanisms (e.g., slotted holes through the pole and a tab or hook on the tray, an apron or lip on the pole and a tab or hook on the tray, slots or groves on the surface of the pole and a projection on that tray that slides within the slots or grooves, or any other type of coupling).

The hydroponic assemblies 200 may include one or more trays 201 where the trays 201 optionally have a tray 215 operatively coupled to the trays 201, which may be deposited within the trays 201, located on top of the trays 201, span an opening in the trays 201, or otherwise be attached to the trays 201. In some embodiments, the hydroponic system 1 may include an optional tube (not illustrated) located within the pole 301 to supply water from the tank 101, throughout the pole 301, and to the hydroponic assemblies 200.

With respect to the embodiment of FIG. 1, and as discussed in further detail throughout this specification water is pumped up through the pole 301 (e.g., a tube within the pole 301 or through the pole 301 itself) and exits the pole cap 312 or one or more openings 304 at or near the top of the pole 301. The water flows down the outside surface of the pole 301 and is diverted by the spouts 400, which direct the water from the outside surface of the pole 301 to the trays 201 and/or trays 215. As will be discussed in further detail later the water will either flow into the tray 215 and then into the back of the tray 201, or flow directly into the back of the tray 201 in order to provide a continuous stream of water to the plants in the trays 201 and/or trays 215. The water on the bottom of the tray 201 then flows back to the pole 301 and/or cup 305 and is collected in a second cup 305 located vertically below the first cup 305. The cup 305 funnels the water back to the outside surface of the pole 301 for delivery to a second tray 201 and/or tray 215 located below the first tray 201 and/or tray 215. The water then flows back to the tank 101 and the process begins again.

FIGS. 2 through 9 illustrate a pole assembly 300 in accordance with one or more embodiments of the present disclosure. As illustrated in FIGS. 2 through 9 the pole assembly 300 may comprise a pole 301 having one or more pole cups 305 arranged about the pole 301 in a vertical orientation, and a pole cap 312 or opening 304 located at the top of the pole 301, wherein the pole cap 312 is at least partially coupled with the pole 301.

As illustrated in FIGS. 2 through 9, the pole 301 may be defined by an elongate conduit that has a pole extension 302 at the top of the pole 301, an access notch 303 located at the bottom of the pole, and an opening 304 located at the top of the pole. The access notch 303 may be provided for allowing the passage of an optional tube into the pole 301 such that the tube may supply water from the aquaculture assembly, throughout the pole 301 and, to the hydroponic assemblies 200.

The pole extension 302 may be slightly narrower than the pole 301 such that it can be coupled with a pole cap 312. In this regard, as illustrated in FIG. 1, the pole cap 312 may be configured to receive the pole extension 302 in an opening of the pole cap 312. The pole cap 312 may have a plurality of exit slots 313 located at the top of the pole cap 312 that allow the water to exit the interior of the pole and be distributed to the outside surface of the pole 301, the spouts 400, the hydroponics assemblies 200, back to the pole cups 305, and back down outside surface of the pole 301. To this extent the size of the openings of the exit slots 313 may allow the water to flow at a controlled rate as it exits the pole 301. The pole cap 312 also prevents water from shooting strait into the air, and may also have channel surfaces 315 to transition the water to the outside surface of the pole 301.

In an alternative embodiment, as shown in FIG. 6, the exit slots 317 may be located in the pole 301 itself versus being in the pole cap 312. In one embodiment, the exit slots 317 may be a fixed size. However, in other embodiments the size of the exit slots 317 may be adjusted to smaller increments, and/or the exit slots 317 may be manually or automatically opened or closed such the flow of the water may be regulated with a slider located either inside or outside the pole 301 or pole cap 312. The pole cap 312 may be provided to increase or decrease the pressure within the pole 301 and/or the tube that may run inside of the pole 301. As such, the pole cap 312 may be adjusted to increase or decrease the flow of water that is allowed to exit the pole 301 (or tube within the pole 301).

In one embodiment, the pole cap 312 may additionally have an opening 314 for receiving a fastener (e.g. a screw, or the like) to secure the pole cap 312 to the pole 301 and/or the tube. In this regard, both the pole cap 312 and the pole 301 and/or the tube may have an opening 314 that is internally threaded such that the openings 314 can be aligned with one another and receive a fastener. In another embodiment, the pole cap 312 may screw directly onto the pole 301. To this extent, at least a portion of the pole cap 312 may be internally threaded, and at least a portion of the pole extension 302 may be externally threaded such that the pole extension 302 is configured to receive the pole cap 312. In yet another embodiment, the pole cap 312 snaps, slides, clips, or the like onto the pole extension 302 such that it is secured in place and no additional threading is necessary. In an alternative embodiment, the pole cap 312 may be omitted from the design and the pole assembly 300 may use an alternative means for building pressure within the pole 301 and controlling the flow of water out of the pole 301. For example, as shown in FIG. 6, the top of the pole 301 may be enclosed versus having an opening, and the pole may comprise several exit slots 317 to allow water to exit the pole 301.

As further illustrated in at least FIGS. 2 through 4, the pole 301 may comprise one or more pole cups 305 that are arranged along the pole 301 with respect to its vertical axis. The one or more pole cups 305 may be divided into upper and lower tiers (306, 307, respectively). The upper tier 306 of the pole cup 305 may be configured for receiving an overflow of water as it is being dispersed from another area within the system (e.g., a pole cup 305 located above) and funneling the water to the lower tier 307 of the pole cup 305b. As shown in FIGS. 2 through 4, in one embodiment, the lower tier 307 may be narrower than the upper tier 306. It should be noted that although in the illustrated embodiments, the pole cups 305 are generally circular in shape, the pole may be embodied by other shapes not illustrated herein, including but not limited to, cubed, rectangular, trapezoidal, and/or organic or ameba shapes. The pole assembly 300 may additionally comprise a plurality of blades 311 (e.g., also described as fans, diffusers, diverters, or like) that control the rate at which the water exits the lower tier of the cup and flows down the pole to the hydroponic assembly 200, another cup 305, or to the tank 101. In a preferred embodiment, as illustrated in FIG. 3, the blades 311 may be located between the outer perimeter of the pole 301 and the inner perimeter of the lower tier 307 of the cup 305.

The blades 311 may extend outward from the outer perimeter of the pole 301 until they reach the inner perimeter of the lower tier 307 of the cup 305 and upward such that the blades 311 are angled and/or sloped with respect to the ground level. The blades 311 may further be angled towards the direction of the outer surface of the pole 301 to help direct the water onto the surface of the pole 301. It should be noted that the blades 311 may be positioned in other configurations not shown in the illustrated embodiments such that the configuration of the blades 311 may vary the rate of flow of the water (e.g., slow down or speed up the flow of water).

In one embodiment, the one or more pole cups 305 may be permanently coupled to the pole 301, for example formed integrally with the pole 301 (e.g. molded, plastic welded, or the like) or permanently secured to the pole 301. The pole cups 305 may be located at the desired height in order to space apart the trays 201 to grow different types of plants or other vegetation (e.g., vegetables, herbs, spices, fruits, grasses, flowers, plants, or any other type of editable or non-editable vegetation). In another embodiment, as shown in FIG. 9, the one or more pole cups 305 may be removably coupled to the pole 301. In an embodiment, where the pole cups 305 are removable the pole cups 305 may further comprise a hook and/or clasp mechanism to connect the cup 305 to the pole 301. In one example, a half section of the cup is removable by detaching a hook 308 on a first end of the pole cup 305 from the attachment point 309 located on the second and/or opposite end of an adjacent pole cup 305. It should be that, although a hook and/or clasp mechanism is shown in the illustrated embodiment, other methods may be used to secure to two halves of the pole cup 305 and pole 301 together including other fasteners (e.g. screws). The pole cup 305 may further comprise inner bracing 310 to stabilize the pole cup 305 as it is attached to the pole 301. Additionally, the pole 301 may be asymmetrically configured such that it is defined by a series of curvatures where the "in and out" orientation of the curves prevents the pole cup 305 from easily sliding down the pole 301. It should be noted that although in the illustrated embodiments, the pole is generally cylindrical in shape, the pole may be embodied by other shapes not illustrated herein, including but not limited to, cubed, rectangular, trapezoidal, and/or organic or ameba shapes.

In other embodiments of the invention the pole cup 305 may slide over the pole 301, and a section of the pole cup 305 may be tightened, secured to with a faster, or otherwise be attached to the pole 301. In still other embodiments, the diameter of the pole 301 may increase gradually or may otherwise have different diameters along the pole 301, such that pole cuts with different diameter holes may be placed over the top of the pole 301 and located on the pole 301 based on the diameter of the pole 301 and the inner diameter of the pole cup 305.

FIGS. 10 through 24 illustrate the hydroponic assembly 200 in accordance with various embodiments of the present disclosure. As illustrated in FIGS. 10 through 24 the hydroponic assembly 200 includes one or more grow trays 201, wherein the grow trays may optionally have a tray 215 placed within the tray 201.

As illustrated in FIGS. 10 through 24, the grow tray 201 may be defined by a tray that has a plurality of protrusions 202 extending upward from the base of the tray 201, at least one channel 205 having a channel opening 206, at least one sloped surface 207 in the base of the tray 201*b*, one or more hooks 208, and side rails 209*a* and 209*b*. As shown in the figures, in one embodiment, the tray 201 may be further defined by walls that extend upward from the base of the tray 201. The tray 201 may comprise an inner wall 212, an outer wall 213, and two side walls 214*a*, 214*b* that collectively form an opening in the top of the tray.

In one embodiment, the side rails 209*a*, 209*b* may be located parallel to the interior of the side walls 214*a*, 214*b* such that two channels 205*a*, 205*b* are formed. In the illustrated embodiments, a first channel 205*a* is formed on the left side of the tray 201, and a second channel 205*b* is formed on the right side of the tray. However, in other embodiments, the tray may comprise only one side rail 209*a* such that only one channel 205*a* is formed. The side rails 209*a*, 209*b* may comprise an inner edge 210 and an outer edge 211, where the inner edge 210 is adjacent to the inner wall 212 of the tray 201, and the side rails 209*a*, 209*b* May extend from the inner wall 212 of the tray 201 until the outer edge 211 of the side rail 209 is adjacent (e.g., within a short distance of) the outer wall 213 of the tray 201 such that a gap is formed between the outer edge 211 of the side rail 209 and the outer wall 213 of the tray 201. Each channel 205*a*, 205*b* may lead to a channel opening 206*a*, 206*b* that is formed in the inner wall 212 of the tray 201 that opens to external surface of the pole cup 305 or the external surface of the pole 301.

As such, in one embodiment of the invention, as water flows into the base of the tray 201 the water is first directed to the outer wall 213 because the base is sloped towards the outer wall, flows through the gaps, and back down the one or more channels 205*a*, 205*b* towards the pole 301 because the channels 205*a*, 205*b* are sloped towards the pole 301. As such, the tray 201 provides a means for water to continuously enter the base of the tray 201, flow over the seeds or roots of the plants or other vegetation towards the outer wall 213, and back towards the inner wall 212 adjacent the pole 301 through the channels 205*a*, 205*b*.

In one embodiment, upon exiting the tray 201 the water may flow towards the exterior of the lower tier 307 of a pole cup 305 and travel down the exterior of the pole cup 305 and subsequently continue to flow down the pole 301. In another embodiment, the lower tier 307 of a pole cup 305 may comprise an opening adjacent to the channel opening such that the water flows directly into the interior of the lower tier 307 of the pole cup 305 and through the plurality of blades 311 before exiting the pole cup 305. The tray 201 may additionally comprise at least one sloped surface 207 in the base 203 of the tray 201 that defines the direction in which the water should flow. For example, as shown in the illustrated embodiments of FIGS. 10-15, the tray may comprise two sloped surfaces (207*a*, 207*b*) that extend into the base 203 of the tray at an angled depth such that it creates an incline in the channels 205*a*, 205*b*, where the channels 205*a*, 205*b* slope downward from the outer wall 213 towards the inner wall 212 of the tray allowing water easily to flow towards the pole 301. Likewise, in some embodiments, a similar inclination may be created in base 203 of the tray 201 such that the base slopes downward from the inner wall 212 towards the outer wall 213 of the tray allowing water to flow towards the outer wall 213 of the tray 201 and subsequently into the at least one channel 205. In yet another embodiment, the base may be defined by a flat surface that extends from the inner wall 212 of the tray 201 to the outer wall 213 of the tray 201.

In another embodiment, as shown in FIG. 19, two channels (205*a*, 205*b*, respectively) may be formed adjacent to the top edges of the side walls (214*a*, 214*b*) of the tray on the left and right sides versus the in the base 203 of the tray, wherein the channels 205 may be adjacent to the interior of the side walls 214*a*, 214*b* (side rails 209*a*, 209*b*, and protrusions 202 not illustrated). In such an embodiment, the channels 205*a*, 205*b* may carry the water towards to outer wall 213 of the tray on each side the water may then overflow at the end of the channel 205 and enter the base 203 of the tray, wherein the base 203 of the tray 201 is sloped towards the pole assembly 300 such that the water flows towards the pole assembly 300 and exits the tray 201 through an opening 206 in the inner wall of the tray 201. In other embodiments there may be other types of channels located within the tray 201 to deliver the water toward a location adjacent the outer wall 213 of the tray 201 and back towards the inner wall 212 of the tray 201.

In yet another embodiment, as shown in FIG. 20, the water may travel throughout the hydroponic assembly 200 and back to the pole assembly 300 without the use of the one or more channels 205 in the tray 201. As illustrated a first layer in the tray 201 may direct the water flow to the back of the tray (e.g., towards the outer wall 213) and a lower layer in the tray 201 may direct the water back to the inner wall 212 of the tray 201. The first layer in the tray 201 may also have protrusions 202 (not illustrated) as illustrated in FIGS. 10-17, or the like.

In another embodiment, as shown in FIG. 21, one channels 205 may be formed adjacent to the top edges of a side walls of the tray 201 on either the left and right sides versus the in the base 203 of the tray, wherein the channel 205 may be adjacent to the interior of the side walls 214 (side rails 209, and protrusions 202 not illustrated). In such an embodiment, the channel 205 may carry the water towards the outer wall 213 of the tray such that the water over flows at the end of the channel 205 and at the interior sides of the channel 205 and enters the base 203 of the tray, wherein the base 203 of the tray 201 is sloped downward away from the channel 205 and towards the opposite side wall 214 such that the water flows from the first side wall 214a to the second side wall 214b and exits the tray 201 through an opening 206 in the inner wall of the tray 201 that is adjacent to the second side wall 214b.

As shown in FIGS. 14 and 15, in one embodiment, the tray 201 may comprise extended drip ramps 206c that extend from the channel openings 206 in the inner wall of the tray 201. In such an embodiment, the drip ramps 206c may extend towards the pole 301 such that water may exit the tray 201 through the openings 206 in the inner wall of the tray 201 and flow directly towards the pole 301 versus flowing towards the exterior of the lower tier of the pole cup, as illustrated in FIG. 18b. In such an embodiment tray 201 may be positioned such that a gap exist between the drip ramps 206c and the bottom surface of the pole cup 305 allowing water to freely flow towards the pole 301 without any restriction.

The plurality of protrusions 202 extending upward from the base of the tray 201 may be located in between the interior of the side rails 209a, 209b. As shown in the figures, in one embodiment, at least a portion of the protrusions 202 may be arranged in equally distanced rows that are parallel to the inner and outer walls (212, 213, respectively) of the tray 201, where the protrusions 202 are configured such that the roots of a plant are able to at least partially wrap around the protrusions 202 and anchor the plant during the growing process, for example when the hydroponic assembly 200 uses a tray 215, as will be described in further detail later. In other embodiments of the invention, other vegetation such as wheat grass, or other types of similar vegetation may be grown within the base of the tray 201 between the protrusions 202. The protrusions 202 may act as locations in which the seeds of various types of vegetation may be placed to provide support for keeping the seeds in place and not washing away with the flow of water. The plurality of protrusions may vary in height and/or width. In one embodiment, the height of any given protrusion 202 does not exceed above the height of the side rails 209a, 209b.

The tray 201 may comprise one or more hooks 208 that allow that tray 201 to be connected to a cup 305 on the pole 301. It should be noted that the tray 201 may be connected to the pole assembly 300 using various coupling mechanisms or methods. As shown in FIG. 18 through FIG. 20, in one embodiment, the coupling method is a hooking mechanism that allows the tray 201 to hook onto the upper tier 306 of the pole cup 305. One or more hooks 208 may extend from the inner wall 212 of the tray 201 and hook onto the top edge of the upper tier 306 of the pole cup such that the inner wall 212 of the tray 201 is adjacent to the exterior of the pole cup 305. In this regard, the inner wall 212 of the tray 201 may reflect the shape of the pole cup 305 such that it conforms to the pole cup 305 and is flush with the exterior surface of the pole cup 305. For example, the inner wall 212 may have the same shape as the exterior surface of the upper tier 306 and lower tier 307 of the pole cup 305. It should be noted that the trays 201 can be moved and spaced in a 360 degree orientation around the pole cup 305 and on different levels of the pole cups 305 to support different types of plants. For example taller tomato plants may have a tray 201 on a lower cup and no tray located above the tomato plant to allow the plant to grow, while lettuce may be grown in a tray 201 that also has lettuce trays above and below. This invention allows the mixing and matching of different configurations to grow any type of vegetation. As such the hydroponics assemblies 200 may further comprise clips that can clip onto the tray 201, cup 305, tray 215 or the like in order to support different types of plants. For example a clip (in some embodiments with a dowel to support the plant) may be used to support a tomato plant to grow vertically.

Although in the illustrated embodiments, a hooking mechanism is used to couple the tray 201 with the pole cup 305, other means of connecting the two structures may be used in conjunction with the present invention. In one embodiment, as shown in FIG. 18, the tray 201 may be connected directly to the pole 301 itself. As such, the pole may comprise several openings and/or exit slots 317 that are configured for receiving the hooks 208 of the tray 201 such that the hooks 208 are at least partially positioned within the interior of the pole 301. In such an embodiment, the use of a spout 400 may be omitted from the design in order to transport water from the pole 301 to the tray 201.

In the alternative, the hooks 208 may contain smooth groove or indentations at the top such that the water flows from the exterior of the pole 301 through the grooves within the hooks 208 and into the base of the tray 201. In other embodiment the flow of water back down to the tank 101 may occur within the pole 21, such that water is flowing upwardly through the pole 21 in a first chamber, such as the tube, and running back down the pole 21 in a second chamber, such as between the outside of the tube and the inside of the pole 21. The hooks 208 may catch the water on the inside of the pole 301 and deliver it to the tray 201.

In yet another embodiment, the tray 201 may be connected to the pole 301 via a spout 400. The spout 400 may be permanently or removably coupled with the pole 301. As shown in FIGS. 7 and 8, in such an embodiment, the spout 400 may be embodied by a pole apron having a plurality of slits therein such that the tray 201 is positioned to rest adjacent to the top edge of the pole cup 305 and wedges underneath a portion of the pole apron such that it is securely positioned in place. The tray 201 may be additionally supported by a cantilever. In other embodiments, the pole apron may have a continuous perimeter wall and exclude the plurality of slits. In some embodiments, the wedge may hook into a portion of the pole 301 of the pole apron (spout 400). In an example embodiment, at least a portion of the bottom surface of the tray 201 is flush with the top edge of the pole cup 305 to provide a means of stability. The water may then run down the pole 301 and down a top surface of the pole apron (spout 400), optionally to the plurality of slits and/or through (in between) the slits, and into the tray 201. As such the tray 201 may comprise an extended inner wall 212 that extends beyond the top surface of the side walls 214, and the outer wall 213, and defines a wedge that is configured to wedge beneath at least a portion of the pole apron (spout 400) and fasten the tray 201 in a secure position. For example the tray 201 may be inserted in the spout 400 at an angle and lock into place using the wedge. In an exemplary embodiment the extended inner wall 212 (and/or wedge) may be ¼ inch in length. However, in other embodiment, the length of the extended inner wall 212 and the side walls in general may vary in lengths and/or widths. In some embodiments, the tray 201 may comprise an extended inner wall 212 that extends beyond the side walls 214 outward from the pole in a dovetail configuration, which is configured to horizontally slide into one or more slits within the pole apron. In some embodiments, the system may comprise an additional reverse spout 400 that is connected to either the pole 301 and/or the tray 201 and configured to direct the flow of water from the pole apron back into a pole cup 305 positioned beneath the pole apron.

As illustrated in FIGS. 22 through 24, a grow tray 215 may be utilized along with the tray to grow different types of vegetation. The grow tray 215 may be defined by a tray that has a first and second members 216, 217, which are configured to be coupled with one another such that a plurality of interior tray channels 218 are formed therein. As shown in the illustrations, in one embodiment, the tray 215 may be further defined by walls that extend upward from the base of the tray 215. The tray may comprise an inner wall 224, an outer wall 225, and two side walls 226a, 226b that collectively form an opening in the top of the tray 215.

The first and second members 216, 217, respectively of the grow tray 215 may independently have a plurality of interior channels 218. Each interior channel 218 of the first member 216 may have a channel edge 219 that is configured to be operatively coupled with a corresponding edge hole 221 of the second member 217. Likewise, each interior channel 218 of the second member 217 may have a channel edge 219 that is configured to fasten into a corresponding fastening hole 221 of the first member 216. The interior channels 218 may be parallel to one another with respect to the inner and outer walls (224, 225, respectively) of the tray 215 such that when the first and second members (216, 217, respectively) are coupled together a plurality of openings 223 is formed in the base of the tray 215. The openings 223 may allow water to flow through the base of the tray 215 into a tray 201 positioned below the tray 215. The tray 215 may additionally have at least one main channel 220, where each of the main channel 220 may correspond to either the first or second member 216, 217 of the tray 215 such that when water flows into the tray 215 it may either (a) flow directly through one of the openings in the base of the tray, or (b) flow down the main channel 220 and be dispersed throughout the interior channels 218. In this regard each interior channel 218 may have an opening, opposite of the channel edge 219, which is connected to and can receive water from the main channel 220. Furthermore, the water may overflow out of the interior channels 218 and into the openings 223 between the interior channels 218. As explained in further detail later the seeds of various plants may be located within the channels 220, 218. For example, rocks may be placed in the channels 220, 218, and the seeds may be placed in cotton balls between the rocks. The water flows over the seeds and down into the tray, and when the seeds grow the roots will reach down into the tray 201 through the openings 223 in the tray 215. As further illustrated in FIG. 26, the outer wall 225 of the tray 215 may optionally comprise one or more openings 225a that allow water to exit from the rear of the tray 215 and enter the tray 201 positioned below. In this way the openings 225a in the outer wall 255 of the tray 215 may prevent water from remaining stagnant within the tray after it is received from the pole assembly 300 and flows throughout the channels 228 within the tray 215.

As illustrated in FIG. 16 and FIG. 17, the shape of the tray 215 after the first and second members 216, 217 have been coupled with one another may reflect the shape of the tray 201 such that the tray 215 can be placed within the tray 201. It should be noted that although in the illustrated embodiments, the trays 201 and trays 215 are generally trapezoidal in shape, the trays 201 and trays 215 may be embodied by other shapes not illustrated herein, including but not limited to, cubed, rectangular, cylindrical, and/or organic or ameba shapes. To this extent, both the tray 201 and the tray 215 may have additional or excluded boundaries (e.g., inner walls, outer walls, sides walls) than what is contemplated herein.

When placed in the tray 201 at least a portion of the base of the tray 215 rests adjacent to the side rails 209 of the tray 201 such that the side rails 209 support and uphold the tray 215 after it has been placed within the tray. Furthermore, in a preferred embodiment, the length of the tray 215, as defined by the distance between the tray's inner wall 224 to its outer wall 225, is less than the length of the tray 201, as defined by the distance between its inner wall to the tray's outer wall 212, 213, such that the tray 215 is configured to slide along the side rails 209a, 209b back and forth between the inner and outer walls 213 and 214 of the tray 201. In this regard, the first member 216 of the tray 215 may have at least one handle 222 that a user of the hydroponics system may grip to aid in sliding the tray 215 back and forth within the tray 201. In one embodiment, as shown in the figures, the at least one handle 222 may be located at the top edge of the outer wall 225 of the tray 215. When positioned on top of the side rails 209a, 209b towards the front of the tray 201, the inner wall 224 of the tray 215 may be adjacent to the inner wall 212 of the tray 201. When positioned on top of the side rails 209a, 209b towards the back of the tray 201, the outer wall 225 of the tray 215 may be adjacent to the outer wall 213 of the tray 201. The tray 215 may additionally be positioned, on top of the side rails 209, in any area between the inner and outer walls of the tray 201.

In one embodiment, the top of the tray 215 may extend beyond the top of the tray 201 after being placed on the rails 209a, 26b. In another embodiment, the top of the tray 215 may be flush with the top of the tray 201 after being placed on the side rails 209a, 209b. In still other embodiments, the tray 215 may not sit within the tray 201, and instead may be span the opening of the tray 201. As will be explained in further detail later the tray may be moved from a first position near the spout 400 to collect water in the channels 218, 220 or may be moved to a second position so instead of delivering water to tray 215 the water is delivered to the tray 201 (e.g., when the roots grow from the tray 215 into the tray 201).

In yet another embodiment, the tray 215 may be positioned within the tray 201 in a third position such that the water is simultaneously dispensed into both the tray 215 and the tray 201 from the pole assembly. In such an embodiment the spout 400 may be embodied by a split configuration such that it directs the flow of the water to multiple locations, where a portion of the water is dispensed into the tray 215 and a portion of water is simultaneously dispensed to the tray 201. Alternatively, in such an embodiment, the tray 215 may be embodied by a split configuration such that it directs the flow of the water to multiple locations, where a portion of the water is dispensed into the tray 215 and flows throughout the tray 215, and a portion of water is immediately dispensed from the tray 215 to the tray 201, prior to flowing throughout the tray 215. In a preferred embodiment, the tray 215 is separable from the tray 201 to allow the roots to grow into the protrusions 202 of the tray 201. In such an embodiment, the tray 215 may be removed from its position above the side rails 209 of the tray and further disassembled such that the first and second members 216, 217 are separated from one another and the tray is removed from the hydroponics system 1 without harming the roots of the plants.

In one example embodiment of the tray 215 is located parallel with respect to the ground such that water only flows out of the tray when the water overflows the channel 218, 220 walls. In one embodiment, side rails 209a, 209b in the tray 201 may be sloped towards the outer wall 213 of the tray 201 such that when the tray 215 is positioned on top of the side rails 209 the tray 215 is similarly slopped towards the outer wall 213 of the tray allowing the water to flow from the inner wall 224 of the tray 215 to the outer wall 225 of the tray 215 and overflow into the tray 201 below through a gap that is created between the outer wall 225 of the tray 215 and the outer wall 213 of the tray 201. The gap may allow water to flow off the top of the tray and into the tray 201. The tray 201 may then be sloped towards the pole assembly 300 such that after the water enters the tray 201 the water flows towards the pole assembly 300 and exits the tray 201 through one or more openings 206 in the inner wall of the tray 201.

It should be understood that the size of the hydroponic system 1 may vary depending on the end use of the hydroponic system 1. As such, in one embodiment the hydroponic system 1 may be configured to fit on a countertop in a kitchen, school laboratory, or the like. In other embodiments, the hydroponic system 1 may be sized to fit in garages, greenhouses, or other like areas for a greater yield on the production rate of the vegetation. In still other embodiments of the invention, the hydroponic system 1 may be sized to fit within warehouses in which vegetation may be produced on a production level scale. In all of these systems different sizes of an aquaculture system (e.g., tanks 101) may be utilized with multiple pole assemblies 300 and multiple hydroponic assemblies 200 on an as needed basis in order to grow the desired amount of vegetation. For example, two poles 301 may be stacked on top of each other in order to extend the height of the hydroponic system 1 for growing more food. In other embodiments more hydroponics assemblies 200 are added to the pole 301 to grow more food. Any number of pole assemblies 300 and/or hydroponics assemblies 200 may be utilized to grow the desired amount of vegetation (e.g., food).

FIG. 25 illustrates another example embodiment of a tray 410 for a hydroponic system as described herein, with water entering the tray along ramp 424 from the pole assembly (described further below) and flowing generally in the direction of arrows 440 across a planting area 415. As shown, the illustrated embodiment of the tray 410 includes an outer periphery wall 412 that bounds the tray 410 at least along a majority of the periphery. This periphery wall 412, in combination with inner walls 406a and 406b define channels 405a and 405b, respectively. A bottom of the tray 410 defines thereon a first set of projections 414 and a second set of projections 416. The bottom of the tray 410 further defines ribs 418. The first set of projections 414 can serve several functions. For example, the first set of projections 414 can retain a seed mat of a wicking material in a defined position within the tray 410. The seed mat can be elevated with respect to the bottom of the tray 410 with the second set of projections 416 and/or the ribs 418. Optionally, the first set of projections 414 can support a tray insert for the tray such as tray 215 of FIG. 25. The first set of projections 414 and the second set of projections 416 allow water to flow through them while providing support and/or retention within the tray 410.

According to the illustrated embodiment, the ribs 418 provide a low barrier for water as it flows through the tray. The ribs 418 promote a build up of water in front of the rib before allowing the water to flow over the rib. This precludes water from traveling through the tray 410 too quickly to be beneficial to plants growing in the hydroponic system. The ribs 418 further promote turbulent flow within the tray 410 which slows the flow of water along the bottom of the tray and reduces the surface tension of the water within the tray, thereby rendering the water more readily available to interface with roots of plants growing above the bottom of the tray. Laminar flow along the bottom of the tray may enable the water to flow in discrete channels or paths due to surface tension, which may allow the water to more easily avoid roots within the tray. Thus, the ribs 418 provide an improvement through both pooling of water and inducing turbulent flow to the water as it flows through the tray. Also illustrated in FIG. 25 are flow control features 420a and 420b which will be described in greater detail below.

The water flowing through the tray, directionally illustrated generally by arrows 440, flows from the pole assembly 300, along ramp 424, and into the tray 410. The water reaches a back wall of the periphery wall 412 after it flows over the ribs, through the second set of projections 416, and through the first set of projections 414. FIG. 26 illustrates a top view of the tray 410 of FIG. 25 with water flow depicted. Water flows into the tray 410 along ramp 424 from the pole assembly 300 and flows along arrows 440 across the planting area 415, through the second set of projections 416, over the ribs 418, and through the first set of projections 414. The water passes through the first set of projections 414 to a back channel 406. The water flows from the back channel 406 to channels 405a and 405b, and back toward the pole assembly 300 shown by arrows 444.

FIG. 27 illustrates a detail view of the mechanism by which the tray 410 attaches to the pole assembly 300 and the flow path of the water to and from the pole assembly. As shown, the attachment mechanism includes a pair of protrusions 430, each with a corresponding recess 432. Between the pair of protrusions is ramp 424 that receives water from the pole assembly 300. Water traveling down the outer surface of the pole assembly reaches the ramp which, in the assembled position, engages the pole assembly about a portion of a periphery of the pole assembly such that water flowing down along the outer surface of the pole assembly meets the ramp 424 and flows into the tray 410 along the path shown by arrow 446. The water flows through the tray as illustrated and described with respect to FIG. 26 above, and returns to the pole assembly 300 via channels 405a, 405b through spout 426 shown in FIG. 27 along a flow path shown by arrow 448. Spout 426 is supported away from the pole assembly 300 by tray supports 422 that provide a gap between the spout 426 and pole assembly 300 through which water is returned to the outer wall of the pole assembly.

FIG. 28 illustrates a detail view of the flow control feature 420b illustrated in FIG. 25. The flow control feature 420b is a feature that is used to control the flow of water entering channel 405b, thereby regulating the depth of water inside the tray 410. The flow control feature 420b can be implemented in a number of ways, one of which is illustrated in FIG. 28 which depicts slots 421b on either side of the flow path leading to channel 405b. FIG. 29 illustrates a barrier 422b inserted into slots 421b forming the mechanism for flow control. The barrier can be inserted fully such that it is seated against a bottom of the tray, in which case it functions as a dam, requiring water to build up behind the barrier and permit flow to the channel 405b only when the barrier is over-topped. Such a configuration would lead to a pooling of water within the tray 410 to a height at least equal to the height of a top of the barrier 422b. This can allow roots of plants growing in the hydroponic system to remain in water as may be necessary for certain hydroponic configurations.

Optionally, the barrier 422b can be elevated with respect to the bottom of the tray 410. When the barrier 422b is elevated relative to the bottom of the tray 410, water will continue to flow under the barrier through a restricted flow path. Pressure will build on the water flowing under the barrier as the water level rises in the tray 410, provided the barrier is at a position in which the level of water flow into the tray is greater than the flow under the barrier (without pooling). The increased pressure will drive more water through the area under the barrier, which will reach a point of equilibrium between a pooling height of water within the tray 410, and the flow of water pressurized by the pool height under the barrier. Such a configuration allows control of the pooling level within the tray 410. Advantages to the flow control feature 420b and the resultant pooling within the tray 410 will be described further below with respect to different tray and tray configurations for the hydroponic system.

According to some embodiments, the barrier 422b may be formed of a porous material that allows water to flow through the barrier, but precludes the flow of seeds or small plants should they be carried by the water flow to the flow control feature 420b. Such a porous material can include, for example, a screen such as a porous version of the barrier 422b, with holes sized based on the desired flow rate through the barrier and based on a size of object to be screened from passing through the water control feature. The holes through such a screen may be large enough to permit sufficient water flow, but small enough to preclude the flow of seeds through the screen. Further, the holes may be shaped and sized such that seeds or small plants do not block the holes. Optionally, the screening material may be in the form of a woven or non-woven material. Examples include a sparse unwoven polymer such as a cellulose, nylon or spun polypropylene fiber. Such a material may not be seated within the slots 421b, but may be pressed into the region of the flow control feature as such materials are pliable. These non-woven polymer materials can be beneficial as they will permit the flow of water through them, while precluding the flow of solids such as seeds or small plants and the material will not become plugged or blocked by such solids, thereby reducing maintenance and potential modes of failure.

FIG. 30 illustrates another example embodiment of a tray 810 as described herein. The above-described trays 410 include a circular section shape, where a plurality of trays, such as five trays, arranged about a pole cup form a full circle of circular section shaped trays 410. Further embodiments include substantially square-shaped or rectangular-shaped trays as shown in FIG. 30. As shown, the tray 810 of the illustrated embodiment includes a square shape with a curvature in the corner 813 to facilitate attachment to a pole cup as described in the aforementioned embodiments. The attachment mechanism to the pole cup may be the same as described above, such that further description will not be provided herein with reference to the square tray 810. At the corner 813, the tray includes a ramp 825 similar to ramp 824 described above. This ramp 825 guides water from the pole section into the tray, along entry channel 827 as shown by arrow 823 when the tray 810 is in an installed position relative to a pole cup. The entry channel 827 is separated from the planting area 815 of the tray 810 by a sawtooth wall 829. This sawtooth wall 829 functions to allow water to build within the entry channel 827 to some degree before spilling through between the teeth of the sawtooth wall. This construction enables substantially equally distributed flow into the planting area 815 of the tray 810 along the length of the sawtooth wall 829. The water flows across the planting area 815, through protrusions 814, and into return channel 837 along arrows 833.

The tray 810 is configured such that in the installed position relative to a pole cup the water received into return channel 837 flows through a gateway serving as a water control feature 835. This water control feature 835 may be dammed as described above with respect to FIG. 30. Water flowing under such a dam, over such a dam, or through the gateway flows into exit channel 840 along arrow 839 to return to the pole cup, exiting the tray 810 along a path similar to that illustrated with respect to FIG. 27 above. The square tray 810 of example embodiments can increase a planting surface area in some embodiments, with four such squared trays installed in a single pole cup, forming a rectangular or square tray area at each level of the tower of pole cups.

Different types of plants benefit from different structures for optimal growth within the trays described herein. Seeds of plants can be retained by the protrusions described above where water flows over the seeds for germination. Optionally, seeds may be received on a seed mat which includes a wicking material that wicks material flowing through the tray to keep seeds moist for germination. Another example embodiment includes seeds or seedlings retained in pods that facilitate growth of the plants. Such an embodiment can include a structure configured to receive pods and suspend them at a predetermined height relative to a water level within a tray. FIG. 31 illustrates an example embodiment of a tray lid 434 configured to receive therein pods into respective pod apertures 436. The tray lid 434 of the illustrated embodiment is configured to attach to a tray 410, where the tray may be configured in any of the aforementioned configurations. The pod apertures 436 may be sized to receive therein pods, where the pods are vessels into which seeds or seedlings are received. The pods of example embodiments may be formed of a wicking, absorbent material, such as cotton, manmade fibers, coconut fibers, paper, or the like.

FIG. 32 illustrates a section view schematic of a single pod aperture 436 within the tray lid 434 including a pod 438. As shown, a seedling 439 is received within the pod 438, and the pod rests within the pod aperture 436 with a flange of the pod supporting the pod relative to the tray lid 434. Also shown is a bottom surface 411 of a tray and a water level 435. The pod 438 can wick the water to keep the seedling 439 moist to facilitate growth. The water level 435 can be adjustable using the flow restricting embodiments described above with respect to FIGS. 28 and 29 to ensure the height of the water level is appropriate for the pod 438 received within the pod aperture 436. The illustrated example embodiment of FIGS. 31 and 32 may benefit specific types of plants, particularly those that require adequate spacing to grow well, such as a lettuce where a head of lettuce may require spacing around the plant as it grows to optimize the growth and obtain maximum benefit from the systems described herein. The pod aperture size and arrangement of the tray lid 434 shown in the example embodiment can be varied to accommodate different size pods and different spacing depending upon the type of plant to be grown. A height of a surface tray lid 434 can be configured based upon the type of plant to be grown therein together with the type and size of pod to be received within the respective pod apertures 436. The tray lid 434 of an example embodiment can employ spacers between the tray and the tray lid to appropriately distance the surface of the tray lid from the tray to properly accommodate the plants and/or pods received in the tray lid.

The pods received within pod apertures 436 of the embodiments described herein can be supplied with water via damming of the water in the tray to raise the water level to that of the pod as shown in FIG. 32. However, embodiments described herein do not require pooling of the water in a tray to reach the pods. According to an example embodiment, the pods within a tray lid 434 may be fed by water guided specifically to a respective pod aperture 436. FIG. 33 illustrates an example tray 410 including flow directing fingers 425 that are configured to guide water from the pole section (proximate the ramp 424) to the individual pod locations, shown by pod apertures 436. The water is guided along arrows 427 to each individual pod, thereby wetting the pod before the remaining water falls into the tray, and exits along the arrows as shown in FIG. 26 described above. This configuration eliminates the need for pooling of the water within the tray 410. Optionally, each of the flow directing fingers 425 may terminate beneath a respective pod aperture and include a small pool to hold water directly below a pod aperture to ensure the respective pod absorbs sufficient water. The elimination of the need for pooling within the tray 410 reduces the weight of the tray during operation and reduces total water held by a system, thereby cycling water more quickly in its entirety. Such water cycling may be important in balancing the nutrients in the water, particularly in an aquaponics embodiment.

The flow directing fingers 425 are elevated with respect to a floor of the tray 410, but at an angle such that water traveling from the pole section 456 will travel along each flow directing finger and eventually flow into the tray 410 to be returned to the pole cups. FIG. 34 illustrates a profile view of a configuration in which the water travels along a flow directing finger 425 to a pod 438 visible both above the tray lid 434 and below. Each aperture 436 may have a corresponding flow directing finger 425. The flow directing fingers 425 may be coupled together and be supported within the tray 410 by structures therein, such as the protrusions, channel walls, or the like. Such support can hold the flow directing fingers 425 fixed position relative to the tray lid 434 and thus the pod apertures 436.

FIG. 35 illustrates another example embodiment of a tray 410 with a mechanism for supplying water to pods located within pod apertures 436 shown in FIG. 31. The illustrated embodiment of FIG. 35 includes a trough 423 where water collects in a center pool of the trough 423, fills the pool, and subsequently flows out through channels 428 of the trough. The trough 423, much like the flow directing fingers 425, are configured based on the pod apertures 436 within the tray lid, such that the channels 428 of the trough 423 carry water to each pod. In some embodiments, a channel may supply water to more than one pod, or a single pod may be supplied by multiple channels. The ends of each channel are, in some embodiments, configured to contact or be in close proximity to a pod received within a respective pod aperture 436. This ensures water flowing through each channel reaches a respective pod. The pool within the trough 423 serves to provide even distribution of the water among the different channels 428 of the trough 423, while also slowing the velocity of the water as it flows into the pool before being distributed through the channels.

FIG. 36 illustrates a detail view of where the tray 410 meets the pole cup with protrusions 430 that engage the bottom edge 433 of the upper cup 452 as described above. The trough 423 includes a trough ramp 424A, configured to overlie the ramp 424, such that water that would be received along ramp 424 is instead received at trough ramp 424A and carried to the pool of the trough 423 shown in FIG. 35. Further, as depicted in FIG. 36, the trough 423 includes trough tabs 423A that engage inner walls 406A and 406B to support the trough 423 within the tray 410. These trough tabs 423A provide sufficient support to suspend the trough 423 above the bottom of the tray 410. Further, the trough 423 includes trough recesses 432A that function similar to recesses 432 to engage a bottom edge 433 of the upper cup 452 as described above with respect to FIG. 27. The trough recesses 432A, which are raised relative to trough ramp 424A, serve to hold down the trough even with the weight of the water carried through the trough.

Water distribution within the trays of example embodiments described herein is important to ensure proper supply of water to each of the plants within a tray. While the water flow directing fingers 425 and the trough 423 described above provide water flow to pods and the like, certain trays are configured for supplying water to seeds positioned directly onto the tray, or onto an insert of the tray. Such a configuration may be beneficial for the growing of certain plants, such as micro greens, mung beans, or the like. FIG. 37 illustrates an example embodiment of a tray insert 1002 that is configured to maintain seeds and newly germinated seeds within a configurable level of water. The tray insert 1002 includes a peripheral lip 1012 that is configured to be supported on outer periphery wall 412 of a tray 410, such as the tray illustrated in FIG. 25. The peripheral lip 1012 may bound the tray on all sides, or may define only tabs spaced about around a periphery of the tray insert 1002. Optionally, a tray insert may include feet that support the tray insert rather than the peripheral lip 1012. In either case, the peripheral lip or feet support the tray insert 1002 in a predefined position relative to the tray 410 and a bottom thereof.

The tray insert 1002 of FIG. 37 includes a planting surface 1015 which is perforated with a plurality of holes of a uniform size. The holes of an example embodiment are of about one millimeter in diameter. They are specifically sized to be small enough to avoid getting clogged with seeds and are not large enough to allow the seeds to pass through. Thus, while different sized holes could be employed on trays used for different purposes, the holes sized at a preferred diameter of about one millimeter are well-suited to most seed types for vegetation that would be grown in such a hydroponic system. For example, microgreen seeds are generally very small, and holes in the planting surface 1015 that are too large may allow the seeds to pass through into the tray which is undesirable. Holes in the planting surface 1015 that are approximately the same size as some microgreen seeds may become clogged with those seeds, thereby not allowing water to pass in and out of the tray insert 1002 as intended.

The holes in the planting surface are described as having a diameter; however, the holes may be shaped other than circular. For example, the holes can be square, where the planting surface is a mesh, or the holes can be any shape. Further the holes need not be uniform in size. The holes can be arranged in a uniform arrangement or a random assortment. However, a preferred embodiment employs a maximum number of holes in the surface of the desired size, where the desired size is selected based on a size of the seeds to be received on the planting surface 1015. The size of the holes can be specified based on a type of plant to be planted, with the holes being configured according to the seed size of that plant.

Maintaining a specific water level within the tray insert 1002 allows the system described herein to provide the ideal growing environment for a particular type of seed. The water level may be, for example, just above the planting surface 1015, such that the seeds are wetted by the water, but not necessarily submerged. Further, as the seeds begin to germinate, the roots would propagate within the water. As the roots of a germinated seed continue to grow, some roots may grow through the holes in the planting surface 1015 and into the water held in the tray under the planting surface. When the plants are grown, they may be removed from the tray insert, while remaining roots can be removed by scraping an edge, such as a plastic blade, across a bottom of the planting surface, thereby removing the entangled roots from the tray insert 1002 and returning the tray insert to an as-new condition for re-use.

The illustrated embodiment of the tray insert 1002 includes a rib 1017. The rib 1017 can be a structural rib to add rigidity to the tray insert. Further, the rib 1017 can prevent seeds supported on the planting surface from being moved, by water flowing through the tray, in a direction towards an outer edge of the planting surface 1015. This can help maintain an even distribution of seeds within the tray insert 1002 to maximize growth potential of the planted seeds.

The tray insert 1002 of FIG. 37 may optionally be configured to receive therein an absorbent grow medium. Such an absorbent grow medium may include natural materials, such as coconut fiber and rice hulls, or processed materials, such as paper (e.g., recycled paper pulp), biodegradable felt, phenolic foam, clay, mineral wool, perlite, vermiculite, hydroponic confetti, etc. Such an absorbent grow medium, received on the bottom surface or planting surface 1015 of the tray insert 1002 can absorb water as it flows through the tray and rises above the holes in the bottom surface of the tray insert. The water flow can keep the absorbent grow medium hydrated, thereby providing a moist bed for seeds which can foster growth.

The tray insert 1002 of the illustrated embodiment of FIG. 37 includes barrier apertures 1022 are sized and positioned to allow the insertion of barriers, such as barrier 422b of FIG. 29 for flow control. The barriers allow embodiments of the trays 410 and tray insert 1002 to have the water level controlled to a configurable height, thereby maintaining the seeds, germinated seeds, and growing plants in predetermined depths of water as they grow. The barriers 422b restrict flow of water out of the area within which the tray inserts 1002 sit within the tray, thereby building up a water level within the tray insert 1002 based on a number of barriers and the positions of the barriers.

FIG. 38 illustrates a side view of the tray insert 1002 as described herein. As shown, the peripheral lip 1012 extends along a periphery of the tray insert 1002 to support the insert on the tray. A back end 1016 of the peripheral lip 1012 can extend beyond a tray into which the tray insert is received to provide a lift point for a user to lift the tray insert 1002 from the tray. This enables a user to remove the tray insert for depositing seeds therein, and for harvesting grown plants therefrom.

The tray insert 1002 of example embodiments can further be used together with a tray lid 1034 as shown in FIG. 39. The lid 1034 is similar in form and function to the tray lid 434 of FIG. 31. However, the lid 1034 is configured to facilitate the repositioning of pods within the pod apertures 1036. While tray lid 434 includes a raised surface above the top of the tray, the lid 1034 is relatively flat. The lid 1034 is configured to sit atop the tray insert 1002, with a periphery 1032 of the lid 1034 resting on the peripheral lip 1012 of the tray insert.

FIG. 40 illustrates the lid 1034 sitting on top of the tray insert 1002 with the planting surface below the pod apertures 1036. The surface through which the pod apertures 1036 are formed is slightly recessed below the periphery 1032, thereby moving the surface closer to the planting surface. The lid 1034 is configured for use with adjustable height pods 1038, two views of which are illustrated in FIG. 41. The adjustable height pods 1038 include a sidewall 1040. The sidewall 1040 of the illustrated embodiment is tapered from a top of the adjustable height pods 1038 to a narrower end at a bottom of the adjustable height pods. The sidewall 1040 further defines ribs 1042 which are raised elements that extend from the sidewall. The adjustable height pods 1038 of the illustrated embodiment further define open portions 1044 between tab extensions 1046.

FIG. 42 illustrates a height adjustable pod 1038 inserted into pod aperture 1036 of the lid 1034. The height adjustable pod 1038 is set to a low position, whereby the ribs 1042 are received into corresponding recesses 1037 of the pod aperture 1036. This lowered position may be suitable for new plantings in the pod, such as where a "plug" of a seed or seedling within a grow medium (e.g., coconut fiber) held within the height adjustable pod 1038 can be positioned to be at least partially within water within the tray insert 1002. The open portions 1044 of the height adjustable pod 1038 shown in FIG. 41 can promote water flow into, out of, and through the height adjustable pod.

As a plant grows within the height adjustable pod, the lowered position illustrated in FIG. 42 may no longer be ideal for growth. As such, the height adjustable pod 1038, together with the tray lid 1034, may be raised to a higher position. FIG. 43 illustrates the height adjustable pod 1038 in a raised position. To reach this position, the height adjustable pod 1038 is lifted from the pod aperture 1036 and rotated to move the ribs 1042 out of alignment with the recesses 1037. This results in the sidewall 1040 having an effectively larger diameter that does not allow the height adjustable pod 1038 to sit as far into the pod aperture 1036 as when the ribs 1042 are aligned with the recesses 1037. This higher position can be used to maintain at least a portion of the roots of a plant within the pod in the water, while keeping the plant from becoming waterlogged. The raised position illustrated in FIG. 43 further mitigates algae growth on the pod and on the plant growing therein or the medium within which the plant is growing. Algae can hamper growth of a plant within the pod, such that mitigation of algae is desirable.

FIGS. 44-47 illustrate another example embodiment of a modular system for pole cups. FIG. 44 illustrates a side-view of a single pole cup 450 module, where a plurality of pole cups are configured to be assembled into a vertically arranged pole. The pole cup 450 of FIG. 44 includes an upper cup 452 and a collector 454 connected by a pole section 456. The upper pole cup defines a lower pool 458 whose depth is defined based on the position of the lower pool base 460 within the pole section 456. Above the lower pool 458 and separating the upper cup 452 from the pole section 456 are a plurality of blades 462, between which are open spaces through which water can flow from the upper cup down along the pole section. Through the middle of the pole cup 450 is disposed a tube 464. At the base 466 of the collector 454 are collector blades 468, which separate the collector base 466 from the pole section 456.

FIG. 45 illustrates two pole cups 450 assembled together, where the base 466 of a first pole cup is received within the upper cup 452 of a second pole cup, and the tube 464 of the first pole cup engages and seals against the tube 464 of the second pole cup to form a continuous tube there through. The pole cups cooperate to form a flow path for water as it flows through the system of example embodiments described herein. The flow path of the water through the pole cups of the system is illustrated in FIG. 45 with arrows. As shown, water rises through the tube 464 and exits through the tube of the uppermost pole cup in the system into upper cup 452 along arrow 470. The water collects in the lower pool 458 of the pole cup 450 and the lower pool overflows through blades 462. The water flowing between the blades 462 flows along the outer wall of the pole section 456. In practice, a tray, such as the tray illustrated in FIG. 25 is attached to the pole cup 450 and supported by collector 454 with protrusions 430 (shown in FIG. 27) engaging the bottom of the upper cup 452, described further below. When a tray is attached to the pole cup system, water flows out of the upper cup 452 between blades 468 down along the pole section 456 until it encounters the ramp 424 of the tray (illustrated in FIG. 27), where the water is diverted into the tray flowing in a direction along arrow 472. This portion of the flow path corresponds with path shown by arrow 446 in FIG. 27. Water is returned from the tray along arrow 474 of FIG. 45, corresponding with the flow path illustrated by arrow 448 in FIG. 27.

The water returned from the tray along arrow 474 is received by the collector 454. The water flows through the collector 454 and between collector blades 468 and into the upper cup 452 of the next pole cup 450 down. This flow path is repeated for each pole cup 450 in the assembled tower, such as shown at arrow 476 of the subsequent pole cup receiving water through the upper cup 452 to a next tray, and returned to the collector from the tray along arrow 478 to continue the flow path.

The distance between pole cups can be varied using different sizes of pole cups, or alternatively, spacers in the form of pole sections that extend between the base 466 of one pole cup to an upper cup 452 of a next pole cup. In such a spacer, the water would flow from inside a collector 454, through the collector blades 468 and through the inside of the spacer into the next lower upper cup 452 of the assembled system. Such spacing allows for taller plants as trays are separated by a greater distance. Optionally, trays can further be axially spaced relative to one another without the need for spacers by omitting trays from a pole cup, and allowing a pole cup to let water pass there through, from the blades 462 of the upper cup 452, along the wall of the pole section 456, and into the collector 454 without reaching a tray 410. This same bypass occurs when a tray 410 is removed from a pole cup 450 for harvesting, service, or otherwise moved. As such, removal and insertion of trays 410 can be performed while water flows through the system without interfering with the water flow through other trays.

According to an example embodiment, a lid or cap may be attached to an uppermost pole cup 450 atop the upper cup 452 such that water flowing up through the tube 464 is retained within the upper cup and is diverted along the appropriate flow path. According to further embodiments described herein, the water may be received within the upper cup 452 not through the tube 464, but from another water source that functions in the same manner to provide water to the upper cup with sufficient flow volume to feed each of the trays of an assembled system.

FIG. 46 illustrates the attachment process for attaching a tray 410 to a pole cup 450 as described herein. The tray 410 is tilted relative to the pole cup 450 in order to advance protrusions 430 below a bottom edge 433 of the upper cup 452. The tray 410 is then move to a position extending perpendicular to an axis through the pole cup 450 as shown in FIG. 47. This movement causes the protrusions 430 to engage the bottom edge 433 of the upper cup 452, while the bottom edge 433 of the upper cup 452 is received within recesses 432. The tray 410 rests on the collector 454 in the installed and seated position shown in FIG. 47. In the installed and seated position, an upper end of the ramp 424 (shown in FIG. 27) is pressed into contact with the pole section 456, which enables the water flowing down along a surface of the pole section to be deflected by the ramp 424 to enter the tray. The tray supports 422 engage the pole section 456 to stabilize and support the tray 410 against the pole section. Spout 426 allows water to flow from the tray 410 back to the pole section 456 and into the collector 454. This attachment configuration ensures a firm engagement between the tray 410 and the pole cup 450 to ensure the proper flow of water and to provide structural rigidity for the system described herein.

FIG. 48 illustrates the tray 410 fully seated and engaged with the pole cup 450. As shown, the tray rests on collector 454 while protrusions of the tray are engaged within the bottom edge 433 of the upper cup 452. This arrangement provides a secure coupling between the tray 410 and the pole cup 450, and can support weight within the tray as the tray will hold some amount of water and the plants growing therein. FIG. 49 illustrates five trays 410 arranged around a single pole cup 450. As shown, the trays 410 function independently and can be independently removed and attached to the pole cup. Further, the trays can each be configured differently from one another (e.g., with lids, inserts, etc.) as each tray 410 functions independently. Connecting pole cups 450 together as described above with respect to FIG. 45 results in a stack or tower of pole cups, each able to receive a plurality of trays as illustrated in FIG. 49. This arrangement provides a compact and efficient arrangement of growing trays to produce a relatively large amount of plants within a relatively small footprint.

FIG. 6 above illustrated an example embodiment of a substantially square tray. FIG. 50 illustrates a top view of four of these trays 810 as secured to a pole cup 450. The substantially square trays 810 of FIG. 50 are illustrated with tray lids 834 including pod apertures 836. As shown, the square form factor of the illustrated trays 810 provide a larger surface area for planting, which can accommodate more pods. However, the square form factors of these trays preclude rotation of a tower of pole cups and trays if one side of the tower abuts a surface. The circular form factor of the trays shown in FIG. 50 can be rotated about an axis of the pole cup even when a tower of such trays are arranged to abut a surface or adjacent to another tower of pole cups and trays. FIG. 51 illustrates a perspective view of the square tray arrangement of FIG. 50.

The system of example embodiments described herein can be used in a variety of implementations. As a compact form factor, several pole cups can be used for one or more layers of trays as a tabletop version, similar to that depicted in FIG. 1. In such an embodiment, the tank 101 can provide the water source, while the water is pumped through tube 464 to the top of the assembled pole cups before descending down through the pole cups 450 and any attached trays 410. Optionally, embodiments can be assembled into larger systems, such as a tower several feet tall.

One such example embodiment of a system described herein includes a mobile implementation 480 as depicted in FIG. 52. As shown, a tower of pole cups 450 are assembled in a vertical arrangement with a plurality of trays 410 attached thereto. Further included is a tank 482 mounted on mobile platform 484. The mobile implementation 480 can be moved as needed. The mobile implementation includes an upright member 486 which functions as a structural member to secure the top of the tower of pole cups 450 to prevent swaying and to ensure structural satiability of the mobile implementation 480. The structural member can be mounted to the mobile platform 484 or to the tank 481 as needed, and can include structural supports 488. The manner of operation of the mobile implementation 480 can take two forms. A first includes where the water is pumped through the tube within the pole cups to reach the top of the tower of pole cups where the water begins the descent that feeds each tray. Optionally, the water may be fed through a hose or pipe in the structural member 486 to reach the top of the pole cup tower. In either manner of operation, water is pumped to the top of the pole cup tower before being recouped at the bottom of the tower, which is in the tank 482 in the illustrated embodiment of FIG. 52.

In addition to a mobile implementation of a single tower of pole cups, embodiments described herein further include a mobile array of towers of pole cups. Such a mobile array may be in the form of a plurality of towers of pole cups arranged within a shipping container and fixedly positioned within the shipping container. FIG. 53 illustrates an example embodiment of a defined space including a plurality of towers of pole cups in fixed positions. The example implementation shown in FIG. 53 can be implemented within a shipping container, or implemented in a space such as a grow house or other location where growing operations take place. One significant benefit of the system illustrated in FIG. 53 is the ability of the system to be self-contained such that it can be implemented in a shipping container and deployed to any destination that can benefit from the mobile grow room. FIG. 53 illustrates one such structural arrangement; however, it is understood that the components described herein can be arranged in different configurations while obtaining the same benefits of the system describe with respect to FIG. 53.

FIG. 53 is a side view of an arrangement of towers of pole cups arranged along walls, such as in a shipping container or otherwise confined space. As shown, the towers 700 disposed on three walls of the container each include a plurality of levels of trays 710 arranged around the tower of pole cups. The towers 700 are supported at the bottom by a support bracket 712 shown in FIG. 54 which depicts the bottom of an array of towers 700. The bracket provides a support for the weight of the tower of pole cups 708, with a base of a bottom pole cup 708 received within support bracket cup 714 The support bracket 712 with the support bracket cup 714 support the weight of the tower of pole cups and levels of trays 710. The support bracket 712 can be mounted to a structural frame or to a wall of a shipping container (either directly or indirectly) and is shown cantilevered from a structural frame member 716, which may be secured to a wall of a shipping container in a containerized embodiment. The support bracket 712 thus suspends the tower of pole cups above a floor of the space or shipping container. The support bracket 712 can optionally include a support extending to a floor to aid in supporting the weight of the tower of pole cups and levels of trays.

Also illustrated in FIG. 54 is a conduit 718 from the support bracket cup 714 leading to drain manifold 720. Water flowing through the base of pole cup 708 flows into the support bracket cup 714, and drains from the support bracket cup through conduit 718 into the drain manifold 720. This occurs for a plurality of towers 700 and potentially all towers within the system of the confined space or container. There could be more than one drain manifold 720 to accommodate different layouts; however, all towers 700 within the system of the confined space can drain through respective conduits (e.g., conduit 718) to a common drain manifold 720. The drain manifold 720 conducts the water drained from the towers into a tank 722. This tank functions in a similar manner to the tanks of above-described embodiments; however, tank 722 collects water discharged from a plurality of towers. To that end, the tank 722 can operate as a tank in a hydroponic operation or an aquaponic operation supporting aquatic life.

The tank 722 is also used to supply the towers 700, at least indirectly as detailed further below, with water, such that the water system of the hydroponic or aquaponic system within the confined space or container is closed loop or substantially closed loop. Substantially closed loop describes an embodiment in which water may be added to the system to compensate for water consumed and water lost through evaporation, leaks, spills, or the like. While the system is designed to operate as closed-loop, embodiments may be described as substantially closed loop where water and potentially other additives (e.g., water nutrients) are added to the system periodically to compensate for losses.

FIG. 55 illustrates a top side of the towers 700 within the confined space or container including an upper support bracket 730 with upper support bracket cup 732. The upper support bracket 730 is secured to the structural frame member 716, which may be the same structural frame member as the support bracket 712 of the same tower 700 is connected to. The upper cup of the top-most pole cup or an extension therefrom (e.g., a spacer) is received within the upper support bracket cup 732, and a supply conduit 734 is arranged to supply water from a supply manifold 736. The supply manifold 736 may be configured to supply all or some of the towers 700 within the confined space or container. The water supplied to the towers cascade through the pole cups and the trays as described above.

FIG. 56 illustrates an example embodiment of a pump system for circulating water through a plurality of towers according to an example embodiment. As illustrated, the drain manifold 720 conducts water discharged from the towers 700 to tank 722. The tank 722 of the embodiment of FIG. 56 is an intermediate tank, with a pump 726, such as a submerged sump pump arranged to pump water from the intermediate tank 722 to a primary tank 740 via return line 724. The primary tank 740 of the illustrated embodiment supplies water to primary pump 742 via inlet line 744. The primary pump 742 can be a conventional pool pump, which may include variable speed pumping capabilities and an integrated filter basket according to the illustrated example. The pump outputs the water along output line 746 to one or more supply manifolds 736, which in turn supply water to each of the towers as shown in FIG. 55. The illustrated embodiment of FIG. 56 depicts multiple supply manifolds 736, which may each be coupled to the output line 746 by a valve such. Each supply line among multiple supply lines may supply water to a different subset of the towers 700. Such a configuration may be beneficial to maintain zones within the confined space or container, where a zone can be individually shut off for plant harvesting, plant seeding, or maintenance of towers in that zone without shutting off water to all towers of the system.

FIG. 57 illustrates an example cutaway of a hydroponic system as described herein as arranged within a shipping container. The components described above are illustrated within a confined area demonstrating the compact and efficient system of example embodiments. The shipping container 790 can house all components of the hydroponic system to permit transport of an entire self-contained hydroponic system to any location. Further, besides the seeds or seedlings needed to produce plants, the only resources needed for such a containerized system is power and water. The water is largely recyclable in a substantially closed loop, though water topping off will occur with prolonged operation. A freshwater tank can be employed, separate from primary tank 740, where the freshwater tank can be used to supplement the water in the primary tank 740 that is circulated through the towers. Further, a drain line may be provided from the supply manifolds 736 to the primary tank 740. A further line may be provided between the output line 746 and the drain manifold 720 proximate a distal end of the drain manifold to facilitate a drain line flush operation. One or more filters may be installed within the plumbing lines, such as at the outlet of the pump 742, at the inlet of the pump, or elsewhere to remove particulates from the water that may adversely affect performance of the system described herein.

The plumbing configuration illustrated in FIGS. 54-57 is an example embodiment of a plumbing system for the hydroponic tower system described herein; however, various other plumbing configurations can be employed. For example, the drain manifold 720 can function as the water tank or reservoir draining directly to the pump 742, with a supplemental water tank available to top off the drain manifold reservoir as needed.

The power can be provided by a local power grid, or alternatively through solar cells mounted to the container 790 to form a completely self-contained hydroponic growing system. The power is needed to run the water through pump 742 to supply each of the towers 700 of trays 710. The pump may be a high-efficiency variable speed pump to minimize power consumption. Power may optionally be needed for grow lights that can be mounted to the container (e.g., to the ceiling) or to the towers 700, such as mounted below trays 710 to supply light to each tray individually. The power provided to the shipping container 790 is optionally used for additional functions, such as climate control, dehumidification, computer devices (e.g. timers, controllers, etc.), communications system (e.g., WiFi, cellular communications, etc.), or the like.

According to some embodiments, the container 790 can be used as a hub for communications, particularly in areas lacking reliable communication methods. For example, the container 790 can include a satellite communications link, and can use this link to provide wireless communications for those proximate the container, such as through WiFi or other near-field communications protocols to connect people near the container with the rest of the world. The container of example embodiments can further be used to filter and provide clean drinking water to a community. While water from a water source (e.g., a well) may be suitable for growing plants, the water may not be sufficiently clean for human consumption. The water processed through the systems described herein can be cleaned by the plants to produce clean drinking water from the water returned from the trays. This system can clean ground water to provide clean drinking water to a community where the container is located.

According to some embodiments, grow lights may be disposed in asymmetrical locations with respect to the different levels of the towers, such that the towers may be configured to rotate to permit equal light distribution about each level of the tower. Rope lights or strips (e.g., strips of LED lights), pole elongated lights, panel lights, and light reflective panels or curtains can further be used to spread light across the planting areas of the trays to facilitate efficient growth. According to still other embodiments, windows or skylights may be positioned within a top of a shipping container to allow natural light to illuminate the towers and thereby facilitate growth. Such windows or skylights may be openable as needed.

The towers 700 described herein can implement interchangeable parts, where pole cups and trays (e.g., pole cup 450 and tray 410 or 810) can be used in any tower at any location. Interchangeable parts minimizes the variations that need to be manufactured and renders spare parts easily maintained, particularly when a containerized embodiment of the hydroponic system is remotely located. Interchangeable parts further enables the tower heights to be customizable without requiring new components. For example, if plants to be grown become tall, the trays from a level above the tall plants may be omitted to allow the plants to grow upward. Removal of the trays in the system described herein can be performed while water is flowing without disrupting the hydroponic system of example embodiments. Further, the upper support bracket 730 may be movably engaged along a vertical structural frame member 716 to alter the overall height of each tower 700.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A tray for a hydroponic system comprising:
   a tray configured to receive water from the hydroponic system, circulate the water through the tray, and return the water to the hydroponic system, wherein the tray comprises one or more flow control features configured to regulate water flow through the tray wherein the one or more flow control features comprise one or more slots;
   a barrier received within the one or more slots to block at least a portion of water flow out of the tray and that is adjustable within the one or more slots to regulate water flow through the tray; and
   a tray insert supported by the tray, wherein the tray insert comprises a plurality of holes through a bottom surface of the tray insert;
   wherein one or more apertures are defined through the tray insert, wherein the one or more apertures are arranged to provide access to the one or more flow control features of the tray.

2. The tray of claim 1, wherein the tray insert further comprises:
   a rib extending across a width of the bottom surface of the tray insert, wherein the rib is elevated with respect to the bottom surface of the tray insert and does not include any of the plurality of holes.

3. The tray of claim 1, wherein the tray insert further comprises a peripheral lip, wherein the peripheral lip is configured to be supported by a peripheral wall of the tray.

4. The tray of claim 1, wherein the barrier of the one or more slots is adjustable within the one or more slots to control a level of water flow out of the tray.

5. The tray of claim 4, wherein the one or more apertures of the tray insert permits insertion, removal, and adjustment of the barrier of the one or more slots.

6. The tray of claim 1, further comprising a lid, wherein the lid defines a periphery configured to be supported by the tray insert.

7. The tray of claim 6, wherein the lid defines at least one pod aperture, the at least one pod aperture having at least one recess defined therein.

8. The tray of claim 7, further comprising at least one height adjustable pod, wherein the at least one height adjustable pod comprises a shape configured to be received within the at least one pod aperture and including at least one rib corresponding to the at least one recess of the at least one pod aperture.

9. The tray of claim 8, wherein the at least one height adjustable pod in a first position with the at least one rib aligned with the at least one recess of the at least one pod aperture is received at a first depth relative to the lid.

10. The tray of claim 9, wherein the at least one height adjustable pod in a second position with the at least one rib not aligned with the at least one recess of the at least one pod aperture is received at a second depth relative to the lid, where the second position is raised relative to the first position with respect to the lid.

11. An apparatus for a hydroponic system comprising:
    a tray configured to receive water from the hydroponic system, circulate the water through the tray, and return the water to the hydroponic system, wherein the tray comprises one or more flow control features configured to regulate water flow through the tray and maintain a depth of water within the tray; and
    a removable tray insert supported by the tray, wherein the removable tray insert comprises a plurality of holes through a bottom surface of the removable tray insert into which seeds are received;
    wherein the removable tray insert is configured to maintain the seeds in a predefined depth of water,
    wherein the removable tray insert is supported above a bottom of the tray to support the seeds at least partially within the water within the tray.

12. The tray of claim 11, wherein the one or more flow control features comprise one or more slots, wherein the one or more slots are each arranged to receive therein a barrier that blocks at least a portion of water flow out of the tray.

13. The tray of claim 12, wherein the barrier of the one or more slots is adjustable within the one or more slots to control a level of water flow out of the tray.

14. The tray of claim 13, wherein the predefined depth of water is controlled by the barrier of the one or more slots.

15. The tray of claim 11, further comprising a lid, wherein the lid defines a periphery configured to be supported by the removable tray insert.

16. The tray of claim 15, wherein the lid defines at least one pod aperture, the at least one pod aperture having at least one recess defined therein.

17. The tray of claim 16, further comprising at least one height adjustable pod, wherein the at least one height adjustable pod comprises a shape configured to be received within the at least one pod aperture and including at least one rib corresponding to the at least one recess of the at least one pod aperture.

18. The tray of claim 17, wherein the at least one height adjustable pod in a first position with the at least one rib aligned with the at least one recess of the at least one pod aperture is received at a first depth relative to the lid.

19. The tray of claim 18, wherein the at least one height adjustable pod in a second position with the at least one rib not aligned with the at least one recess of the at least one pod aperture is received at a second depth relative to the lid, where the second position is raised relative to the first position with respect to the lid.

20. A tray for a hydroponic system comprising:
    a tray configured to receive water from the hydroponic system, circulate the water through the tray, and return the water to the hydroponic system, wherein the tray comprises one or more flow control features configured to regulate water flow through the tray wherein the one or more flow control features determine, with an incoming flowrate of water into the tray, a pooling depth within the tray;
    a lid, wherein the lid defines a periphery configured to be supported by the tray, wherein the lid defines at least one pod aperture, the at least one pod aperture having at least one recess defined therein;
    at least one height adjustable pod, wherein the at least one height adjustable pod comprises a shape configured to be received within the at least one pod aperture and including at least one rib corresponding to the at least one recess of the at least one pod aperture wherein the at least one height adjustable pod in a first position with the at least one rib aligned with the at least one recess of the at least one pod aperture is received at a first depth relative to the lid, wherein the at least one height adjustable pod in a second position with the at least one rib not aligned with the at least one recess of the at least one pod aperture is received at a second depth relative to the lid, where the second position is raised relative to the first position with respect to the lid.

* * * * *